US008275628B2

(12) United States Patent
Firminger et al.

(10) Patent No.: US 8,275,628 B2
(45) Date of Patent: *Sep. 25, 2012

(54) PERSONALIZED PLAN DEVELOPMENT BASED ON ONE OR MORE REPORTED ASPECTS' ASSOCIATION WITH ONE OR MORE SOURCE USERS

(75) Inventors: Shawn P. Firminger, Redmond, WA (US); Jason Garms, Redmond, WA (US); Roderick A. Hyde, Redmond, WA (US); Edward K. Y. Jung, Bellevue, WA (US); Chris D. Karkanias, Sammamish, WA (US); Eric C. Leuthardt, St. Louis, MO (US); Royce A. Levien, Lexington, MA (US); Richard T. Lord, Tacoma, WA (US); Robert W. Lord, Seattle, WA (US); Mark A. Malamud, Seattle, WA (US); John D. Rinaldo, Jr., Bellevue, WA (US); Clarence T. Tegreene, Bellevue, WA (US); Kristin M. Tolle, Redmond, WA (US); Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 307 days.

This patent is subject to a terminal disclaimer.

(21) Appl. No.: 12/590,027

(22) Filed: Oct. 29, 2009

(65) Prior Publication Data

US 2011/0055262 A1 Mar. 3, 2011

Related U.S. Application Data

(63) Continuation-in-part of application No. 12/584,489, filed on Sep. 3, 2009, and a continuation-in-part of application No. 12/584,653, filed on Sep. 8, 2009, and a continuation-in-part of application No. 12/587,018, filed on Sep. 29, 2009, and a continuation-in-part of application No. 12/587,127, filed on Sep. 30, 2009, now Pat. No. 8,229,756.

(51) Int. Cl.
*G06Q 10/00* (2012.01)
(52) U.S. Cl. ....................................................... 705/1.1
(58) Field of Classification Search .................... None
See application file for complete search history.

(56) References Cited

U.S. PATENT DOCUMENTS 4,853,854 A 8/1989 Behar et al.
(Continued)

OTHER PUBLICATIONS

Chen, Jason; "You Can Soon Track Your Heart Rate with Your iPhone"; Gizmodo; Bearing a date of Oct. 9, 2009; p. 1; Creative Commons License; located at: http://gizmodo.com/5378340/you-can-soon-track-your-heart-rate-with-your-iphone; printed on Oct. 29, 2009.

(Continued)

*Primary Examiner* — Jonathan Ouellette

(57) ABSTRACT

A computationally implemented method includes, but is not limited to: providing one or more relevant reported aspects associated with one or more source users that are relevant to achieving one or more target outcomes, the providing of the one or more relevant reported aspects being based, at least in part, on the one or more relevant reported aspects' association with the one or more source users; and developing one or more personalized plans designed to facilitate an end user to achieve the one or more target outcomes when one or more emulatable aspects indicated by the one or more personalized plans are emulated, the development of the one or more personalized plans being based, at least in part, on the providing In addition to the foregoing, other method aspects are described in the claims, drawings, and text forming a part of the present disclosure.

46 Claims, 40 Drawing Sheets

U.S. PATENT DOCUMENTS

| | | | |
|---|---|---|---|
| 5,961,446 | A | 10/1999 | Beller et al. |
| 6,338,044 | B1 | 1/2002 | Cook et al. |
| 6,353,447 | B1 | 3/2002 | Truluck et al. |
| 6,842,604 | B1 | 1/2005 | Cook et al. |
| 7,587,368 | B2 | 9/2009 | Felsher |
| 7,668,735 | B2 | 2/2010 | Grace et al. |
| 7,702,685 | B2 | 4/2010 | Shrufi et al. |
| 7,860,852 | B2 | 12/2010 | Brunner et al. |
| 7,908,182 | B1 | 3/2011 | Gupta |
| 7,959,567 | B2 | 6/2011 | Stivoric et al. |
| 8,005,906 | B2 | 8/2011 | Hayashi et al. |
| 2002/0107707 | A1 | 8/2002 | Naparstek et al. |
| 2004/0015337 | A1* | 1/2004 | Thomas et al. .................. 703/11 |
| 2005/0197553 | A1 | 9/2005 | Cooper |
| 2005/0216300 | A1 | 9/2005 | Appelman et al. |
| 2006/0036619 | A1* | 2/2006 | Fuerst et al. .................. 707/100 |
| 2007/0088576 | A1 | 4/2007 | de Beus et al. |
| 2008/0091471 | A1 | 4/2008 | Michon et al. |
| 2008/0288425 | A1* | 11/2008 | Posse et al. ...................... 706/12 |
| 2008/0294012 | A1* | 11/2008 | Kurtz et al. .................. 600/300 |
| 2009/0044113 | A1 | 2/2009 | Jones et al. |
| 2009/0070679 | A1 | 3/2009 | Shen et al. |
| 2009/0075242 | A1 | 3/2009 | Schwarzberg et al. |
| 2009/0076335 | A1 | 3/2009 | Schwarzberg et al. |
| 2009/0100469 | A1 | 4/2009 | Conradt et al. |
| 2009/0176526 | A1* | 7/2009 | Altman ...................... 455/556.1 |
| 2009/0258710 | A1* | 10/2009 | Quatrochi et al. .............. 463/43 |
| 2009/0271247 | A1 | 10/2009 | Karelin et al. |
| 2009/0292814 | A1 | 11/2009 | Ting et al. |
| 2009/0299990 | A1* | 12/2009 | Setlur et al. ........................ 707/5 |
| 2009/0313041 | A1* | 12/2009 | Eder ................................ 705/2 |
| 2009/0319288 | A1 | 12/2009 | Slaney et al. |
| 2009/0326981 | A1* | 12/2009 | Karkanias et al. ................ 705/3 |
| 2010/0063993 | A1* | 3/2010 | Higgins et al. ................ 709/203 |
| 2010/0114788 | A1 | 5/2010 | White et al. |
| 2010/0268830 | A1 | 10/2010 | McKee et al. |
| 2010/0281364 | A1* | 11/2010 | Sidman ........................ 715/713 |
| 2010/0293247 | A1 | 11/2010 | McKee et al. |
| 2010/0305806 | A1* | 12/2010 | Hawley ........................... 701/33 |
| 2011/0022602 | A1 | 1/2011 | Luo et al. |
| 2011/0179161 | A1 | 7/2011 | Guy et al. |
| 2011/0185020 | A1 | 7/2011 | Ramamurthy et al. |
| 2011/0252101 | A1* | 10/2011 | Davis et al. .................. 709/206 |

OTHER PUBLICATIONS

"Fitbit"; Bearing a date of 2009; pp. 1-2; Fitbit, Inc.; located at: http://www.fitbit.com; printed on Oct. 29, 2009.

"Free Exercise Programs—Workout Routines & Weight Loss Diet Plans"; Freetrainers.com; Bearing dates of 2000-2008; pp. 1-2; located at: http://www.freetrainers.com/FT/jsp/index.jsp; printed on Sep. 2, 2009.

Wilson, Mark; "Philips DirectLife Turns Exercise Into a Status Bar"; Gizmodo; Bearing a date of Oct. 21, 2009; pp. 1-2; Creative Commons License; located at: http://gizmodo.com/5386577/philips-directlife-turns-exercise-into-a-status-bar; printed on Oct. 29, 2009.

"Your Personalized Development Plan"; Central Michigan University; Bearing a date of 2004; p. 1; located at: http://www.chsbs.cmich.edu/leader_model/dplanintro.htm; printed on Sep. 2, 2009.

Agger, Michael; "Every Day We Write the Book: What would happen if Facebook made its data available for research?"; Slate; bearing date of Nov. 30, 2010; printed on Dec. 10, 2010; pp. 1-3; located at: http://www.slate.com/formatdynamics/CleanPrintProxy.aspx?1292008532368.

"Self-tracking links to get you started"; The Quantified Self: self knowledge through numbers; printed on Dec. 10, 2010; pp. 1-5; located at: http://quantifiedself.com/self-tracking-links-to-get-you-started/.

U.S. Appl. No. 12/655,582, Firminger et al.
U.S. Appl. No. 12/655,581, Firminger et al.
U.S. Appl. No. 12/655,365, Firminger et al.
U.S. Appl. No. 12/655,250, Firminger et al.
U.S. Appl. No. 12/655,075, Firminger et al.
U.S. Appl. No. 12/653,972, Firminger et al.
U.S. Appl. No. 12/653,387, Firminger et al.
U.S. Appl. No. 12/653,386, Firminger et al.
U.S. Appl. No. 12/653,180, Firminger et al.
U.S. Appl. No. 12/653,117, Firminger et al.
U.S. Appl. No. 12/592,946, Firminger et al.
U.S. Appl. No. 12/592,944, Firminger et al.
U.S. Appl. No. 12/592,548, Firminger et al.
U.S. Appl. No. 12/592,544, Firminger et al.
U.S. Appl. No. 12/592,161, Firminger et al.
U.S. Appl. No. 12/592,075, Firminger et al.
U.S. Appl. No. 12/590,841, Firminger et al.
U.S. Appl. No. 12/590,600, Firminger et al.
U.S. Appl. No. 12/590,039, Firminger et al.
U.S. Appl. No. 12/587,127, Firminger et al.
U.S. Appl. No. 12/587,018, Firminger et al.
U.S. Appl. No. 12/584,653, Firminger et al.
U.S. Appl. No. 12/584,489, Firminger et al.

Diaz, Jesus; "One Day, This Will Be Remembered as the First Real Tricorder"; gizmodo.com; bearing a date of Nov. 12, 2009; pp. 1-2; located at http://gizmodo.com/5403126/one-day-this-will-be-re-membered-as-the...; printed on Nov. 25, 2009.

"Exercise Pro Software Active Care Version 5"; BioEX Systems, Inc.; bearing dates of 1995-2009; pp. 1-4; located at http://www.bioexsystems.com/ActiveCare.htm; printed on Dec. 17, 2009.

Gross, Daniel; "A Jewish Mother in Your Cell Phone"; Slate; bearing a date of Nov. 10, 2009; pp. 1-3; located at http://www.slate.com/formatdynamics/CleanPrintProxy.aspx?125919...; printed on Nov. 25, 2009.

Guez, Tomer; "Weight Loss Software, Food Diary, Exercise Tracker, and Medical Diary. 'The Food and Exercise Diary Software Version 6.0'"; bearing a date of Sep. 2009; pp. 1-17; located at http://www.weightlosssoftware.com/?ti=135&wn=2; printed on Dec. 17, 2009.

"Nutrition tracking software is critical for learning about foods and planning meals"; NutriCoach; bearing a date of Mar. 29, 2006; 6 total pgs.; located at http://www.nutricoach.net/diet_software.html; printed on Dec. 17, 2009.

"Nutritionmaker Focus Nutrition Software Motivate—Analyze—Instruct"; BioEX Systems, Inc.; bearing dates of 1995-2009; pp. 1-4; located at http://www.bioexsystems.com/NutritionMakerChiro.htm; printed on Dec. 17, 2009.

"Tired of a stiff neck and shoulders? Ergo Pro Computer Fatigue Software reminds you when to stretch and shows you how"; BioEX Systems, Inc.; bearing dates of 1995-2009; pp. 1-3; located at http://www.bioexsystems.com/ExerciseBreak.htm; printed on Dec. 17, 2009.

"VHI PC-Kits Desktop Edition"; Visual Health Information; pp. 1-2; located at http://www.vhikits.com/products/software/PCKitsDesktop.aspx; printed on Dec. 17, 2009.

Gaonkar, Shravan, et al.; "Micro-Blog: Sharing and Querying Content Through Mobile Phones and Social Participation"; MobiSys '08; Jun. 17-20, 2008; pp. 174-186; ACM.

* cited by examiner

PERSONALIZED PLAN DEVELOPMENT BASED ON ONE OR MORE REPORTED ASPECTS' ASSOCIATION WITH ONE OR MORE SOURCE USERS

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements, the present application constitutes a continuation-in-part of U.S. patent application Ser. No. 12/584,489, entitled PERSONALIZED PLAN DEVELOPMENT, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 3 Sep. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/584,653, entitled PERSONALIZED PLAN DEVELOPMENT, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 8 Sep. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/587,018, entitled PERSONALIZED PLAN DEVELOPMENT BASED ON OUTCOME IDENTIFICATION, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 29 Sep. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/587,127, entitled PERSONALIZED PLAN DEVELOPMENT BASED ON OUTCOME IDENTIFICATION, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 30 Sep. 2009 now U.S. Pat. No. 8,229,756, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

SUMMARY

A computationally implemented method includes, but is not limited to providing one or more relevant reported aspects associated with one or more source users that are relevant to achieving one or more target outcomes, the providing of the one or more relevant reported aspects being based, at least in part, on the one or more relevant reported aspects' association with the one or more source users; and developing one or more personalized plans designed to facilitate an end user to achieve the one or more target outcomes when one or more emulatable aspects indicated by the one or more personalized plans are emulated, the development of the one or more personalized plans being based, at least in part, on the providing. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

A computationally implemented system includes, but is not limited to: means for providing one or more relevant reported aspects associated with one or more source users that are relevant to achieving one or more target outcomes, the providing of the one or more relevant reported aspects being based, at least in part, on the one or more relevant reported aspects' association with the one or more source users; and means for developing one or more personalized plans designed to facilitate an end user to achieve the one or more target outcomes when one or more emulatable aspects indicated by the one or more personalized plans are emulated, the development of the one or more personalized plans being based, at least in part, on the providing. In addition to the foregoing, other system aspects are described in the claims, drawings, and text forming a part of the present disclosure.

A computationally implemented system includes, but is not limited to: circuitry for providing one or more relevant reported aspects associated with one or more source users that are relevant to achieving one or more target outcomes, the providing of the one or more relevant reported aspects being based, at least in part, on the one or more relevant reported aspects' association with the one or more source users; and circuitry for developing one or more personalized plans designed to facilitate an end user to achieve the one or more target outcomes when one or more emulatable aspects indicated by the one or more personalized plans are emulated, the development of the one or more personalized plans being based, at least in part, on the providing. In addition to the foregoing, other system aspects are described in the claims, drawings, and text forming a part of the present disclosure.

A computer program product including a signal-bearing medium bearing one or more instructions for providing one or more relevant reported aspects associated with one or more source users that are relevant to achieving one or more target outcomes, the providing of the one or more relevant reported aspects being based, at least in part, on the one or more relevant reported aspects' association with the one or more source users; and one or more instructions for developing one or more personalized plans designed to facilitate an end user to achieve the one or more target outcomes when one or more emulatable aspects indicated by the one or more personalized plans are emulated, the development of the one or more personalized plans being based, at least in part, on the providing. In addition to the foregoing, other computer program product aspects are described in the claims, drawings, and text forming a part of the present disclosure.

A method for developing one or more personalized plans that includes providing, using a microprocessor, one or more relevant reported aspects associated with one or more source users that are relevant to achieving one or more target outcomes, the providing of the one or more relevant reported aspects being based, at least in part, on the one or more relevant reported aspects' association with the one or more source users; and developing one or more personalized plans designed to facilitate an end user to achieve the one or more target outcomes when one or more emulatable aspects indicated by the one or more personalized plans are emulated, the development of the one or more personalized plans being based, at least in part, on the providing.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 6l is a high-level logic flowchart of a process depicting alternate implementations of the relevant reported aspect providing operation 502 of FIG. 5.

FIG. 6o is a high-level logic flowchart of a process depicting alternate implementations of the relevant reported aspect providing operation 502 of FIG. 5.

DETAILED DESCRIPTION

Figure 1A:
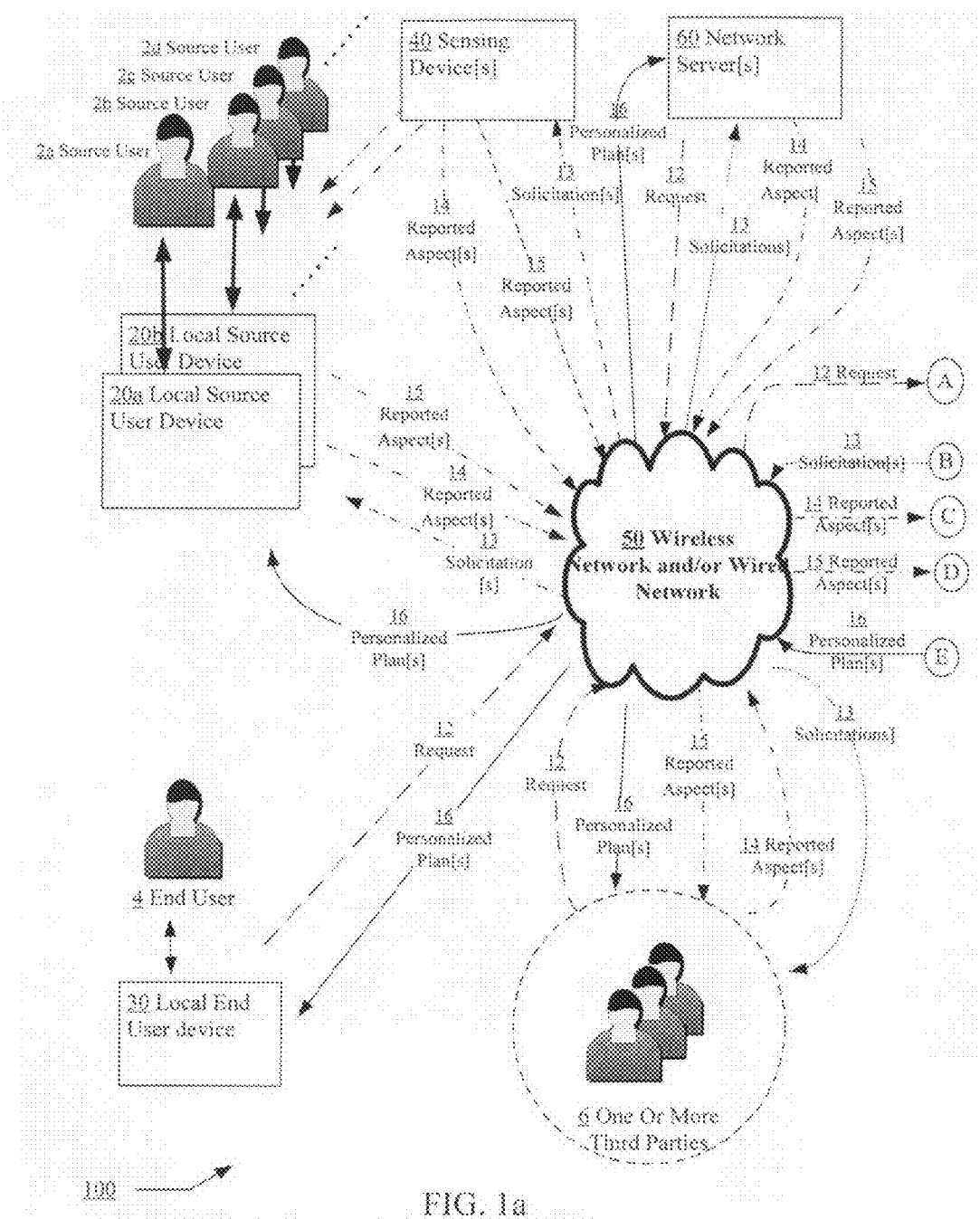
FIGS. 1a and 1b show a high-level block diagram of a server 10 operating in a network environment.

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

A recent trend that has enjoyed explosive popularity in the computing/communication field is to electronically record one's daily activities, behaviors, thoughts, beliefs, traits, physical or mental states, physical characteristics, and other aspects of the person's everyday life onto an open diary. One place where such open diaries are maintained is at social networking sites commonly known as "blogs" where one or more users may report or post every aspect of their daily lives. In brief, an "aspect," as will be referred to herein, may be in reference to any particular act, behavior, characteristic, user state or status, belief, and so forth, associated with a user (e.g., a person including, for example, a network user such as a blogger or a social networking user). The process of reporting or posting blog entries is commonly referred to as "blogging." A newer type of blogging that has become very popular in recent times is microblogging, otherwise known as "twittering" or "tweeting." In microblogging, each of the microblogs that are posted are typically relatively short posts or entries, usually not more than 140 characters long.

Other types of social networking sites may also allow users to maintain open diaries and to allow users to easily update their personal information. Such updates are typically made via, for example, social networking status reports otherwise known simply as "status reports." These social networking sites allow a user to report or post for others to view the latest status or other aspects related to the user.

Another recent tread in social networking is to employ one or more sensors to detect and report on a wide variety of aspects associated with a user. Examples of sensors that may be used for such purposes vary widely, ranging from traditional devices that can detect and report on physiological parameters such as heart rate or blood pressure, to sensors that can detect certain user behaviors or activities such as toilet usage. Although a wealth of personal information provided through log entries (e.g., microblogs, status reports, sensor data, and so forth) are now available through these social networking sites, it is only recently has there been any effort to exploit such potentially useful data.

In various embodiments, methods, systems, circuitry, and computer program products are provided that may facilitate in the development of one or more personalized plans designed to facilitate an end user to achieve one or more target outcomes when one or more emulatable aspects indicated by the one or more personalized plans are emulated. The development of the one or more personalized plans may be by initially providing one or more relevant reported aspects that have been determined to be associated with one or more source users (e.g., model subjects who may have been previously identified) and that have been determined to be relevant to achieving the one or more target outcomes. The one or more personalized plans may then be developed by including into the one or more personalized plans one or more emulatable aspects that corresponds to the one or more relevant reported aspects. The methods, systems, circuitry, and computer program products may be implemented by a variety of computing/communication devices including, for example, by a network device such as a server (e.g., network servers) or a local client device.

In some cases, the development of the one or more personalized plans may be prompted when, for example, a request is received that at least identifies the one or more source users. For example, suppose an end user (or a third party) observes that a particular source user (or a group of source users) has certain desirable traits or characteristics (e.g., target outcomes) that the end user would like to have. In order to acquire such desirable characteristics or target outcomes, the end user may submit a request for a personalized plan to achieve such outcomes. In some cases, the request may only include data that identifies the source user having the desired traits and without identifying the desired traits (e.g., without indicating the target outcomes). As will be further discussed below, various techniques may be employed in order to provide the identity of the source user who may be a complete stranger to the end user (e.g., the end user may have only noticed or come across the source user at a gym or at a doctor's office) without being intrusive. Upon obtaining the identity of the source user, one or more relevant reported aspects that have been determined to be associated with the identified source user and that are determined to be relevant to achieving the target outcomes are provided.

In some embodiments, the one or more relevant reported aspects may be provided by, for example, identifying or finding the one or more relevant reported aspects from a plurality of reported aspects that may or may not include both relevant and non-relevant reported aspects that may or may not be associated with the identified source user. Note that a "reported aspect" may be any indication (e.g., in the form of electronic data such as text data, numerical data, image data, digital data, analog data, etc.) that indicates an occurrence of an aspect (e.g., behavior, act, trait, physical state, mental state, social state, declaration, belief, or any other facet) associated with a particular source user and that has been reported. Various sources may be searched in order to find the one or more relevant reported aspects. For example, a memory (e.g., mass storage, volatile memory, non-volatile memory, and so forth) and/or a wireless and/or wired network may be searched for the one or more reported aspects that are relevant to achieving the target outcomes and that are associated with the identified source user.

Each reported aspect that is determined to be associated with the identified source user and that have been determined to be relevant to achieving the target outcomes may have been at least originally reported by, for example, one or more source users, by one or more sensing devices, and/or by one or more third parties. In some cases, at least a portion of the one or more relevant reported aspects that are found to be associated with the identified source user and that are found to be relevant to the achievement of the target outcomes may have been reported through social networking entries (e.g., microblog entry or status report).

A number of different approaches may be employed in order to provide the one or more relevant reported aspects (e.g., reported aspects that are associated with the identified source user and that are relevant to achieving the one or more target outcomes). For example, in some cases, an operation to provide the one or more relevant reported aspects may involve initially finding or identifying reported aspects that are determined to be at least associated with the identified source user. Once, one or more reported aspects that are determined to be at least associated with at least the one or more source users have been found or identified, one or more reported aspects that are relevant to achieving the one or more target outcomes may be identified from the one or more reported aspects that have been determined to be at least associated with the identified source user.

The "relevancy" of a reported aspect with respect to achieving the target outcomes may be based on one or more factors, which for purposes of this discussion, will be referred to as "relevancy factors." Some relevancy factors that may be determinative in determining whether a reported aspect is relevant includes, for example, whether the reported aspect is a type of aspect that has been indicated by, for example, the end user, a source user, or a third party as being relevant (e.g., cause) for achieving the desired one or more target outcomes. For example, if an end user is interested as to how a particular source user was able to have a very calm temperament, and the end user believes that the source user's calm temperament (e.g., target outcome) is the result of the source user's dietary behavior, then only reported aspects relating to the dietary behaviors of the identified source user may be considered "relevant."

Other relevancy factors may also be factors in determining whether a reported aspect is relevant to the achievement of a target outcome. For example, determining whether a reported aspect indicates an aspect that occurred proximate to the occurrence of a reported aspect that corresponds to a target outcome. Note that when the identified source user has achieved the particular target outcome, the achievement of the target outcome may be indicated in the form of a reported aspect. As an illustration, suppose a source user has lost 30 pounds of body weight, then the weight loss, which may be the target outcome of an end user, may be reported in the form of a reported aspect. The end user, upon observing the weight loss of the source user, may indicate that she is only interested in the exercise activities of the source user because the end user believes that the weight loss was due to the source user's exercise activities. Thus, under this criteria, all reported aspects that are related to exercise activities of the source user may be deemed relevant.

However, not all reported aspects associated with the source user and that are related to exercise activities may be relevant to the achievement of the target outcome if they occurred well before (or after) the occurrence (achievement) of the target outcome. Thus, in some embodiments, a determination may be made as to whether an aspect indicated by a potentially relevant reported aspect occurred within some predefined time period from the occurrence of a reported aspect that corresponds to the target outcome. The predefined time period described above may be based upon the type of target outcome being sought and/or may be provided by the end user, the source user, or by a third party source.

For example, in the above weight loss example, the end user may only be interested in reported aspect (e.g., dietary and/or exercise behaviors) that occurred within one month (e.g., predefined time period) of the occurrences of the reported aspect that corresponds to the target outcome (e.g., body weight loss of 30 pounds). Based on this criteria, only those reported aspects that occurred within one month of the occurrence of the reported aspect (e.g., 30 pounds of body weight loss) that corresponds to the target outcome and that are associated with the identified source user may qualify as being relevant to the achievement of the one or more target outcomes. Of course, and alternatively, third party sources (e.g., content provider or a publication such as research article) may provide the predefined time period based on the type of personalized plan being developed.

Note that a reported aspect that is found to be associated with the source user of interest (e.g., the source user who has been identified by, for example, the end user as having achieved a particular target outcome) and that is found to satisfy a particular relevancy factor may not necessary be a "relevant reported aspect" for achieving the target outcome. That is, there may be several relevancy factors that may need to be satisfied in order for a reported aspect to be determined as a "relevant reported aspect" that is associated with one or more particular source users and that are relevant for achieving one or more target outcomes.

In some embodiments, a personalized plan may merely be a collection of one or more emulatable aspects. An emulatable aspect may be an indication of any behavior, act, trait, physical state, mental state, social state, declaration, belief, or any other facet that may be emulated in order to achieve one or more target outcomes. In cases where a personalized plan includes multiple emulatable aspects, the personalized plan may or may not define a relationship or relationships (e.g., temporal, specific time, or spatial relationships) between the multiple emulatable aspects included in the personalized plan. In some cases, a personalized plan may also indicate one or more emulatable intermediate outcomes that may be associated with the target outcomes.

For example, if a personalized plan includes a plurality of emulatable aspects, one or more emulatable intermediate outcomes may also be included in the personalized plan that may represent one or more outcomes that are preferably or ideally achieved before the target outcome is achieved. In some cases, the emulatable intermediate outcomes that may be included in a personalized plan may be based on, for example, one or more reported aspects (e.g., intermediate outcomes that have been reported). By including one or more emulatable intermediate outcomes into a personalized plan, an end user may be able to better monitor his/her progress towards achieving the one or more target outcomes by comparing his/her actual intermediate results with the one or more emulatable intermediate outcomes that may be included in a personalized plan, A "target outcome" may be any type of goal or desired result that may be sought by an end user or by a third party. Examples of target outcomes include, for example, health-related outcomes such as weight loss or improved cardiovascular conditioning, athletic outcomes such as developing a particular athletic skill including being able to pitch a curve ball or achieving a particular golf handicap, physiological outcomes such as reduced blood pressure or blood glucose levels, social outcomes such as obtaining membership into an elite social club or attaining a particular social status, mental state outcomes such as achieving certain level of calmness or happiness, interpersonal or relational outcomes such as having lots of friends or developing skill to make friends, employment outcomes such as being promoted or developing certain work skills, academic or intellectual outcomes, and so forth.

A source user may be any real or fictitious person who may be associated with one or more reported aspects. In some cases, a source user may be an actual (real) person who may be the source or is associated with one or more reported aspects. In other cases, a source user may be a fictional person such as a composite of multiple "actual" source users. For example, reported aspects indicating actual aspects of a plurality of real source users may be compiled and processed (e.g., normalized or averaged out) in order to create such a fictional source user.

Figure 1B:
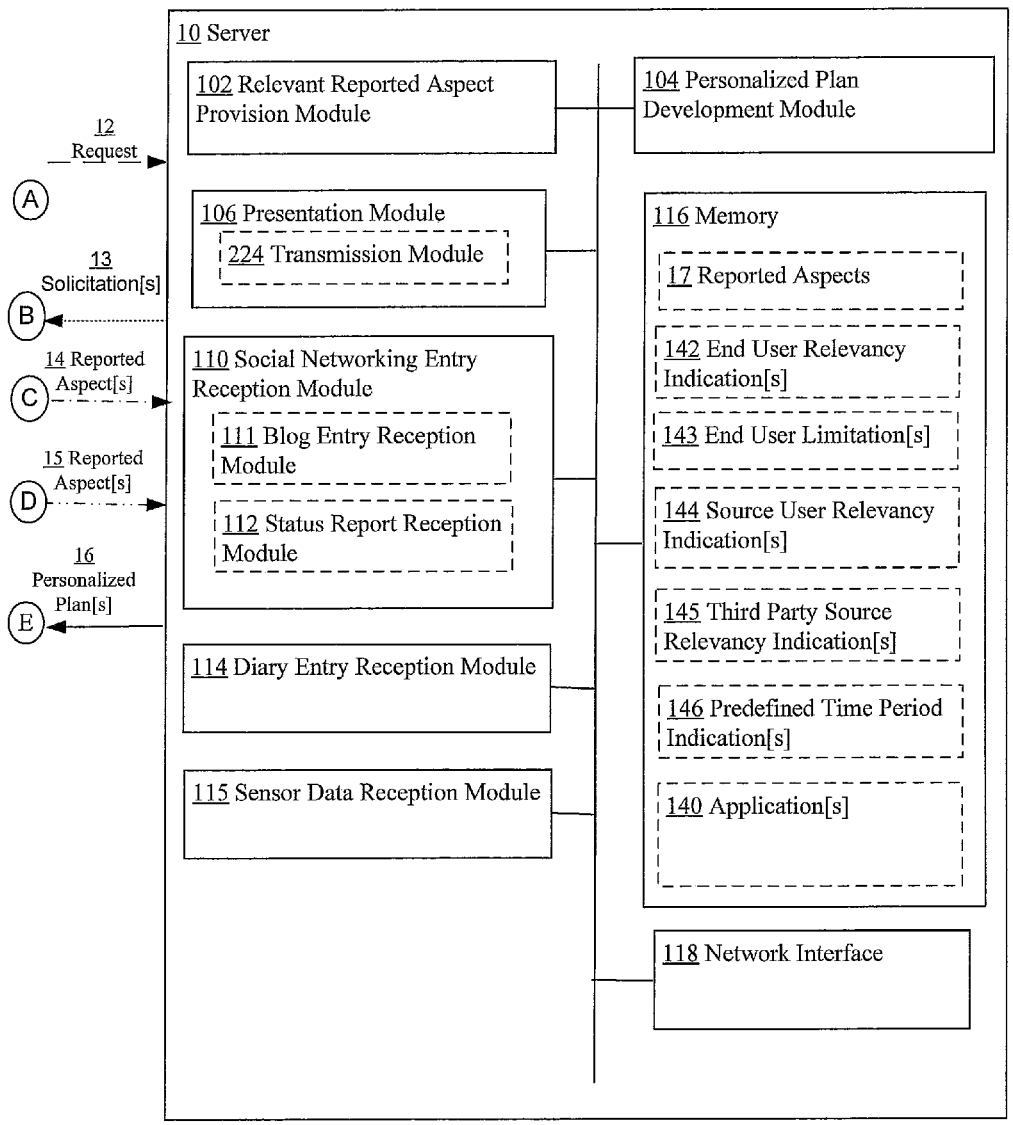
Figure 2A:
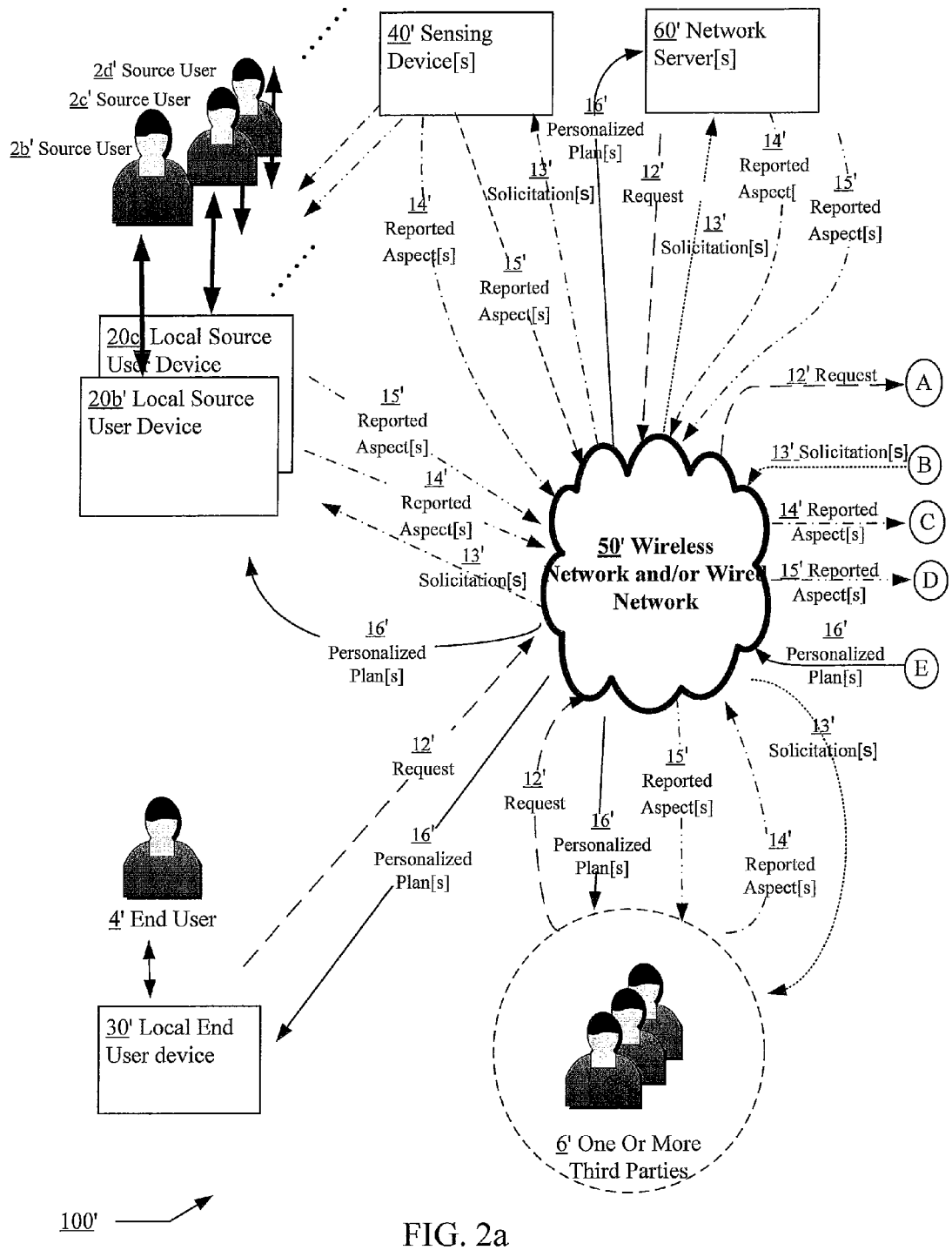
FIGS. 2a and 2b show a high-level block diagram of a local source user device 20' operating in a network environment.
Figure 2B:
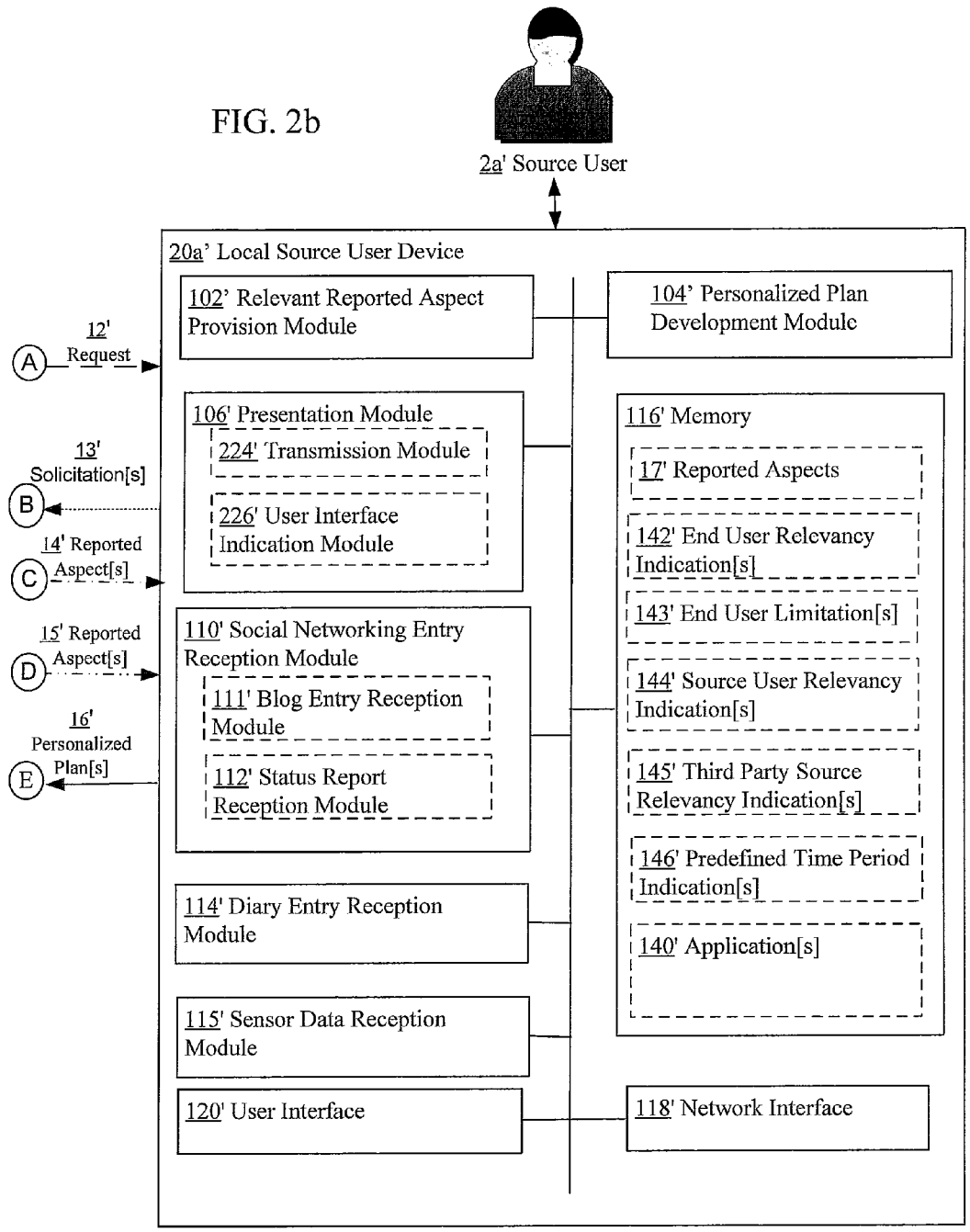
Figure 3A:
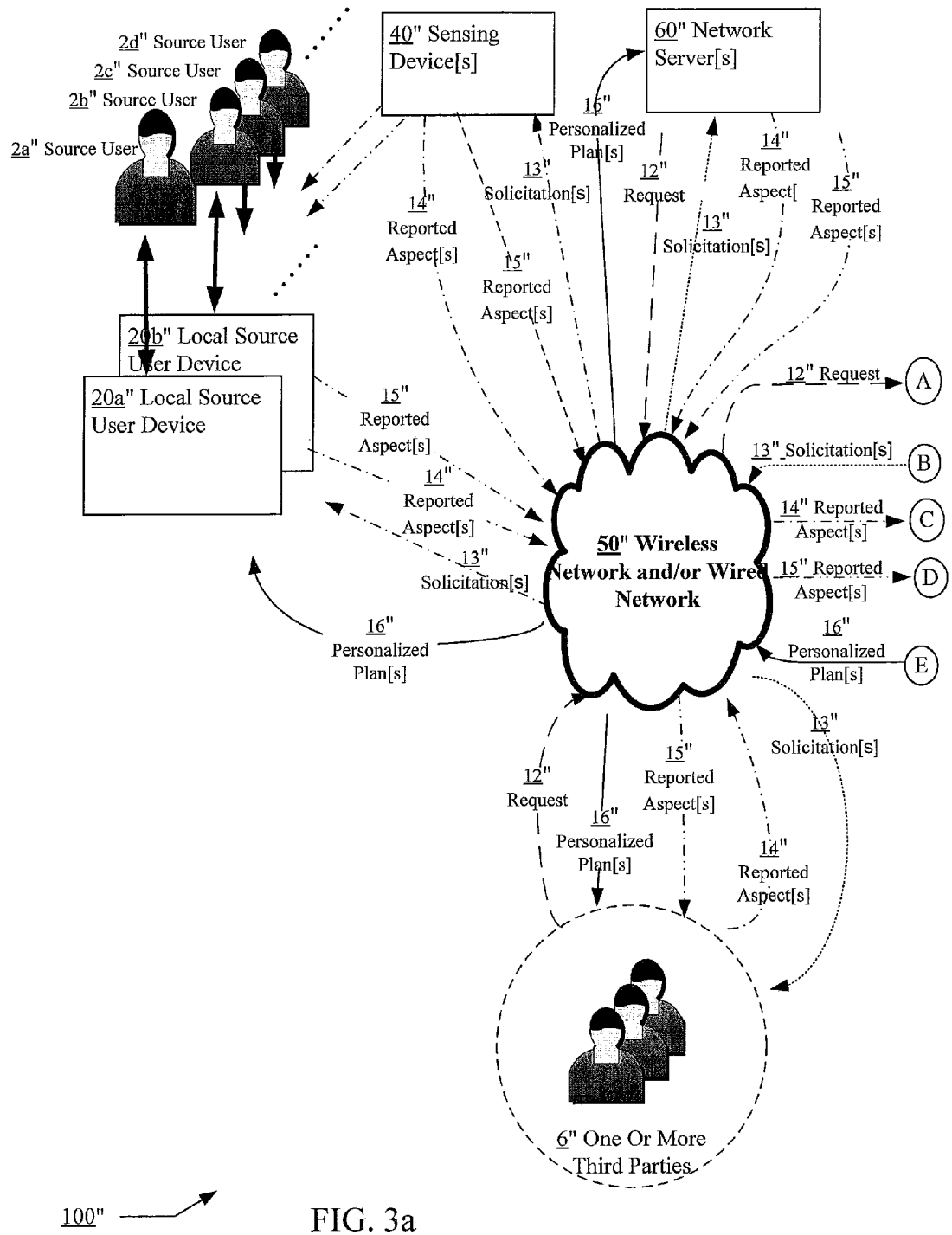
FIGS. 3a and 3b show a high-level block diagram of a local end user device 30" operating in a network environment.
Figure 3B:
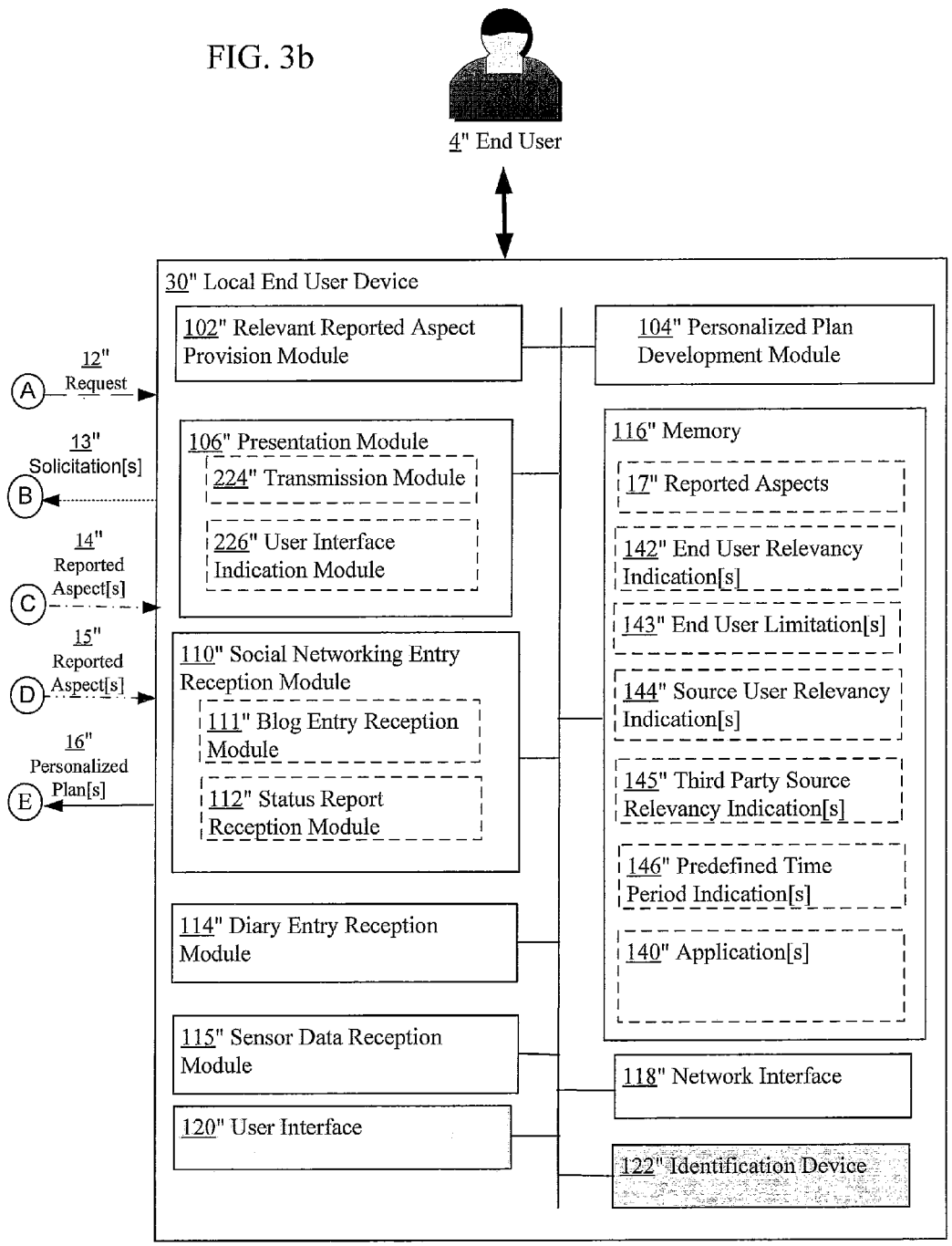

Turning now to FIGS. 1a, 1b, 2a, 2b, 3a, and 3b, illustrating three example environments in which the methods, systems, circuitry, and computer program products in accordance with various embodiments may be implemented by a computing device such as a server or a local client device. In particular, FIGS. 1a and 1b illustrates a first example environment in which the methods, systems, circuitry, and computer program products in accordance with some embodiments may be implemented at a server 10. FIGS. 2a and 2b illustrate a second example environment in which the methods, systems, circuitry, and computer program products in accordance with some embodiments may be implemented at a local source user device 20a'. FIGS. 3a and 3b illustrate a third example environment in which the methods, systems, circuitry, and computer program products in accordance with some embodiments may be implemented at a local end user device 30".

Note that in the following, "*" represents a wildcard. Thus, references in the following description to, for example, a "local end user device 30*" may be in reference to the local end user device 30 of the first example environment of FIGS. 1a and 1b, the local end user device 30' of the second example environment of FIGS. 2a and 2b, or the local end user device 30" of the third example environment of FIGS. 3a and 3b. Similarly, references in the following to a "source user 2**" may be in reference to any one of the one or more source users (e.g., source user 2a, 2b, and so forth) of the first example environment of FIGS. 1a and 1b, to any one of the one or more source users (e.g., source user 2a', 2b', and so forth) of the second example environment of FIGS. 2a and 2b, or to any one of the one or more source users (e.g., 2a", 2b", and so forth) of the third example environment of FIGS. 3a and 3b. In still other cases, references in the following to "a source user 2a*" may be in reference to the source user 2a of FIG. 1a, to the source user 2a' of FIG. 2a, or to the source user 2a" of FIG. 3b.

In various embodiments, the server 10 of FIG. 1b, the local source user device 20a' of FIG. 2b, and the local end user device 30" of FIG. 3b may be designed to, among other things, provide one or more relevant reported aspects associated with one or more source users 2 that are relevant to achieving one or more target outcomes, the providing of the one or more relevant reported aspects being based, at least in part, on the one or more relevant reported aspects' association with the one or more source users 2. After providing the one or more relevant reported aspects, the server 10, the local source user device 20a', and the local end user device 30" may be designed to, among other things, develop one or more personalized plans 16* designed to facilitate an end user 4* to achieve the one or more target outcomes when one or more emulatable aspects indicated by the one or more personalized plans 16* are emulated, the development of the one or more personalized plans 16* being based, at least in part, on the providing of the one or more relevant reported aspects.

As illustrated, in various embodiments the server 10 of FIG. 1b, the local end user device 20a' of FIG. 3b, and the local end user device 30 may be employed in a network environment. For example, the server 10 of the first example environment of FIGS. 1a and 1b, the local source user device 20a* of the second example environment of FIGS. 2a and 2b, and the local end user device 30" of the third example environment of FIGS. 3a and 3b may communicate with other network devices via a wireless network and/or wired network 50* (e.g., at least one of a wireless network and a wired network 50*). In various implementations, the wireless and/or wired network 50 may include at least one of a local area network (LAN), a wireless local area network (WLAN), personal area network (PAN), Worldwide Interoperability for Microwave Access (WiMAX), public switched telephone network (PTSN), general packet radio service (GPRS), cellular networks, and/or other types of wireless and/or wired networks 50*.

Referring particularly now to FIGS. 1a and 1b, which illustrates the first example environment in accordance with various embodiments. Included in the illustrated first environment of FIGS. 1a and 1b is a first exemplary system 100, which includes at least a server 10 (a network server) that may be designed to communicate with one or more source users 2* (via one or more local source user devices 20*) and an end user 4 (via a local end user device 30) through a wireless network and/or wired network 50. In some implementations, the server 10 may further communicate with, via the wireless network and/or wired network 50, one or more third parties 6 (e.g., one or more other end users 4*, one or more content providers, one or more network service providers, and/or one or more other parties), one or more other servers (illustrated as one or more network servers 60), and/or one or more sensing devices 40. As will be further described herein with respect to FIG. 4c, each of the one or more sensing devices 40 may include one or more sensors 240 (one or more sensors 240* of FIG. 4c) that can detect or sense one or more aspects associated with one or more source users 2* (e.g., source user 2a, source user 2b, and so forth), a network interface 242 (e.g., see network interface 242* of FIG. 4c) and/or a memory 244 (see memory 244 of FIG. 4c).

In various implementations, the server 10 of FIG. 1b (as well as the one or more network servers 60* of FIGS. 1a, 2a, and 3b) may be a computing/communication device that is designed to interface with a wireless network and/or wired network 50. Further, the server 10 of FIG. 1b, as will be described herein, may be in reference to a network server that may be located at a single network site or located across multiple network sites or a conglomeration of servers located at multiple network sites.

The one or more source users 2* may include a first source user 2a, a second source user 2b, a third source user 2c, a fourth source user 2d, and so forth. The one or more local source user devices 20* may include a first local source user device 20a (e.g., to be used by the first source user 2a to communicate via wireless network and/or wired network 50), a second local source user device 20b (e.g., to be used by the second source user 2b to communicate via wireless network and/or wired network 50), and so forth. The one or more local source user devices 20* (as well as the one or more local source user devices 20*' of FIGS. 2a and 2b and the one or more local source user devices 20*'' of FIGS. 3a and 3b) and the local end user device 30 (as well as the local end user device 30' of FIGS. 2a and 2b and the local end user device 30'' of FIGS. 3a and 3b) may be any one of a variety of computing/communication devices including, for example, a cellular phone, a personal digital assistant (PDA), a laptop, a desktop, or other types of computing/communication devices.

In some embodiments, the one or more local source user devices 20 (as well as the local source user devices 20*' of FIGS. 2a and 2b and the one or more local source user devices 20*'' of FIG. 3a) and/or the local end user device 30 (as well as the local end user device 30' of FIG. 2a and the local end user device 30'' of FIG. 2b) may be a handheld device such as a cellular telephone, a smartphone, a Mobile Internet Device (MID), an Ultra Mobile Personal Computer (UMPC), a convergent device such as a personal digital assistant (PDA), and so forth. Alternatively, such local client devices (e.g., local source user device 20** and/or local end user device 30*) may be a laptop, a desktop, a workstation, a web tablet, or other types of devices that may not be a handheld device in various alternative implementations.

Referring back to the first exemplary environment of FIGS. 1a and 1b, the server 10 may be designed to receive a request 12 for one or more personalized plans 16 for achieving one or more target outcomes. The one or more requests 12 may be received from an end user 4, from a third party 6, from a source user 2*, or from a network server 60. In various embodiments, the request 12 may at least identify one or more source users 2*, and in some cases, may not identify any of the target outcomes that are associated with the one or more personalized plans 16.

In some embodiments, in response to receiving the request 12, the server 10 may provide one or more relevant reported aspects that are associated with the one or more source users 2* and that are relevant to achieving one or more target outcomes associated with the one or more personalized plans 16, the providing of the one or more relevant reported aspects being based, at least in part, on the one or more relevant reported aspects' association with the one or more source users 2*. There are at least four ways or paths that the server 10 may follow in various alternative embodiments in order to provide the one or more relevant reported aspects that are associated with the one or more source users 2* and that are relevant to achieving one or more target outcomes associated with the one or more personalized plans 16.

In the first path, the server 10 may provide the one or more relevant reported aspects by selectively acquiring (e.g., via the wireless network and/or wired network 50) reported aspects 15 that are associated with the one or more source users 2* and that are relevant to achieving the one or more target outcomes based on one or more relevancy factors (e.g., relevant with respect to satisfying one or more relevancy factors). In other words, selectively acquiring the relevant reported aspects rather than, for example, acquiring randomly reported aspects that may or may not be relevant to achieving the one or more target outcomes.

In the second path, the server 10 may first selectively acquire (e.g., via the wireless network and/or wired network 50) one or more reported aspects 14 that are at least associated with the one or more source users 2*. After acquiring the one or more reported aspects 14 that are at least associated with the one or more source users 2*, the one or more relevant reported aspects that are associated with the one or more source users 2* and that are relevant to achieving the one or more target outcomes (e.g., relevant with respect to one or more relevancy factors) may be identified (e.g., finding or determining) from the one or more reported aspects 14 that have been acquired.

In the third path, the server 10 may first selectively acquire (e.g., via the wireless network and/or wired network 50) one or more reported aspects 15 that are associated with the one or more source users 2* and that are relevant to achieving the one or more target outcomes based on (e.g., with respect to) one or more relevancy factors. After acquiring the one or more reported aspects 15, the one or more relevant reported aspects may be provided by identifying from the one or more reported aspects 15, one or more reported aspects that are relevant to achieving the one or more target outcomes based (e.g., with respect to) on a second one or more relevancy factors.

In the fourth path, it is presumed that a plurality of reported aspects 17 is already in the possession of or is available to the server 10, where the plurality of reported aspects 17 may or may not include both relevant reported aspects that are associated with the one or more source users 2* and that are relevant to achieving the one or more target outcomes, and reported aspects that may not be associated with the one or more source users 2* and/or that are not relevant to achieving the one or more target outcomes. Under such circumstances, the server 10 may be designed to provide the one or more relevant reported aspects by identifying from the plurality of reported aspects 17 one or more reported aspects that are associated with the one or more source users 2* and that are relevant to achieving the one or more target outcomes (e.g., relevant with respect to one or more relevancy factors). In some embodiments, the plurality of reported aspects 17 may be stored in a memory 116.

Note that in some embodiments, the providing of the one or more relevant reported aspects by the server 10 may include the server 10 both identifying the one or more relevant reported aspects in memory 116 and searching for the one or more relevant reported aspects via the wireless network and/or wired network 50. That is, reported aspects (both relevant reported aspects and not relevant aspects) may be found throughout the wireless network and/or wired network 50 and may, in some cases, be found in a memory 116.

If the one or more reported aspects 14 or the one or more reported aspects 15 are to be acquired by the server 10, such as when the server 10 follows the first, the second, or the third path, then the server 10 may be designed to transmit one or more solicitations 13 that may be designed to solicit for the one or more reported aspects 14 or solicit for the one or more reported aspects 15. In some embodiments, the one or more solicitations 13 may be transmitted to one or more local source user devices 20*, one or more third parties 6, one or more sensing devices 40, and/or one or more network servers 60 via the wireless network and/or wired network 50. After transmitting the one or more solicitations 13, the server 10 may be designed to receive the one or more reported aspects 14 that are at least associated with the one or more source users 2* or the one or more reported aspects 15 that are associated with the one or more source users 2* and that are relevant to achieving the one or more target outcomes based on one or more relevancy factors.

After receiving the one or more reported aspects 14 or the one or more reported aspects 15, the server 10 may be designed to identify from the one or more reported aspects 14 or from the one or more reported aspects 15, one or more reported aspects that are relevant for achieving the one or more target outcomes with respect to one or more relevancy factors (e.g., such as the case when the server 10 follows the third path, and the server 10 identifies the one or more reported aspects that are relevant with respect to a second one or more relevancy factors)

In some alternative embodiments, the relevant reported aspects that are associated with the one or more source users 2* and that are relevant to achieving the one or more target outcomes may be part of a plurality of reported aspects 17 that are already in the possession of or already accessible to the server 10 (e.g., such as the case in the fourth path). In such cases, the plurality of reported aspects 17 may or may not include both reported aspects that are associated with the one or more source users 2* and that are relevant to achieving the one or more target outcomes (e.g., relevant reported aspects), and reported aspects that may not be associated with the one or more source users 2* and/or that are not relevant to achieving the one or more target outcomes. In some cases, the plurality of reported aspects 17 may be stored in a memory 116.

Once the one or more relevant reported aspects that are associated with the one or more source users 2* and that are relevant to achieving the one or more target outcomes have been provided (e.g., as acquired and/or identified via the first, the second, the third, or the fourth path), the server 10 may be designed to develop one or more personalized plans 16 that are designed to facilitate an end user 4 to achieve the one or more target outcomes when one or more emulatable aspects indicated by the one or more personalized plans 16 are emulated, the development of the one or more personalized plans 16 being based, at least in part, on the providing of the one or more relevant reported aspects.

In some implementations, a personalized plan 16 may merely be a collection of one or more emulatable aspects, while in other implementations, a personalized plan 16 may define the specific relationships (e.g. spatial or time relationships) between emulatable aspects. In some implementations, a personalized plan 16 may include other information such as emulatable intermediate outcomes to facilitate determining, for example, how well an end user 4 is progressing towards achieving one or more target outcomes of the personalized plan 16 when the one or more emulatable aspects included in the personalized plan 16 are being emulated. In some implementations, the server 10 may then be designed to present the developed one or more personalized plans 16 to the end user 4 (via the local end user device 30), to one or more network servers 60, and/or to one or more third parties 6.

Figure 4A:
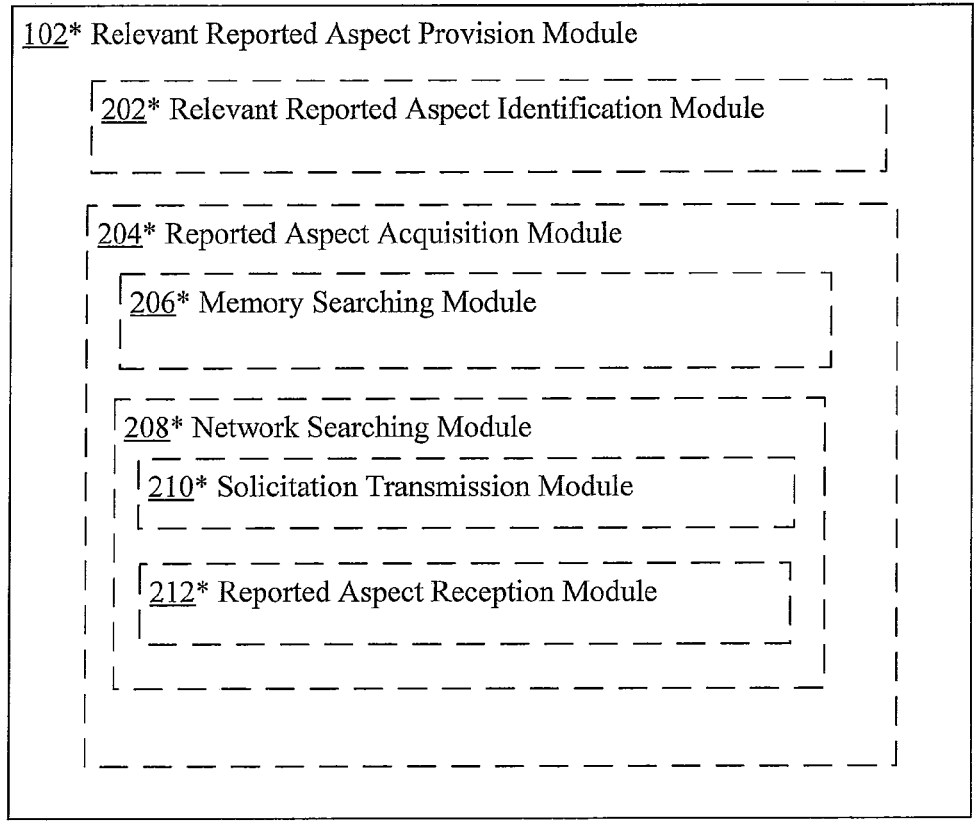
FIG. 4a shows another perspective of the Relevant Reported Aspect Provision Module 102* of the server 10 of FIG. 1b, of the local source user device 20' of FIG. 2b, and of the local end user device 30" of FIG. 3b.

The server 10 as illustrated in FIG. 1b may include a variety of modules, sub-modules, and various other components. As shown, the server 10 may include a relevant reported aspect provision module 102 (which may further include one or more sub-modules as illustrated in FIG. 4a), a personalized plan development module 104 (which may further include one or more sub-modules as illustrated in FIG. 4b), a presentation module 106 (which may further include a transmission module 224), a memory 116 (which may store a plurality of reported aspects 17, one or more end user relevancy indications 142, one or more end user limitations 143, one or more source user relevancy indications 144, one or more third party source relevancy indications 145, one or more predefined time period indications 146, and one or more applications 140), and/or a network interface 118 (e.g., network interface card or NIC). In various embodiments, the server 10 may further include a social networking entry reception module 110 (which may further include a blog entry reception module 111 and/or a status report reception module 112), a diary entry reception module 114, and/or a sensor data reception module 115.

The relevant reported aspect provision module 102 may be configured to, among other things, provide one or more relevant reported aspects based, at least in part, on the one or more relevant reported aspects' association with one or more source users 2*, the one or more relevant reported aspects to be provided being relevant to achieving one or more target outcomes. The personalized plan development module 104 may be configured to, among other things, develop one or more personalized plans 16 based, at least in part, on the one or more relevant reported aspects, the one or more personalized plans 16 to be developed being designed to facilitate an end user 4 to achieve the one or more target outcomes when one or more emulatable aspects indicated by the one or more personalized plans 16 are emulated. The presentation module 106 may be designed to present (e.g., transmit via the wireless network and/or wired network 50 to the local end user device 30, to one or more local source user devices 20*, to one or more network servers 60, and/or to one or more third parties 6) the one or more personalized plans 16 that are developed. A more detailed discussion relating to the relevant reported aspect provision module 102, the personalized plan development module 104, the presentation module 106, and their sub-modules, will be provided below with respect to the various operational flows to be described herein.

The memory. 116 may be designed to store various data including a plurality of reported aspects 17 that may include one or more reported aspects that are relevant to achieving the one or more target outcomes and/or that are associated with the one or more source users 2*. In some cases, the reported aspects 17 stored in memory 116 may include reported aspects that are not relevant to achieving the one or more target outcomes and/or that are not associated with the one or more source users 2*. Other types of data may be stored in the memory 116 including, for example, one or more end user relevancy indications 142 (e.g., one or more indications that indicate the types of reported or emulatable aspects that an end user 4 has an interest in or believes is relevant to achieving the one or more target outcomes), one or more end user limitations 143 (e.g., limitations such as contextual limitations, physical limitations, personal limitations, and so forth, associated with the end user 4 that prevent one or more emulatable aspects from being emulated), and/or one or more source user relevancy indications 144 (e.g., one or more indications provided by a source user 2* that indicate at least which types of reported aspects are relevant to achieving the one or more target outcomes).

In some cases, the memory 116 may also include, for example, one or more third party source relevancy indications 145 (e.g., one or more indications provided by one or more third party sources such as one or more third parties 6 that indicate at least which types of reported aspects are relevant to achieving the one or more target outcomes), one or more predefined time period indications 146 (e.g., one or more indications that indicate at least one time period such as a time increment or window, a reported aspect being relevant for achieving at least one target outcome only if the reported aspect indicate an aspect that occurred within the at least one time period from an occurrence of the target outcome as successfully achieved by, for example, a source user 2*), and/or one or more applications 140 (e.g., a text messaging application, an instant messaging application, an email application, a voice recognition system, a Web 1.0 application, and/or Web 2.0 application to facilitate in communicating via, for example, the World Wide Web). In various implementations, the memory 116 comprises one or more of a mass storage device, a read-only memory (ROM), a programmable read-only memory (PROM), an erasable programmable read-only memory (EPROM), a cache memory such as random access memory (RAM), a flash memory, a synchronous random access memory (SRAM), a dynamic random access memory (DRAM), and/or other types of memory devices.

The social networking entry reception module 110 may be configured to receive social networking entries from one or more sources including, for example, from one or more source users 2*, an end user 4, one or more third parties 6, and/or one or more network servers 60. The social networking entry reception module 110 may further include a blog entry reception module 111 for receiving blog entries (e.g. microblog entries) and/or a status report reception module 112 for receiving social networking status reports. The diary entry reception module 114 may be configured to receive diary entries from, for example, the one or more source users 2*, the end user 4, and/or from the one or more third parties 6 (e.g., a non-user). The sensor data reception module 115 may be configured to receive sensing data from one or more sensing devices 40.

Referring now to FIGS. 2a and 2b, which as previously indicated, illustrates a second example environment in which the methods, systems, circuitry, and computer program products in accordance with various embodiments may be implemented at a local source user device 20' rather than at a server 10 as was the case in the first example environment of FIGS. 1a and 1b. As illustrated, the second example environment of FIGS. 2a and 2b is similar to the first example environment of FIGS. 1a and 1b.

In general, the second example environment of FIGS. 2a and 2b may include a second exemplary system 100', which includes at least a local source user device 20a' (see FIG. 2b). In various implementations, the local source user device 20a', as was the case for server 10 of FIGS. 1a and 1b, may be designed to receive a request 12' for one or more personalized plans 16' that are designed to facilitate an end user 4' to achieve one or more target outcomes when one or more emulatable aspects included in the one or more personalized plans 16' are emulated. The one or more requests 12' may be received from an end user 4', from a third party 6', from a network server 60', or from a source user 2a' (e.g., via user interface 120'). In various embodiments, the request 12' may at least identify one or more source users 2*', and in some cases, may not identify any target outcomes associated with the one or more personalized plans 16'.

In response to receiving the request 12' the local source user device 20' may be designed to provide one or more relevant reported aspects that are associated with the one or more source users 2*' and that are relevant to achieving one or more target outcomes, the providing of the one or more relevant reported aspects being based, at least in part, on the one or more relevant reported aspects' association with the one or more source users 2*'. Similar to the server 10 of FIG. 1b, the local source user device 20a' may follow any one of four alternative paths in various alternative embodiments in order to provide the one or more relevant reported aspects that are associated with the one or more source users 2*' and that are relevant to achieving one or more target outcomes associated with the one or more personalized plans 16'.

As was the case with the server 10 of FIG. 1b, in the first path, the local source user device 20a' may provide the one or more relevant reported aspects by selectively acquiring (e.g., via the wireless network and/or wired network 50') reported aspects 15' that are associated with the one or more source users 2*' and that are relevant to achieving the one or more target outcomes based on one or more relevancy factors (e.g., relevant with respect to satisfying one or more relevancy factors).

In the second path, the local source user device 20a' may initially selectively acquire (e.g., via the wireless network and/or wired network 50') one or more reported aspects 14' that are at least associated with the one or more source users 2*'. After acquiring the one or more reported aspects 14' that are at least associated with the one or more source users 2*', the one or more relevant reported aspects that are associated with the one or more source users 2*' and that are relevant to achieving the one or more target outcomes (e.g., relevant with respect to one or more relevancy factors) may be identified (e.g., finding or determining) from the one or more reported aspects 14' that have been acquired.

In the third path, the local source user device 20a' may first selectively acquire (e.g., via the wireless network and/or wired network 50') one or more reported aspects 15' that are associated with the one or more source users 2*' and that are relevant to achieving the one or more target outcomes based on (e.g., with respect to) one or more relevancy factors. After acquiring the one or more reported aspects 15', the one or more relevant reported aspects may be provided by identifying from the one or more reported aspects 15', one or more reported aspects that are relevant to achieving the one or more target outcomes based (e.g., with respect to) on a second one or more relevancy factors.

In the fourth path, it is presumed that a plurality of reported aspects 17' may already be in the possession of or may already be available to the local source user device 20a', where the plurality of reported aspects 17' may include both relevant reported aspects that are associated with the one or more source users 2*' and that are relevant to achieving the one or more target outcomes, and reported aspects that may not be associated with the one or more source users 2*' and/or that are not relevant to achieving the one or more target outcomes. Under such circumstances, the local source user device 20a' may be designed to provide the one or more relevant reported aspects by identifying from the plurality of reported aspects 17' one or more reported aspects that are associated with the one or more source users 2*' and that are relevant to achieving the one or more target outcomes (e.g., relevant with respect to one or more relevancy factors). In some embodiments, the plurality of reported aspects 17' may be stored in a memory 116'.

As with the server 10 of FIG. 1b, the providing of the one or more relevant reported aspects by the local source user device 20a' may include the local source user device 20a' both identifying the one or more relevant reported aspects in memory 116' and searching for the one or more relevant reported aspects via the wireless network and/or wired network 50'.

If the one or more reported aspects 14' or the one or more reported aspects 15' are to be acquired by the local source user device 20a', such as when the local source user device 20a' follows the first, the second, or the third path, then the local source user device 20a' may be designed to transmit one or more solicitations 13' that may be designed to solicit for the one or more reported aspects 14' or for the one or more reported aspects 15'. In some embodiments, the one or more solicitations 13' may be transmitted to one or more other local source user devices 20*' (e.g., local source user device 20b', local source user device 20c', and so forth), one or more third parties 6', one or more sensing devices 40', and/or one or more network servers 60' via the wireless network and/or wired network 50'. After transmitting the one or more solicitations 13', the local source user device 20a' may be designed to receive the one or more reported aspects 14' that are at least associated with the one or more source users 2*' or the one or more reported aspects 15' that are associated with the one or more source users 2*' and that are relevant to achieving the one or more target outcomes based on one or more relevancy factors.

After receiving the one or more reported aspects 14' or the one or more reported aspects 15', the local source user device 20a' may be designed to identify from the one or more reported aspects 14' or from the one or more reported aspects 15', one or more reported aspects that are relevant for achieving the one or more target outcomes with respect to one or more relevancy factors (e.g., in the case where the local source user device 20a' follows the third path, the local source user device 20a' identifying the one or more reported aspects that are relevant with respect to a second one or more relevancy factors).

In the case where the relevant reported aspects that are associated with the one or more source users 2*' and that are relevant to achieving the one or more target outcomes are already in the possession of or are already readily accessible to the local source user device 20a' (e.g., such as the case when the local source user device 20a' follows the fourth path), the one or more relevant reported aspects may be part of a plurality of reported aspect 17' that may already be in the possession (e.g., stored in the memory 116') of the local source user device 20a'. In various embodiments, the plurality of reported aspects 17' may include both reported aspects that are associated with the one or more source users 2*' and that are relevant to achieving the one or more target outcomes (e.g., relevant reported aspects), and reported aspects that may not be associated with the one or more source users 2*' and/or that are not relevant to achieving the one or more target outcomes. In some cases, the plurality of reported aspects 17' may be stored in a memory 116'.

Once the one or more relevant reported aspects that are associated with the one or more source users 2*' and that are relevant to achieving the one or more target outcomes have been provided (e.g., as acquired and/or identified via the first, the second, the third, or the fourth path), the local source user device 20a' may be designed to develop one or more personalized plans 16' that are designed to facilitate an end user 4' to achieve the one or more target outcomes when one or more emulatable aspects indicated by the one or more personalized plans 16' are emulated, the development of the one or more personalized plans 16' being based, at least in part, on the providing of the one or more relevant reported aspects.

The local source user device 20a', as illustrated in FIG. 2b, may include the same or similar modules, sub-modules, and components included in the server 10 of FIG. 1b. As illustrated, the local source user device 20a' may include a relevant reported aspect provision module 102' (which may further include one or more sub-modules as illustrated in FIG. 4a), a personalized plan development module 104' (which may further include one or more sub-modules as illustrated in FIG. 4b), a presentation module 106' (which may further include a transmission module 224'), a memory 116' (which may store a plurality of reported aspects 17', one or more end user relevancy indications 142', one or more end user limitations 143', one or more source user relevancy indications 144', one or more third party source relevancy indications 145', one or more predefined time period indications 146', and one or more applications 140'), and/or a network interface 118' (e.g., NIC), similar to the server 10 of FIG. 1b.

Also similar to server 10 of FIG. 1b, the local source user device 20a' may also include a social networking entry reception module 110' (which may further include a blog entry reception module 111' and/or a status report reception module 112'), a diary entry reception module 114', and/or a sensor data reception module 115'. All of these modules, sub-modules, and other components of the local source user device 20a' may perform the same or similar functions as their counterparts that may be included in the server 10 of FIG. 1b. In addition to these modules, sub-modules, and components, the local source user device 20' may include a user interface 120' and a user interface indication module 226' (which may be included with the presentation module 108'). The user interface indication module 226' may be designed to indicate, for example, the one or more personalized plans 16' via the user interface 120'. The user interface 120' may include one or more of, for example, a display monitor, a touchscreen, a keyboard, a keypad, a mouse, an audio system including one or more speakers, a microphone, an image capturing device such as a digital camera, and so forth.

Turning now to FIGS. 3a and 3b, which as previously indicated, illustrates a third example environment in which the methods, systems, circuitry, and computer program products in accordance with various embodiments may be implemented at a local end user device 30" rather than at a server 10" or at a local source user device 20a" as was the case in the first and second example environments of FIGS. 1a and 1b and FIGS. 2a and 2b. The third example environment of FIGS. 3a and 3b is similar to the first example environment of FIGS. 1a and 1b and the second example environment of FIGS. 2a and 2b with few minor differences.

For example, in the third example environment, the local end user device 30" may receive a request 12" for the one or more personalized plans 16" directly from an end user 4" via a user interface 120" rather than via the wireless network and/or wired network 50" as was the case for the server 10 of the first example environment of FIGS. 1a and 1b and as was the case for the local source user device 20a' of the second example environment of FIGS. 2a and 2b. However, and as with the server 10 and the local source user device 20a' of FIGS. 1b and 2b, the local end user device 30" may also alternatively receive a request 12" from other sources such as from one or more third parties 6" or from a network server 60" via the wireless network and/or wired network 50".

As illustrated, the third example environment of FIGS. 3a and 3b may include a third exemplary system 100", which includes at least a local end user device 30" (see FIG. 3b). In general, the local end user device 30" may be designed to receive a request 12" for one or more personalized plans 16" that are designed to facilitate an end user 4" to achieve one or more target outcomes when one or more emulatable aspects included in the one or more personalized plans 16" are emulated. In some implementations, the request 12" may be received directly from the end user 4" via a user interface 120". Alternatively, and although not depicted, the request 12" may be received via wireless network and/or wired network 50" from, for example, one or more third parties 6" or from a network server 60". As before in the first and second exemplary environments, the request 12" may identify one or more source users 2*" in various implementations. Also as before, in some implementations, the request 12" may not identify any target outcomes.

In response to receiving the request 12", the local end user device 30" may be designed to provide one or more relevant reported aspects that are associated with the one or more source users **2\*''' and that are relevant to achieving one or more target outcomes, the providing of the one or more relevant reported aspects being based, at least in part, on the one or more relevant reported aspects' association with the one or more source users 2\*'''. Similar to the server 10 of FIG. 1***b* and the local source user device 20*a*' of FIG. 2*b*, the local end user device 30" may follow any one of four alternative paths in various alternative implementations in order to provide for the one or more relevant reported aspects that are associated with the one or more source users **2\*''' and that are relevant to achieving one or more target outcomes associated with the one or more personalized plans 16"**.

As was the case with the server 10 of FIG. 1*b* and with the local source user device 20*a*' of FIG. 2*b*, in the first path, the local end user device 30" may provide the one or more relevant reported aspects by selectively acquiring (e.g., via the wireless network and/or wired network 50") reported aspects 15" that are associated with the one or more source users **2\*'''** and that are relevant to achieving the one or more target outcomes based on one or more relevancy factors (e.g., relevant with respect to satisfying one or more relevancy factors).

In the second path, the local end user device 30" may initially selectively acquire (e.g., via the wireless network and/or wired network 50") one or more reported aspects 14" that are at least associated with the one or more source users **2\*'''. After acquiring the one or more reported aspects 14" that are at least associated with the one or more source users 2\*''', the one or more relevant reported aspects that are associated with the one or more source users 2\*''' and that are relevant to achieving the one or more target outcomes (e.g., relevant with respect to one or more relevancy factors) may be identified (e.g., finding or determining) from the one or more reported aspects 14"** that have been acquired.

In the third path, the local end user device 30" may first selectively acquire (e.g., via the wireless network and/or wired network 50") one or more reported aspects 15" that are associated with the one or more source users **2\*''' and that are relevant to achieving the one or more target outcomes based on (e.g., with respect to) one or more relevancy factors. After acquiring the one or more reported aspects 15", the one or more relevant reported aspects may be provided by identifying from the one or more reported aspects 15"**, one or more reported aspects that are relevant to achieving the one or more target outcomes based (e.g., with respect to) on a second one or more relevancy factors.

In the fourth path, it is presumed that a plurality of reported aspects 17" may already be in the possession of or may already be available to the local end user device 30", where the plurality of reported aspects 17" may include both relevant reported aspects that are associated with the one or more source users 2\* and that are relevant to achieving the one or more target outcomes, and reported aspects that may not be associated with the one or more source users **2\*''' and/or that are not relevant to achieving the one or more target outcomes. Under such circumstances, the local end user device 30" may be designed to provide the one or more relevant reported aspects by identifying from the plurality of reported aspects 17" one or more reported aspects that are associated with the one or more source users 2\*''' and that are relevant to achieving the one or more target outcomes (e.g., relevant with respect to one or more relevancy factors). In some embodiments, the plurality of reported aspects 17" may be stored in a memory 116"**.

As with the server 10 of FIG. 1*b* and the local source user device 20*a*' of FIG. 2*b*, the providing of the one or more relevant reported aspects by the local end user device 30" may include the local end user device 30" both identifying the one or more relevant reported aspects in memory 116" and searching for the one or more relevant reported aspects via the wireless network and/or wired network 50".

If the one or more reported aspects 14" or the one or more reported aspects 15" are to be acquired by the local end user device 30", such as when the local end user device 30" follows the first, the second, or the third path, then the local end user device 30" may be designed to transmit one or more solicitations 13" that may be designed to solicit for the one or more reported aspects 14" or for the one or more reported aspects 15". In some embodiments, the one or more solicitations 13" may be transmitted to one or more local source user devices **20\*''', one or more third parties 6", one or more sensing devices 40", and/or one or more network servers 60" via the wireless network and/or wired network 50". After transmitting the one or more solicitations 13", the local end user device 30" may be designed to receive the one or more reported aspects 14" that are at least associated with the one or more source users 2\*''' or the one or more reported aspects 15" that are associated with the one or more source users 2\*'''** and that are relevant to achieving the one or more target outcomes based on one or more relevancy factors.

After receiving the one or more reported aspects 14" or the one or more reported aspects 15", the local end user device 30" may be designed to identify from the one or more reported aspects 14" or from the one or more reported aspects 15", one or more reported aspects that are relevant for achieving the one or more target outcomes with respect to one or more relevancy factors (in the case where the local end user device 30" follows the third path, the local end user device 30" identifying the one or more reported aspects that are relevant with respect to a second one or more relevancy factors).

In the case where the relevant reported aspects that are associated with the one or more source users **2\*''' and that are relevant to achieving the one or more target outcomes are already in the possession of or are already readily accessible to the local end user device 30" (e.g., such as the case when the local end user device 30" follows the fourth path), the one or more relevant reported aspects may be part of a plurality of reported aspect 17" that may already be in the possession (e.g., stored in the memory 116") of the local end user device 30". In various embodiments, the plurality of reported aspects 17" may include both reported aspects that are associated with the one or more source users 2\*''' and that are relevant to achieving the one or more target outcomes (e.g., relevant reported aspects), and reported aspects that may not be associated with the one or more source users 2\*''' and/or that are not relevant to achieving the one or more target outcomes. In some cases, the plurality of reported aspects 17" may be stored in a memory 116"**.

Once the one or more relevant reported aspects that are associated with the one or more source users **2\*''' and that are relevant to achieving the one or more target outcomes have been provided (e.g., as acquired and/or identified via the first, the second, the third, or the fourth path), the local end user device 30" may be designed to develop one or more personalized plans 16" that are designed to facilitate an end user 4" to achieve the one or more target outcomes when one or more emulatable aspects indicated by the one or more personalized plans 16" are emulated, the development of the one or more personalized plans 16"** being based, at least in part, on the providing of the one or more relevant reported aspects.

In various implementations, the local end user device 30" as illustrated in FIG. 3*b* may include the same or similar modules, sub-modules, and components included in the local source user device 20a' of FIG. 2b. For example, the local end user device 30" may include a relevant reported aspect provision module 102" (which may further include one or more sub-modules as illustrated in FIG. 4a), a personalized plan development module 104" (which may further include one or more sub-modules as illustrated in FIG. 4b), a presentation module 106" (which may further include a transmission module 224" and a user interface indication module 226"), a memory 116" (which may store a plurality of reported aspects 17", one or more end user relevancy indications 142", one or more end user limitations 143", one or more source user relevancy indications 144", one or more third party source relevancy indications 145", one or more predefined time period indications 146", and one or more applications 140"), and/or a network interface 118" (e.g., NIC), similar to the local source user device 20a' of FIG. 2b.

Also similar to the local source user device 20a' of FIG. 2b, the local end user device 30" may also include a social networking entry reception module 110" (which may further include a blog entry reception module 111" and/or a status report reception module 112"), a diary entry reception module 114", and/or a sensor data reception module 115". All of these modules, sub-modules, and components of the local end user device 30" may perform the same or similar functions as their counterparts that may be included in the local source user device 20a' of FIG. 2b. In addition to these modules, sub-modules, and components, the local end user device 30" may include an identification device 122" for providing data to identify one or more source users 2*". Such data may be in the form of, for example, audio data, image data, RFID data, text or numerical data, or other types of identification data that facilitate in the identification of the one or more source users 2*". The user interface 120" may include one or more of, for example, a display monitor, a touchscreen, a keyboard, a keypad, a mouse, an audio system including one or more speakers, a microphone, an image capturing device such as a digital camera, and so forth.

FIG. 4a illustrates particular implementations of the relevant reported aspect provision module 102* (e.g., the relevant reported aspect provision module 102, the relevant reported aspect provision module 102', and the relevant reported aspect provision module 102") of FIGS. 1b, 2b, and 3b. As illustrated, the relevant reported aspect provision module 102* may include, in various implementations, one or more sub-modules. For example, in some implementations, the relevant reported aspect provision module 102* may include a relevant reported aspect identification module 202* that is configured to, among other things, identify (e.g., from a plurality of reported aspects 17*) one or more reported aspects 14* that are at least associated with one or more source users 2, the identification being based, at least in part, on the one or more source users 2 association with the one or more reported aspects. Alternatively, or in the same implementations, the relevant reported aspect identification module 202* may be configured to identify one or more reported aspects 15* that are associated with the one or more source users 2** and that are relevant to achieving one or more target outcomes, the one or more reported aspects 15* being relevant based on, or with respect to, one or more relevancy factors (e.g., the one or more reported aspects 15* indicate one or more aspects that occurred proximate or within one or more predefined time periods from the one or more occurrences of one or more target outcomes as achieved by, for example, the one or more source users 2**).

In the same implementations or different implementations, the relevant reported aspect provision module 102* may include a relevant aspect acquisition module 204* that is configured to, among other things, acquire one or more reported aspects 14* that are at least associated with one or more source users 2** who may have been previously identified or specified. In the same or different implementations, the relevant reported aspect acquisition module 204* may be configured to acquire one or more reported aspects 15* that are associated with the one or more source users 2** and that are relevant to achieving one or more target outcomes based on (e.g., with respect to) one or more relevancy factors (e.g., relevancy based on indications provided by the end user 4*, one or more source users 2**, and/or one or more third party sources).

The reported aspect acquisition module 204* may further include one or more sub-modules in various alternative implementations. For example, in some implementations, the reported aspect acquisition module 204* may include a memory searching module 206* that is configured to, among other things, search a memory 116* for one or more reported aspects 14* that are at least associated with the one or more source users 2** or for one or more reported aspects 15* that are associated with the one or more source users 2** and that are relevant to achieving one or more target outcomes based on (e.g., with respect to) one or more relevancy factors.

In the same or different implementations, the reported aspect acquisition module 204* may include a network searching module 208* that is configured to, among other things, search for the one or more reported aspects 14* that are at least associated with the one or more source users 2** or for the one or more reported aspects 15* that are associated with the one or more source users 2** and that are relevant to achieving one or more target outcomes based on one or more relevancy factors via at least one of a wireless network and a wired network 50*. The network searching module 208*, in turn, may further include one or more additional sub-modules.

For example, in some implementations, the network searching module 208* may include a solicitation transmission module 210* for transmitting, via the at least one of the wireless network and the wired network 50, one or more solicitations 13* for the one or more reported aspects 14* that are at least associated with the one or more source users 2** or for the one or more reported aspects 15* that are associated with the one or more source users 2** and that are relevant to achieving one or more target outcomes based on one or more relevancy factors. The solicitations 13* may be transmitted to a variety of network devices including, for example, one or more local source user devices 20*, one or more network servers 60*, one or more sensing devices 40*, one or more third parties 6*, and so forth. In the same or different implementations, the network searching module 208* may include a reported aspect reception module 212* that is configured to receive, for example, the one or more reported aspects 14* that are at least associated with the one or more source users 2** and/or the one or more reported aspects 15* that are associated with the one or more source users 2** and that are relevant to achieving one or more target outcomes based on one or more relevancy factors.

FIG. 4b illustrates particular implementations of the personalized plan development module 104* (e.g., the personalized plan development module 104, the personalized plan development module 104', and the personalized plan development module 104") of FIGS. 1b, 2b, and 3b. As previously indicated, the personalized plan development module 104* may be configured to develop one or more personalized plans 16* that are designed to facilitate an end user 4* to achieve one or more target outcomes when one or more emulated aspects included in the one or more personalized plans 16* are emulated, the development of the one or more personalized plans 16* being based on one or more relevant reported aspects that are provided by the relevant reported aspect provision module 102*.

In various implementations, the personalized plan development module 104* may include one or more of an emulatable aspect inclusion module 220*, a relationship defining module 222*, an emulatable intermediate outcome inclusion module 223*, a limitation compliance determination module 224* (which may further include a non-compliance notification module 226* and/or a personalized plan modification module 228*), and/or a plausible determination module 230* (which may further include an action module 232* that may further include a not plausible notification module 234* and/or personalized plan modification module 236*).

The emulatable aspect inclusion module 220* may be configured to include into each of the one or more personalized plans 16* to be developed one or more emulatable aspects that correspond to the one or more relevant reported aspects provided by the relevant reported aspect provision module 102*. The relationship defining module 222* may be configured to define in each of the one or more personalized plans 16* to be developed one or more relationships (e.g., spatial, temporal, and/or specific time relationships) between the plurality of emulatable aspects that may be included in each of the one or more personalized plans 16*. The emulatable intermediate outcome inclusion module 223* may be configured to, among other things, include into at least one of the one or more personalized plans 16* to be developed one or more emulatable intermediate outcomes (e.g., lower systolic BP pressure by 10 mmHg) related to the one or more target outcomes (e.g., lower systolic BP pressure by 20 mmHg) of the at least one of the one or more personalized plans 16*.

The limitation compliance determination module 224* may be configured to determine whether the one or more emulatable aspects to be included in the one or more personalized plans 16 complies with one or more limitations associated with the end user 4*, and if not compliant, execute one or more actions. Various types of actions may be executed if a determination is made of non-compliance. For example, in some implementations, the limitation compliance determination module 224* may include a non-compliance notification module 226* that is configured to notify (e.g., notifying by transmitting a notification or by indicating via a user interface 120*) at least one of the end user 4* and a third party 6* regarding non-compliance of the one or more emulatable aspects in response to a determination of non-compliance with the one or more limitations associated with the end user 4*. Other types of actions may also be executed. For example, in some implementations, the limitation compliance determination module 224* may include a personalized plan modification module 228* that is configured to modify the one or more personalized plans 16* including replacing one or more emulatable aspects that have been determined not to be in compliance with the one or more limitations associated with the end user 4* with one or more replacement emulatable aspects that does comply with the one or more limitations associated with the end user 4*.

The plausible determination module 230*, in contrast to the limitation compliance determination module 224*, may be configured to determine whether at least one of the one or more emulatable aspects to be included in the one or more personalized plans 16* is a plausible aspect that has been successfully emulated by one or more third parties 6* (e.g., other end users), and if not plausible, execute one or more actions. Various types of actions may be executed if a determination is made of non-compliance.

For example, in some implementations, the plausible determination module 230* may include a not plausible notification module 234* that is configured to notify, in response to determining that the at least one of the one or more emulatable aspects to be included in the one or more personalized plans 16* is not a plausible aspect, at least one of the end user 4* and a third party 6* regarding the determination that the at least one of the one or more emulatable aspects to be included in the one or more personalized plans 16* is not a plausible aspect. Note that a plausible aspect is an aspect that has been successfully emulated by one or more third parties 6* in order to, for example in some cases, achieve the one or more target outcomes.

Other types of actions may also be executed when one or more emulatable aspects that may be included in the one or more personalized plans 16* have been determined to be not plausible. For example, in some implementations, the plausible determination module 230* may include a personalized plan modification module 236* that is configured to modify, in response to a determination that at least one of the one or more emulatable aspects included in the one or more personalized plans 16* is not a plausible aspect, at least one of the one or more personalized plans 16* by replacing the at least one of the one or more emulatable aspects determined to be not a plausible aspect with at least one replacement emulatable aspect that is a plausible aspect that has been successfully emulated by one or more third parties 6*.

Figure 4C:
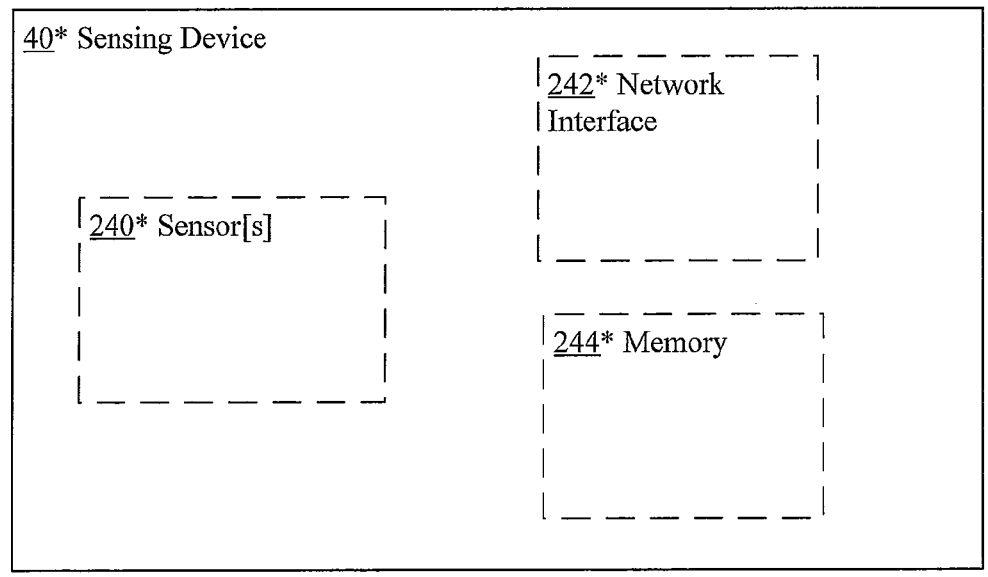
FIG. 4c shows one perspective of one of the Sensing Devices 40* of the first exemplary environment of FIGS. 1a and 1b, of the second exemplary environment of FIGS. 2a and 2b, and of the third exemplary environment of FIGS. 3a and 3b.
Figure 4B:
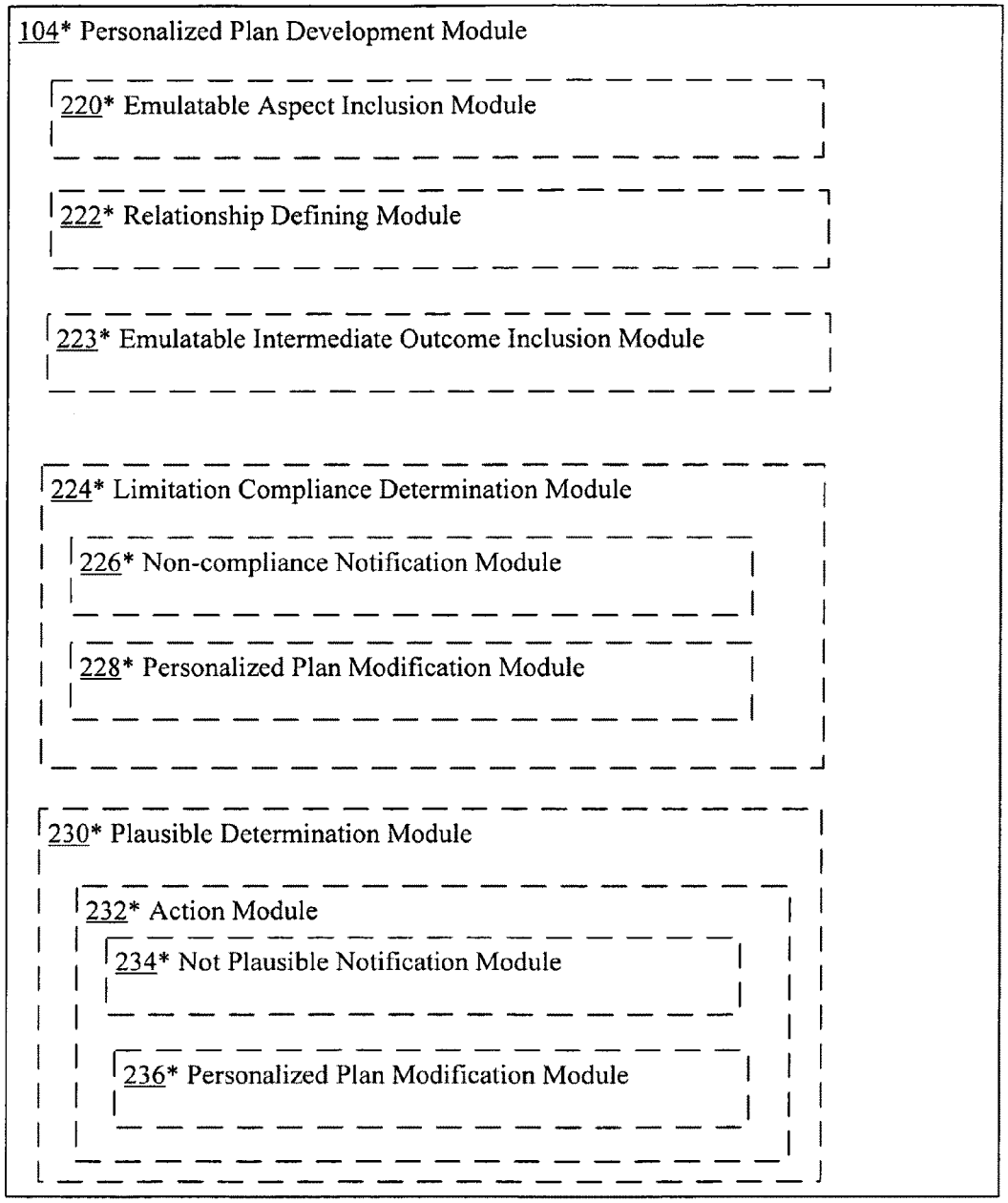
FIG. 4b shows another perspective of the Personalized Plan Development Module 104* of the server 10 of FIG. 1b, of the local source user device 20' of FIG. 2b, and of the local end user device 30" of FIG. 3b.

Referring now to FIG. 4c illustrating one of the sensing devices 40* of FIGS. 1a, 2a, and 3a. The sensing device 40*, in various embodiments, may include at least one or more sensors 240*. The one or more sensors 240* that may be included in a sensing device 40* may be designed to sense or detect one or more aspects associated with a source user 2**. For example, in various implementations, the one or more sensors 240* may include one or more devices that can monitor a user's physiological characteristics such as blood pressure sensors, heart rate monitors, glucometers, and so forth.

In some implementations, the one or more sensors 240* may include devices that can detect activities of a user (e.g., a source user 2**) such as a pedometer, a toilet monitoring system (e.g., to monitor bowel movements), exercise machine sensors, an accelerometer to measure a person's movements which may indicate specific activities, and so forth. The one or more sensors 240* may include, in various implementations, other types of sensor/monitoring devices such as video or digital camera to provide electronic images of, for example, the one or more target outcomes as displayed by a source user 20*, global positioning system (GPS) to provide location data related to a user (e.g., locations of the source user 2*), and so forth. In various implementations, a sensing device 40* may further include a network interface 242* and/or a memory 244* to store, for example, sensing data provided by the one or more sensors 240*.

Referring back to the server 10 of FIG. 1b, the local source user device 20a' of FIG. 2b, and the local end user device 30", the various modules (e.g., the relevant reported aspect provision module 102*, the personalized plan development module 104*, the presentation module 106*, and so forth) along with their sub-modules included in the server 10, the local source user device 20a', and the local end user device 30" may be implemented using hardware, software, firmware, or any combination thereof. For example, in some implementations, the relevant reported aspect provision module 102*, the personalized plan development module 104*, and/or the presentations module 106* may be implemented with a processor 1002 (e.g., microprocessor, controller, and so forth) executing computer readable instructions 1004 (e.g., computer program product) stored in a storage medium 1006 (e.g., volatile or non-volatile memory) such as a signal-bearing medium as depicted in the computing device 1000 of FIG. 10. Alternatively, hardware such as application specific integrated circuit (ASIC) may be employed in order to implement such modules in some alternative implementations.

Figure 5:
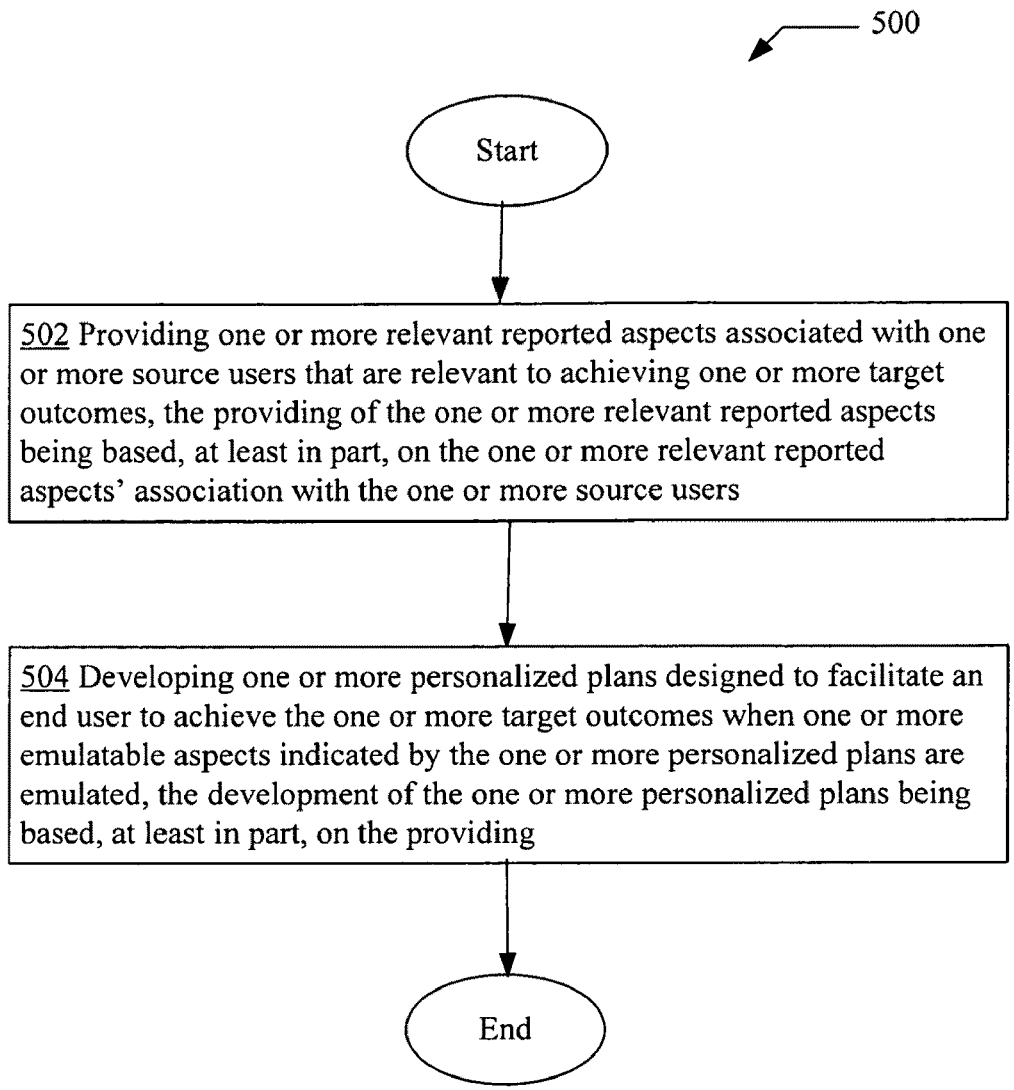
FIG. 5 is a high-level logic flowchart of a process.

A more detailed discussion related to the server 10 of FIG. 1b, the local source user device 20a' of FIG. 2b, and the local end user device 30" of FIG. 3b will now be provided with respect to the processes and operations to be described herein. FIG. 5 illustrates an operational flow 500 representing example operations related to, among other things, providing of one or more relevant reported aspects that are associated with one or more source users 2** and that are relevant to achieving one or target outcomes, and the development of one or more personalized plans 16* based on the one or more relevant reported aspects that are provided.

In FIG. 5 and in the following figures that include various examples of operational flows, discussions and explanations may be provided with respect to the three exemplary environments described above as illustrated in FIGS. 1a and 1b, FIGS. 2a and 2b, and FIGS. 3a and 3b, and/or with respect to other examples (e.g., as provided in FIGS. 4a, 4b, and 4c) and contexts. However, it should be understood that the operational flows may be executed in a number of other environments and contexts, and/or in modified versions of FIGS. 1a, 1b, 2a, 2b, 3a, 3b, 4a, 4b, and 4c. Also, although the various operational flows are presented in the sequence(s) illustrated, it should be understood that the various operations may be performed in other orders than those which are illustrated, or may be performed concurrently.

Further, in FIG. 5 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently.

In any event, after a start operation, the operational flow 500 may move to a relevant reported aspect providing operation 502 for providing one or more relevant reported aspects associated with one or more source users that are relevant to achieving one or more target outcomes, the providing of the one or more relevant reported aspects being based, at least in part, on the one or more relevant reported aspects' association with the one or more source users. For instance, and as an illustration, the relevant reported aspect provision module 102* (e.g., the relevant reported aspect provision module 102, the relevant reported aspect provision module 102', or the relevant reported aspect provision module 102") of the server 10 of FIG. 1b, the local source user device 20' of FIG. 2b, or the local end user device 30" of FIG. 3b providing one or more relevant reported aspects associated with one or more source users 2 that are relevant to achieving one or more target outcomes, the providing of the one or more relevant reported aspects being based, at least in part, on the one or more relevant reported aspects' association with the one or more source users 2. In some cases, the relevant reported aspect providing operation 502 (as well as the operational flow 500) may be prompted to be executed as a result of the server 10, the local source user device 20', or the local end user device 30" receiving a request 12* for the one or more personalized plans 16* that are designed to facilitate the end user 4* in achieving one or more target outcomes. The request 12* may have originated from various sources including, for example, the end user 4*, a network server 60*, or a third party 6*. In some embodiments, the request 12* may merely identify the one or more source users 2** without, for example, identifying any of the one or more target outcomes.

Note that in various implementations, provision of the one or more relevant reported aspects may not depend on the association of the one or more relevant reported aspects with the one or more target outcomes. Rather, such an operation for providing the one or more relevant reported aspects may only depend on the association of the one or more relevant reported aspects with the one or more source users 2** who may be identified by, for example, the end user 4* or by a third party 6*. In various implementations, and as will be further described herein, the one or more source users 2** may be identified by various means including by name, user name, biometrics data, image data, audio data, location data, and so forth.

Operational flow 500 may also include a personalized plan development operation 504 for developing one or more personalized plans designed to facilitate an end user to achieve the one or more target outcomes when one or more emulatable aspects indicated by the one or more personalized plans are emulated, the development of the one or more personalized plans being based, at least in part, on the providing. For instance, the personalized plan development module 104* of the server 10 of FIG. 1b, of the local source user device 20' of FIG. 2b, or of the local end user device 30" of FIG. 3b developing (e.g., creating) one or more personalized plans 16* designed to facilitate an end user 4* to achieve the one or more target outcomes when one or more emulatable aspects indicated by the one or more personalized plans 16* are emulated, the development of the one or more personalized plans 16* being based, at least in part, on the providing of the one or more relevant reported aspects.

Figure 6A:
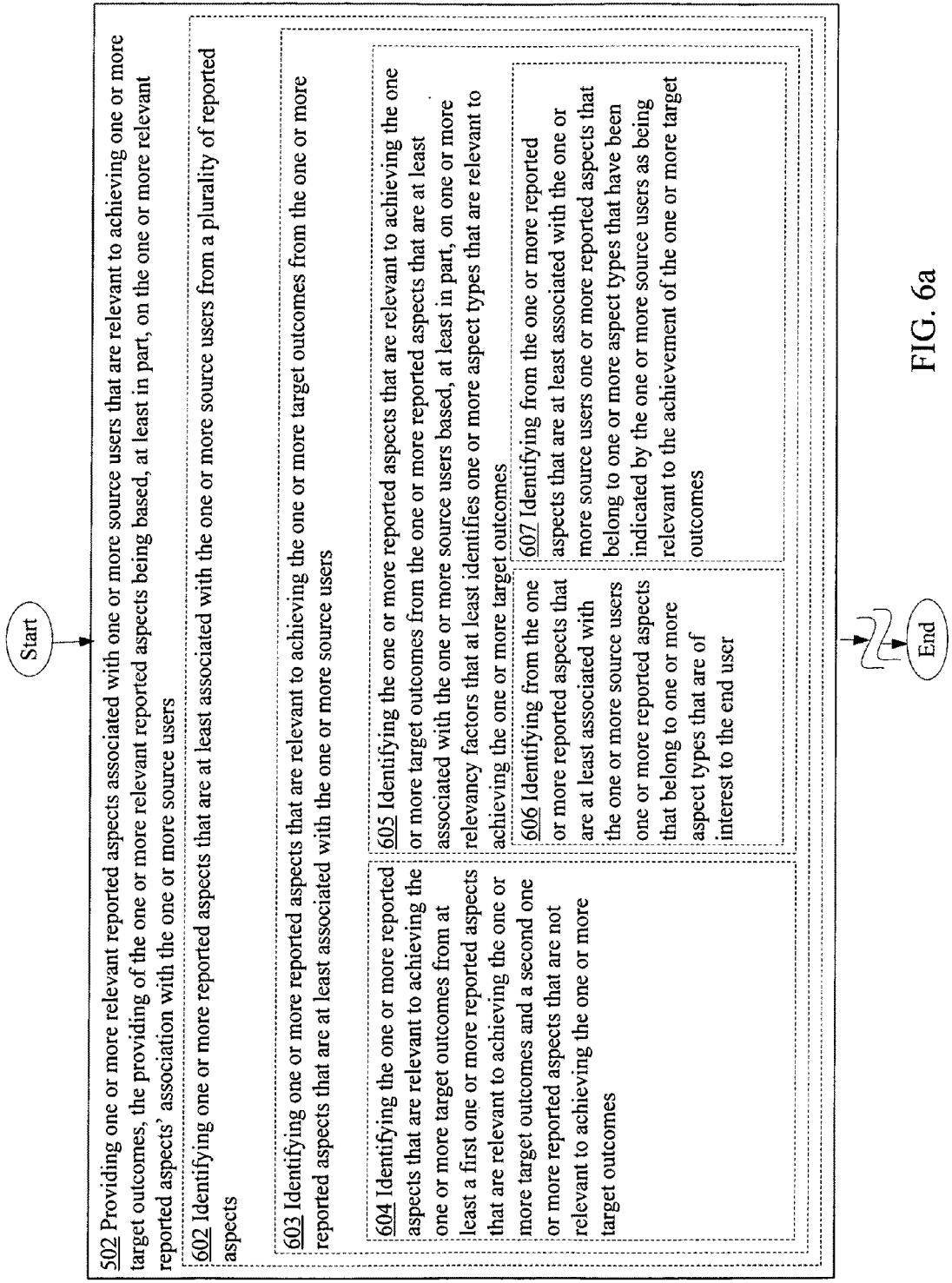
FIG. 6a is a high-level logic flowchart of a process depicting alternate implementations of the relevant reported aspect providing operation 502 of FIG. 5.

In various implementations, the relevant reported aspect providing operation 502 of FIG. 5 may be executed in a number of different ways as will be illustrated in FIGS. 6a, 6b, 6c, 6d, 6e, 6f, 6g, 6h, 6i, 6j, 6k, 6l, 6m, 6n, 6o, 6p, 6q, 6r, and 6s. In some cases, for example, the relevant reported aspect providing operation 502 may simply involve identifying (e.g., finding, determining, or locating) the one or more relevant reported aspects that are associated with one or more source users 2** and that are relevant to achieving one or more target outcomes. In particular, in some implementations the relevant reported aspect providing operation 502 may include an operation 602 for identifying one or more reported aspects that are at least associated with the one or more source users from a plurality of reported aspects as depicted in FIG. 6a. For instance, the relevant reported aspect identification module 202* (see FIG. 4a) of the server 10 of FIG. 1b, the local source user device 20' of FIG. 2b, or the local end user device 30" of FIG. 3b identifying (e.g., locating or finding from a plurality of reported aspects 17* stored in a memory 116*) one or more reported aspects 14* that are at least associated with the one or more source users 2** from a plurality of reported aspects 17* that may or may not be associated with the one or more source users 2**. The identification of the one or more reported aspects 14* may be based, at least in part, on the one or more reported aspects 14* associated with the one or more source users 2**.

Operation 602 may, in turn, include an operation 603 for identifying one or more reported aspects that are relevant to achieving the one or more target outcomes from the one or more reported aspects that are at least associated with the one or more source users in various implementations. For instance, the relevant reported aspect identification module 202* of the server 10 of FIG. 1b, the local source user device 20' of FIG. 2b, or the local end user device 30" of FIG. 3b identifying one or more reported aspects that are relevant to achieving the one or more target outcomes from the one or more reported aspects 14* that are at least associated with the one or more source users 2**.

Note that the one or more reported aspects 14* that are at least associated with the one or more source user 2** (e.g., the one or more reported aspects that the one or more reported aspects that are relevant to achieving the one or more target outcomes are identified from) may include both reported aspects that are relevant to achieving the one or more target outcomes and reported aspects that are not relevant to achieving the one or more target outcomes. Thus, in some implementations operation 603 may include an operation 604 for identifying the one or more reported aspects that are relevant to achieving the one or more target outcomes from at least a first one or more reported aspects that are relevant to achieving the one or more target outcomes and a second one or more reported aspects that are not relevant to achieving the one or more target outcomes as depicted in FIG. 6a. For instance, the relevant reported aspect identification module 202* of the server 10 of FIG. 1b, the local source user device 20' of FIG. 2b, or the local end user device 30" of FIG. 3b identifying the one or more reported aspects that are relevant to achieving the one or more target outcomes from at least a first one or more reported aspects that are relevant to achieving the one or more target outcomes and a second one or more reported aspects that are not relevant to achieving the one or more target outcomes.

The identification of the one or more reported aspects (i.e., relevant reported aspects) that are relevant to achieving the one or more target outcome from the one or more reported aspects that are at least associated with the one or more source users 2 may involve determining which of the one or more reported aspects that are at least associated with the one or more source users 2 are relevant with respect to one or more relevancy factors. As will be referred to herein, a relevancy factor may be any basis for determining whether a reported aspect is relevant to achieving one or more target outcomes. For example, in some implementations, the operation 603 for identifying the one or more reported aspects that are relevant to achieving the one or more target outcomes may include an operation 605 for identifying the one or more reported aspects that are relevant to achieving the one or more target outcomes from the one or more reported aspects that are at least associated with the one or more source users based, at least in part, on one or more relevancy factors that at least identifies one or more aspect types that are relevant to achieving the one or more target outcomes as depicted in FIG. 6a. For instance, the relevant reported aspect identification module 202* of the server 10 of FIG. 1b, the local source user device 20' of FIG. 2b, or the local end user device 30" of FIG. 3b identifying the one or more reported aspects that are relevant to achieving the one or more target outcomes from the one or more reported aspects 14* that are at least associated with the one or more source users 2** based, at least in part, on one or more relevancy factors that at least identifies one or more aspect types that are relevant to achieving the one or more target outcomes.

The identification of the one or more reported aspects that are relevant to achieving the one or more target outcomes from the one or more reported aspects that are at least associated with the one or more source users 2** may be based on a variety of relevancy factors. For example, in some implementations, the operation 605 for identifying the one or more reported aspects based on one or more relevancy factors may include an operation 606 for identifying from the one or more reported aspects that are at least associated with the one or more source users one or more reported aspects that belong to one or more aspect types that are of interest to the end user as depicted in FIG. 6a. For instance, the relevant reported aspect identification module 202* of the server 10 of FIG. 1b, the local source user device 20' of FIG. 2b, or the local end user device 30" of FIG. 3b identifying from the one or more reported aspects 14* that are at least associated with the one or more source users 2** one or more reported aspects that belong to one or more aspect types that are of interest to the end user 4* (e.g., the end user 4* may have indicated an interest in the dietary or sleep habits of the one or more source users 2**).

In the same or different implementations, operation 605 may include an operation 607 for identifying from the one or more reported aspects that are at least associated with the one or more source users one or more reported aspects that belong to one or more aspect types that have been indicated by the one or more source users as being relevant to the achievement of the one or more target outcomes as depicted in FIG. 6a. For instance, the relevant reported aspect identification 202* of the server 10 of FIG. 1b, the local source user device 20' of FIG. 2b, or the local end user device 30" of FIG. 3b identifying from the one or more reported aspects 14* that are at least associated with the one or more source users 2 one or more reported aspects that belong to one or more aspect types that have been indicated by the one or more source users 2 as being relevant to the achievement of the one or more target outcomes.

Figure 6B:
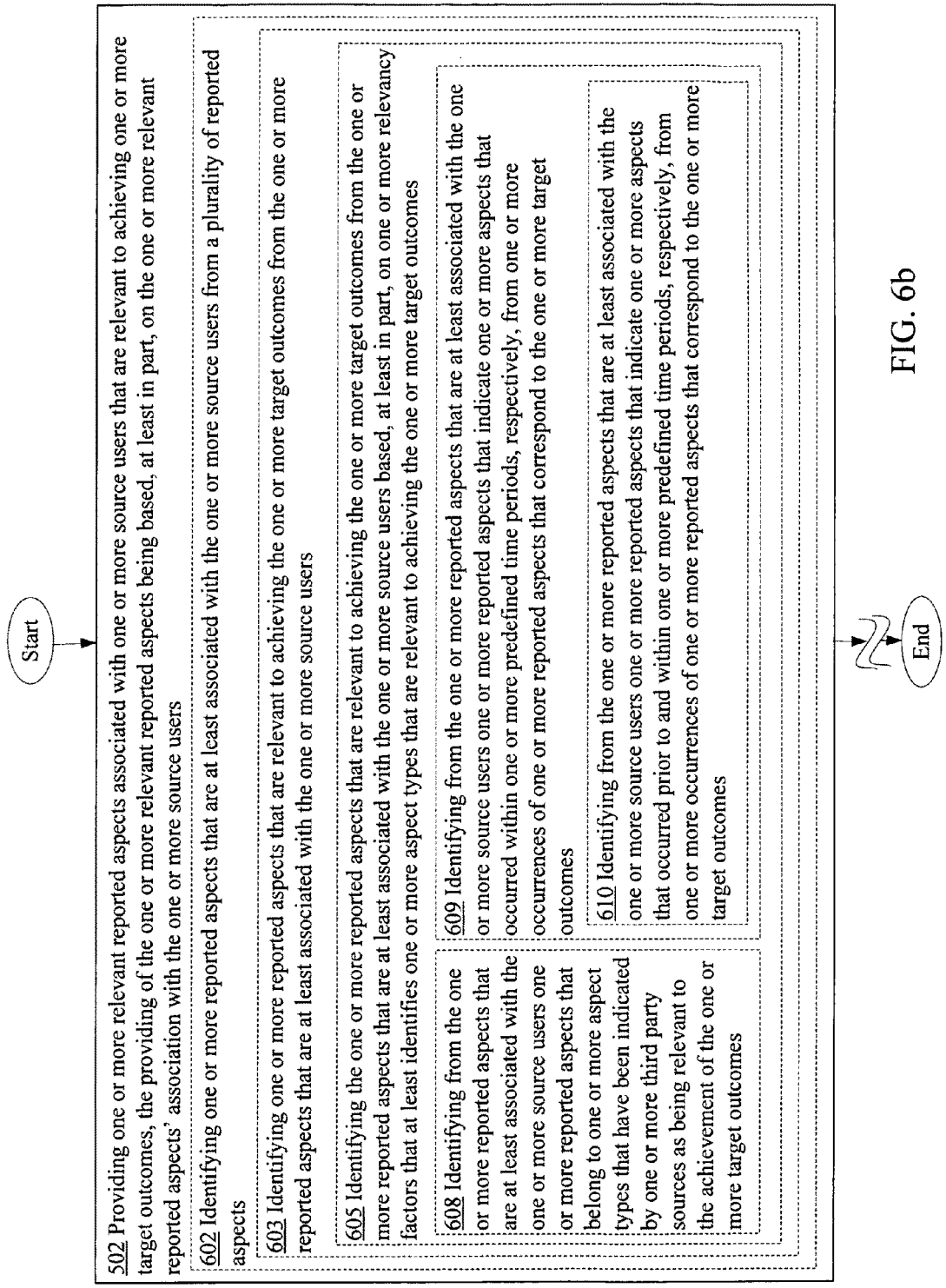
FIG. 6b is a high-level logic flowchart of a process depicting alternate implementations of the relevant reported aspect providing operation 502 of FIG. 5.

In the same or different implementations, operation 605 may include an operation 608 for identifying from the one or more reported aspects that are at least associated with the one or more source users one or more reported aspects that belong to one or more aspect types that have been indicated by one or more third party sources as being relevant to the achievement of the one or more target outcomes as depicted in FIG. 6b. For instance, the relevant reported aspect identification 202* of the of the server 10 of FIG. 1b, the local end user device 20', or the local end user device 30" of FIG. 3b identifying from the one or more reported aspects 14* that are at least associated with the one or more source users 2 one or more reported aspects that belong to one or more aspect types that have been indicated by one or more third party sources (e.g., publications, research articles, government or scientific advisories, content provider, and so forth) as being relevant to the achievement of the one or more target outcomes. For example, published research indicating that sleep habits may affect ability to lose body weight (e.g., target outcome). Thus, reported aspects relating to the sleep habits or behavior associated with the one or more source users 2 may be identified.

In the same or different implementations, operation 605 may include an operation 609 for identifying from the one or more reported aspects that are at least associated with the one or more source users one or more reported aspects that indicate one or more aspects that occurred within one or more predefined time periods, respectively, from one or more occurrences of one or more reported aspects that correspond to the one or more target outcomes as depicted in FIG. 6b. For instance, the relevant reported aspect identification 202* of the server 10 of FIG. 1b, the local source user device 20' of FIG. 2b, or the local end user device 30" of FIG. 3b identifying from the one or more reported aspects 14* that are at least associated with the one or more source users 2** one or more reported aspects that indicate one or more aspects that occurred within one or more predefined time periods, respectively, from one or more occurrences of one or more reported aspects that correspond to the one or more target outcomes.

That is, not all reported aspects associated with the one or more source users 2 and that may be relevant with respect to at least certain relevancy factors may actually be relevant to achieving the one or more target outcomes if the reported aspects indicate aspects that, time-wise, occurred remotely from occurrence of the one or more target outcomes as successfully achieved by the one or more source users 2. For example, reported aspects 15* that are associated with the one or more source users 2 and that are relevant based on certain relevancy factors may, nevertheless, not be relevant to achieving the one or more target outcomes if they occurred well before (or well after) the achievement of the one or more target outcomes (e.g., as represented by one or more reported aspects that corresponds to the one or more target outcomes) by the one or more source users 2. Thus, a reported aspect may, in some cases, be relevant to the achievement of the one or more target outcomes only if it falls within some time period (e.g., a predefined time period) from the one or more occurrences of the one or more reported aspects that correspond to the one or more target outcomes. The amount of time period (i.e., "predefined time period") described above may, of course, depend on a number of factors.

For example, in some embodiments, the one or more predefined time periods (e.g., each of the one or more target outcomes may be associated with a different predefined time period) may be set based on the type of personalized plans 16* being developed. Alternatively, the one or more predefined time periods may be provided by the end user 4*, a source user, or some third party. As an illustration, suppose an end user 4* observes that a source user 2** has lost considerable amount of weight during the previous two months. The end user 4* may then indicate that he is only interested in reported aspects that indicate aspects associated with the source user 2** and that have occurred during the past two months.

In some implementations, operation 609 may further include an operation 610 for identifying from the one or more reported aspects that are at least associated with the one or more source users one or more reported aspects that indicate one or more aspects that occurred prior to and within one or more predefined time periods, respectively, from one or more occurrences of one or more reported aspects that correspond to the one or more target outcomes as depicted in FIG. 6b. For instance, the relevant reported aspect identification 202* of the server 10 of FIG. 1b, the local source user device 20' of FIG. 2b, or the local end user device 30" of FIG. 3b identifying from the one or more reported aspects 14* that are at least associated with the one or more source users 2** one or more reported aspects that indicate one or more aspects that occurred prior to and within one or more predefined time periods, respectively, from one or more occurrences of one or more reported aspects that correspond to the one or more target outcomes. That is, generally most (but not all) reported aspects that are relevant to achieving a particular target outcome will typically occur prior to the target outcome being achieved.

Figure 6C:
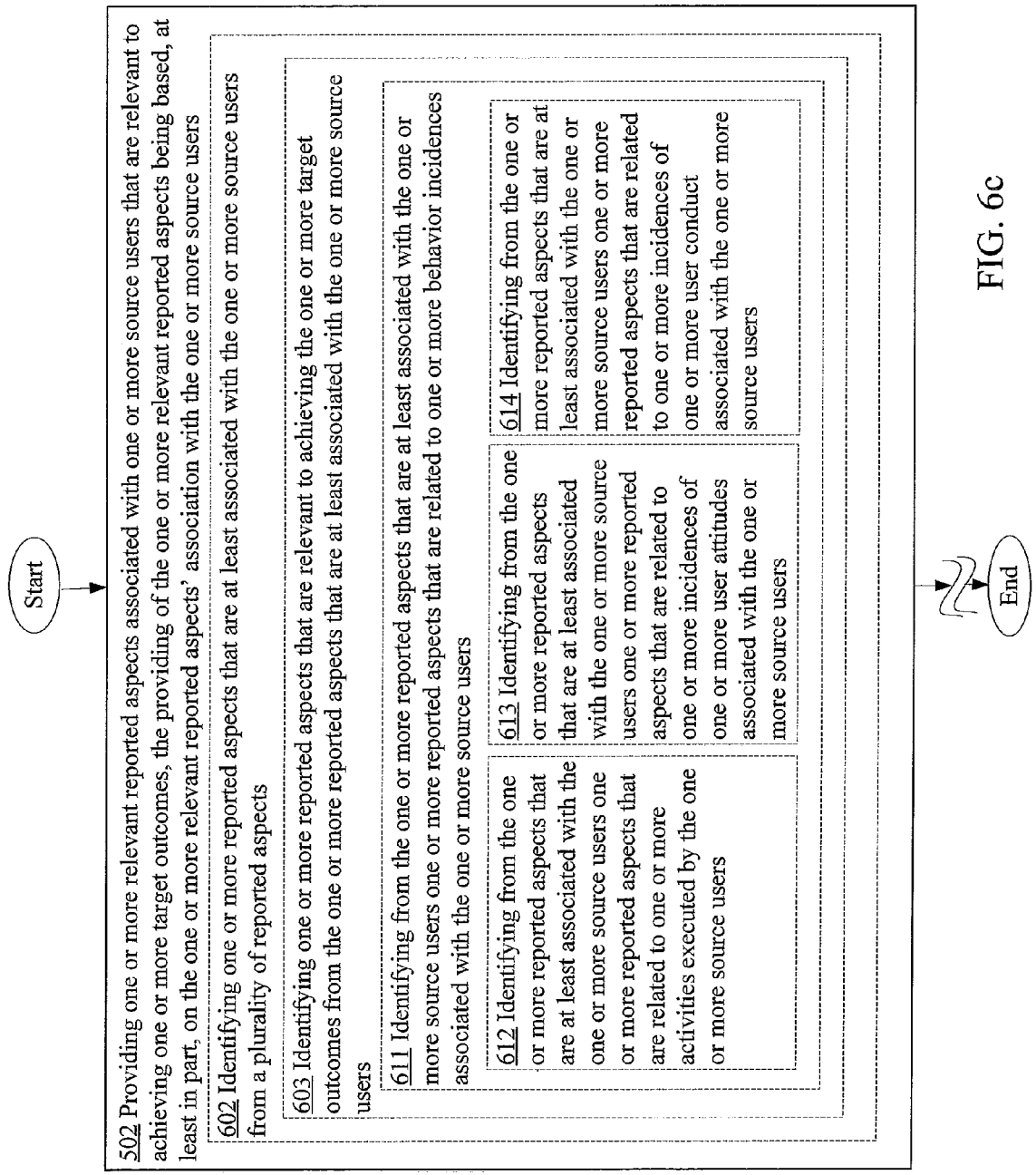
FIG. 6c is a high-level logic flowchart of a process depicting alternate implementations of the relevant reported aspect providing operation 502 of FIG. 5.

Various types of aspects may be indicated by the one or more reported aspects that are identified as being relevant to achieving the one or more target outcomes in various alternative implementations. For example, in some implementations, the operation 603 for identifying the one or more reported aspects that are relevant to achieving the one or more target outcomes from the one or more reported aspects that are at least associated with the one or more source users may include an operation 611 for identifying from the one or more reported aspects that are at least associated with the one or more source users one or more reported aspects that are related to one or more behavior incidences associated with the one or more source users as depicted in FIG. 6c. For instance, the relevant reported aspect identification module 202* of the server 10 of FIG. 1b, the local source user device 20' of FIG. 2b, or the local end user device 30" of FIG. 3b identifying from the one or more reported aspects 14* that are at least associated with the one or more source users 2 one or more reported aspects that are related to one or more behavior incidences associated with the one or more source users 2.

A behavior incidence may be related to any act, conduct, manner, and so forth that may be exhibited by, for example, a source user 2**. For example, in some implementations, operation 611 may include an operation 612 for identifying from the one or more reported aspects that are at least associated with the one or more source users one or more reported aspects that are related to one or more activities executed by the one or more source users as depicted in FIG. 6c. For instance, the relevant reported aspect identification 202* of the server 10 of FIG. 1b, the local source user device 20' of FIG. 2b, or the local end user device 30" of FIG. 3b identifying from the one or more reported aspects 14* that are at least associated with the one or more source users 2** one or more reported aspects that are related to one or more activities (e.g., dietary or nutritional activities, exercise activities, leisure activities, sleeping or resting activities, and so forth) executed by the one or more source users 2*.

In the same or different implementations, operation 611 may include an operation 613 for identifying from the one or more reported aspects that are at least associated with the one or more source users one or more reported aspects that are related to one or more incidences of one or more user attitudes associated with the one or more source users as depicted in FIG. 6c. For instance, the relevant reported aspect identification 202* of the server 10 of FIG. 1b, the local source user device 20' of FIG. 2b, or the local end user device 30" of FIG. 3b identifying from the one or more reported aspects 14* that are at least associated with the one or more source users 2 one or more reported aspects that are related to one or more incidences of one or more user attitudes (e.g., being indifferent, feeling critical, feeling skeptical, feeling optimistic, and so forth) associated with the one or more source users 2.

In the same or different implementations, operation 611 may include an operation 614 for identifying from the one or more reported aspects that are at least associated with the one or more source users one or more reported aspects that are related to one or more incidences of one or more user conduct associated with the one or more source users as depicted in FIG. 6c. For instance, the relevant reported aspect identification 202* of the server 10 of FIG. 1b, the local source user device 20' of FIG. 2b, or the local end user device 30" of FIG. 3b identifying from the one or more reported aspects 14* that are at least associated with the one or more source users 2 one or more reported aspects that are related to one or more incidences of one or more user conduct (e.g., behavior towards others, treatment of others, manner in which acts are executed, and so forth) associated with the one or more source users 2.

Figure 6D:
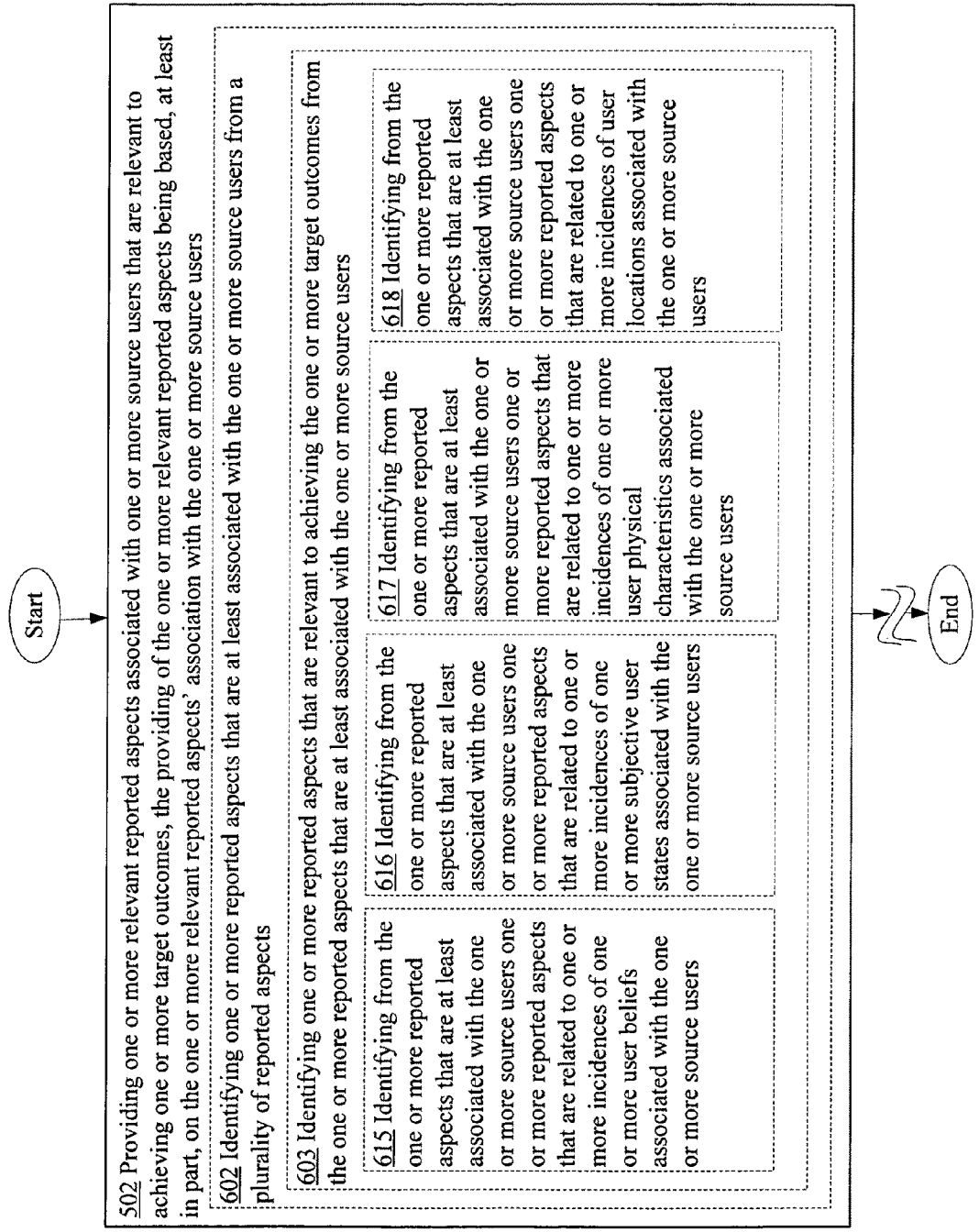
FIG. 6d is a high-level logic flowchart of a process depicting alternate implementations of the relevant reported aspect providing operation 502 of FIG. 5.

In some implementations, the operation 603 for identifying one or more reported aspects that are relevant to achieving the one or more target outcomes from the one or more reported aspects that are at least associated with the one or more source users may include an operation 615 for identifying from the one or more reported aspects that are at least associated with the one or more source users one or more reported aspects that are related to one or more incidences of one or more user beliefs associated with the one or more source users as depicted in FIG. 6d. For instance, the relevant reported aspect identification 202* of the server 10 of FIG. 1b, the local source user device 20' of FIG. 2b, or the local end user device 30" of FIG. 3b identifying from the one or more reported aspects 14* that are at least associated with the one or more source users 2 one or more reported aspects that are related to one or more incidences of one or more user beliefs (e.g., religious beliefs, spiritual beliefs, prejudicial beliefs, political beliefs, and so forth) associated with the one or more source users 2. As a further illustration, such user beliefs, which may be user professed beliefs or apparent beliefs, may be reported by the one or more source users 2** or by one or more third parties 6* (e.g., other end users 4*) via log entries (e.g., microblog entries or status reports). Note that in the case where one or more third parties 6* are reporting the specific incidences of beliefs associated with the one or more source users 2, the reported beliefs may be obtained from the one or more source users 2 when the source users 2** expresses such beliefs.

In the same or different implementations, operation 603 may include an operation 616 for identifying from the one or more reported aspects that are at least associated with the one or more source users one or more reported aspects that are related to one or more incidences of one or more subjective user states associated with the one or more source users as depicted in FIG. 6d. For instance, the relevant reported aspect identification 202* of the server 10 of FIG. 1b, the local source user device 20' of FIG. 2b, or the local end user device 30" of FIG. 3b identifying from the one or more reported aspects 14* that are at least associated with the one or more source users 2** one or more reported aspects that are related to one or more incidences of one or more subjective user states associated with the one or more source users 2*. A subjective user state may be any state or status associated with a source user 2* that can typically only be indicated by the source user 2*. Examples of subjective user states include, for example, subjective user mental states (e.g., sadness, happiness, mental exhaustion, alertness, and so forth), subjective user physical states (e.g., sore back, blurred vision, overall physical exhaustion, and so forth), and subjective user overall states (e.g., any other subjective user states that are neither a subjective user mental state or a subjective user physical state including, for example, "feeling good," "feeling bad," "feeling alive," and so forth).

In the same or different implementations, operation 603 may include an operation 617 for identifying from the one or more reported aspects that are at least associated with the one or more source users one or more reported aspects that are related to one or more incidences of one or more user physical characteristics associated with the one or more source users as depicted in FIG. 6d. For instance, the relevant reported aspect identification 202* of the server 10 of FIG. 1b, the local source user device 20' of FIG. 2b, or the local end user device 30" of FIG. 3b identifying from the one or more reported aspects 14* that are at least associated with the one or more source users 2 one or more reported aspects that are related to one or more incidences of one or more user physical characteristics (e.g., hair or eye color, hair length, hair style, facial hair characteristics, overall body figure, body weight, and so forth) associated with the one or more source users 2.

In the same or different implementations, operation 603 may include an operation 618 for identifying from the one or more reported aspects that are at least associated with the one or more source users one or more reported aspects that are related to one or more incidences of user locations associated with the one or more source users as depicted in FIG. 6d. For instance, the relevant reported aspect identification 202* of the server 10 of FIG. 1b, the local source user device 20' of FIG. 2b, or the local end user device 30" of FIG. 3b identifying from the one or more reported aspects 14* that are at least associated with the one or more source users 2 one or more reported aspects that are related to one or more incidences of user locations (e.g., home, workplace, New York City, beach, and so forth) associated with the one or more source users 2.

Figure 6E:
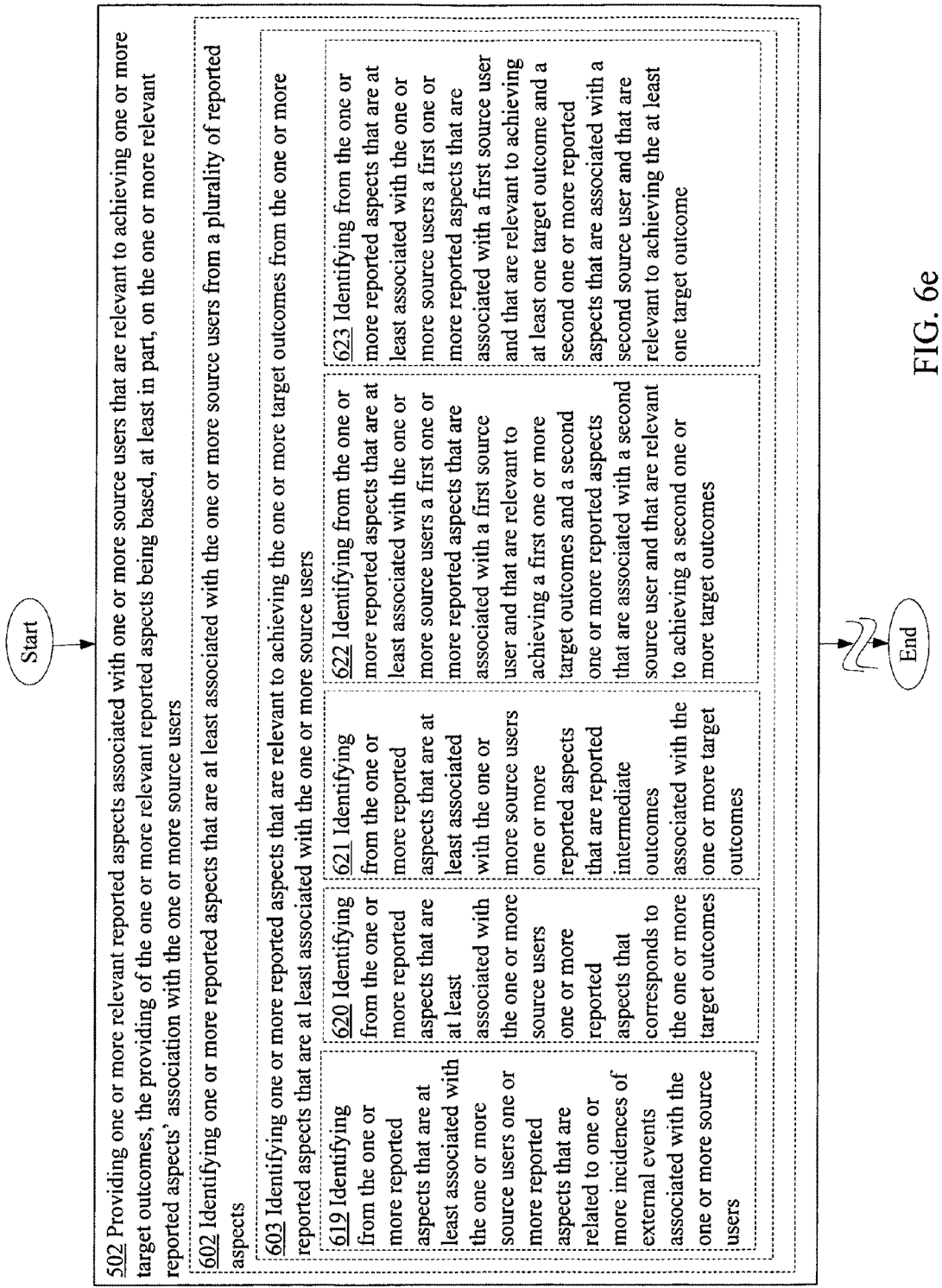
FIG. 6e is a high-level logic flowchart of a process depicting alternate implementations of the relevant reported aspect providing operation 502 of FIG. 5.

In the same or different implementations, operation 603 may include an operation 619 for identifying from the one or more reported aspects that are at least associated with the one or more source users one or more reported aspects that are related to one or more incidences of external events associated with the one or more source users as depicted in FIG. 6e. For instance, the relevant reported aspect identification 202* of the server 10 of FIG. 1b, the local source user device 20' of FIG. 2b, or the local end user device 30" of FIG. 3b identifying from the one or more reported aspects 14* that are at least associated with the one or more source users 2 one or more reported aspects that are related to one or more incidences of external events (e.g., weather conditions, heavy or no road traffic, stock market performance, and so forth) associated with the one or more source users 2.

In the same or different implementations, operation 603 may include an operation 620 for identifying from the one or more reported aspects that are at least associated with the one or more source users one or more reported aspects that corresponds to the one or more target outcomes as depicted in FIG. 6e. For instance, the relevant reported aspect identification 202* of the server 10 of FIG. 1b, the local source user device 20' of FIG. 2b, or the local end user device 30" of FIG. 3b identifying from the one or more reported aspects 14* that are at least associated with the one or more source users 2** one or more reported aspects that corresponds to the one or more target outcomes. For example, if the one or more target outcomes includes a target outcome for achieving an A1C score of 6 percent or lower (e.g., a test score that indicate average blood glucose level for previous three months) then identifying one or more reported aspects that corresponds to achieving an AIC score of 6 percent or lower.

In the same or different implementations, operation 603 may include an operation 621 for identifying from the one or more reported aspects that are at least associated with the one or more source users one or more reported aspects that are reported intermediate outcomes associated with the one or more target outcomes as depicted in FIG. 6e. For instance, the relevant reported aspect identification 202* of the server 10 of FIG. 1b, the local source user device 20' of FIG. 2b, or the local end user device 30" of FIG. 3b identifying from the one or more reported aspects 14* that are at least associated with the one or more source users 2** one or more reported aspects (e.g., total body weight loss of 10 pounds) that are reported intermediate outcomes associated with the one or more target outcomes (e.g., total body weight loss of 30 pounds). By identifying such reported aspects or reported intermediate outcomes, a personalized plan 16* may be developed that may include at least one emulatable intermediate outcome (which corresponds to the reported intermediate outcome) that may facilitate the end user 4* in determining whether the end user 4* is on track to achieve the target outcome when the one or more personalized plans 16* are being executed.

In the same or different implementations, operation 603 may include an operation 622 for identifying from the one or more reported aspects that are at least associated with the one or more source users a first one or more reported aspects that are associated with a first source user and that are relevant to achieving a first one or more target outcomes and a second one or more reported aspects that are associated with a second source user and that are relevant to achieving a second one or more target outcomes as depicted by FIG. 6e. For instance, the relevant reported aspect identification 202* of the server 10 of FIG. 1b, the local source user device 20' of FIG. 2b, or the local end user device 30" of FIG. 3b identifying from the one or more reported aspects 14* that are at least associated with the one or more source users 2** a first one or more reported aspects that are associated with a first source user 2a* and that are relevant to achieving a first one or more target outcomes and a second one or more reported aspects that are associated with a second source user 2b* and that are relevant to achieving a second one or more target outcomes. Thus, in various implementations, multiple reported aspects that are associated with multiple source users 2** may be identified for achieving at least two target outcomes.

In the same or different implementations, operation 603 may include an operation 623 for identifying from the one or more reported aspects that are at least associated with the one or more source users a first one or more reported aspects that are associated with a first source user and that are relevant to achieving at least one target outcome and a second one or more reported aspects that are associated with a second source user and that are relevant to achieving the at least one target outcome as depicted in FIG. 6e. For instance, the relevant reported aspect identification 202* of the server 10 of FIG. 1b, the local source user device 20' of FIG. 2b, or the local end user device 30" of FIG. 3b identifying from the one or more reported aspects 14* that are at least associated with the one or more source users 2** a first one or more reported aspects that are associated with a first source user 2a* and that are relevant to achieving at least one target outcome and a second one or more reported aspects that are associated with a second source user 2b* and that are relevant to achieving the at least one target outcome. Thus, in various implementations, multiple reported aspects that are associated with multiple source users 2** may be identified for achieving the same target outcome.

Figure 6F:
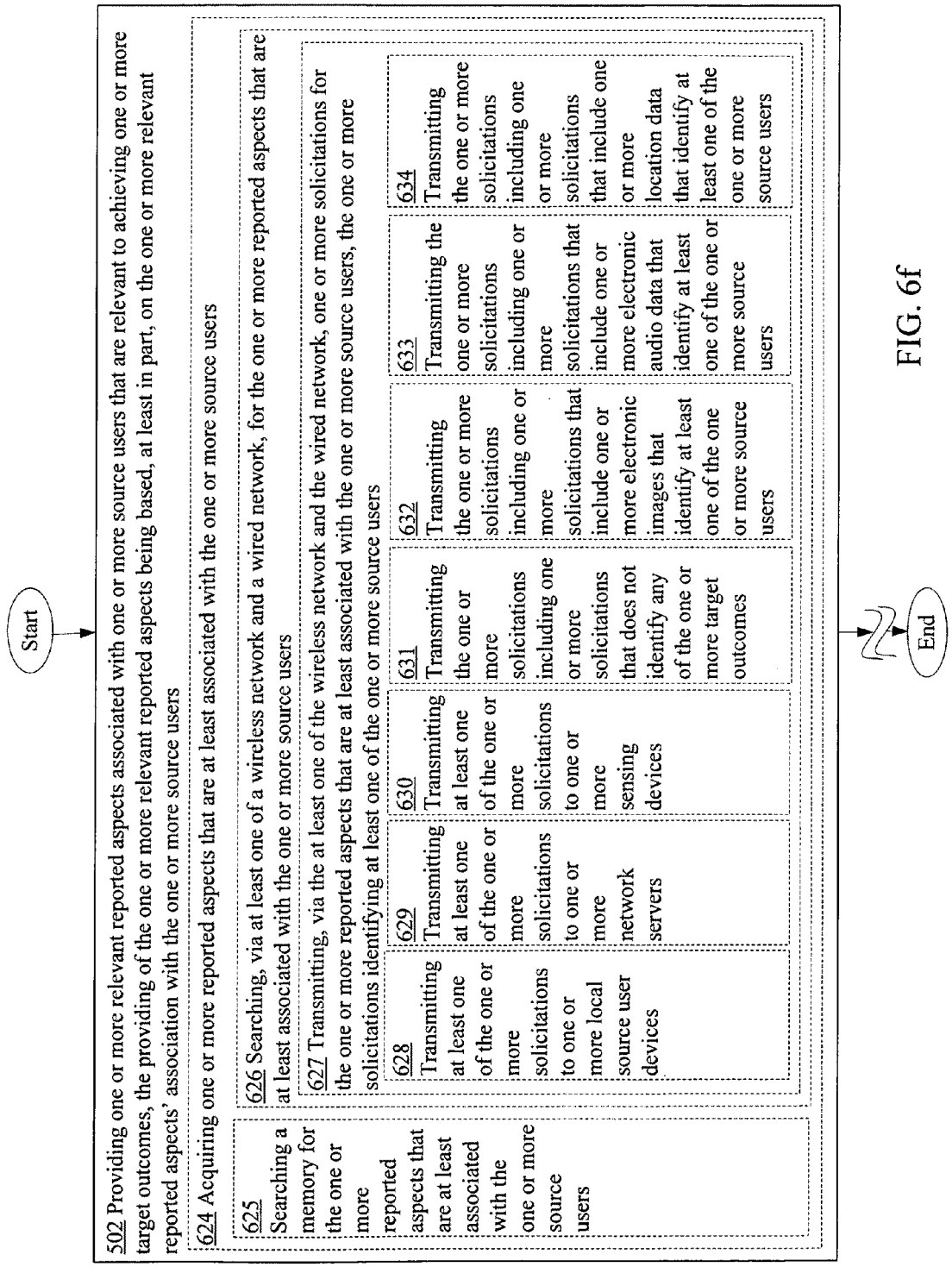
FIG. 6f is a high-level logic flowchart of a process depicting alternate implementations of the relevant reported aspect providing operation 502 of FIG. 5.

In various implementations, the relevant reported aspect providing operation 502 of FIG. 5 may be performed by acquiring one or more reported aspects. For example, in some implementations, the relevant reported aspect providing operation 502 may include an acquisition operation 624 for acquiring one or more reported aspects that are at least associated with the one or more source users as depicted in FIG. 6f. For instance, the reported aspect acquisition module 204* (see FIG. 4a) of the server 10 of FIG. 1b, the local source user device 20' of FIG. 2b, or the local end user device 30" of FIG. 3b acquiring (e.g., obtaining or retrieving from a memory 116* or via at least one of a wireless network and a wired network 50) one or more reported aspects 14* that are at least associated with the one or more source users 2**.

The acquisition of the one or more reported aspects that are at least associated with the one or more source users 2**may be accomplished in a variety of different ways in various alternative implementations. For example, in some implementations, the acquisition operation 624 may include a memory searching operation 625 for searching a memory for the one or more reported aspects that are at least associated with the one or more source users as depicted in FIG. 6f. For instance, the memory searching module 206* (see FIG. 4a) of the server 10 of FIG. 1b, the local source user device 20' of FIG. 2b, or the local end user device 30" of FIG. 3b searching a memory 116* for the one or more reported aspects 14* that are at least associated with the one or more source users 2**.

Note that in various implementations the searching operation 625 may include one or more of the identification operations (e.g., operations 602 to 623) previously described above. For example, and similar to operation 602 of FIG. 6a, the memory searching operation 625 may include an operation for identifying (e.g., in memory 116) one or more reported aspects that are at least associated with the one or more source users 2** from a plurality of reported aspects 17*.

In some implementations, the acquisition operation 624 may include an operation 626 for searching, via at least one of a wireless network and a wired network, for the one or more reported aspects that are at least associated with the one or more source users as depicted in FIG. 6f. For instance, the network searching module 208* (see FIG. 4a) of the server 10 of FIG. 1b, the local source user device 20' of FIG. 2b, or the local end user device 30" of FIG. 3b searching (e.g., querying), via at least one of a wireless network and a wired network 50*, for the one or more reported aspects 14* that are at least associated with the one or more source users 2**.

In order to search for the one or more reported aspects 14* that are at least associated with the one or more source users 2** via the wireless network and/or the wired network 50*, one or more solicitations 13* may be transmitted via the wireless network and/or the wired network 50*. For example, in some implementations, operation 626 may include an operation 627 for transmitting, via the at least one of the wireless network and the wired network, one or more solicitations for the one or more reported aspects that are at least associated with the one or more source users, the one or more solicitations identifying at least one of the one or more source users as depicted in FIG. 6f. For instance, the solicitation transmission module 210* (see FIG. 4a) of the server 10 of FIG. 1b, the local source user device 20' of FIG. 2b, or the local end user device 30" of FIG. 3b transmitting, via the at least one of the wireless network and the wired network 50*, one or more solicitations 13* (e.g., queries or requests) for the one or more reported aspects 14* that are at least associated with the one or more source users 2**, the one or more solicitations 13* identifying at least one of the one or more source users 2**.

Operation 627, in turn, may further include one or more additional operations in various alternative implementations. For example, in some implementations, operation 627 may include an operation 628 for transmitting at least one of the one or more solicitations to one or more local source user devices as depicted in FIG. 6f. For instance, the solicitation transmission module 210* (see FIG. 4a) of the server 10 of FIG. 1b, the local source user device 20' of FIG. 2b, or the local end user device 30" of FIG. 3b transmitting at least one of the one or more solicitations 13* to one or more local source user devices 20**.

In the same or different implementations, operation 627 may include an operation 629 for transmitting at least one of the one or more solicitations to one or more network servers as depicted in FIG. 6f. For instance, the solicitation transmission module 210* of the server 10 of FIG. 1b, the local source user device 20' of FIG. 2b, or the local end user device 30" of FIG. 3b transmitting at least one of the one or more solicitations 13* to one or more network servers 60*.

In the same or different implementations, operation 627 may include an operation 630 for transmitting at least one of the one or more solicitations to one or more sensing devices as depicted in FIG. 6f. For instance, the solicitation transmission module 210* of the server 10 of FIG. 1b, the local source user device 20' of FIG. 2b, or the local end user device 30" of FIG. 3b transmitting at least one of the one or more solicitations 13* to one or more sensing devices 40**.

In the same or different implementations, operation 627 may include an operation 631 for transmitting the one or more solicitations including one or more solicitations that does not identify any of the one or more target outcomes as depicted in FIG. 6f. For instance, the solicitation transmission module 210* of the server 10 of FIG. 1b, the local source user device 20' of FIG. 2b, or the local end user device 30" of FIG. 3b transmitting the one or more solicitations 13* including one or more solicitations that does not identify any of the one or more target outcomes.

Various types of data may be included in the one or more solicitations 13* in order to identify the one or more source users 2**. For example, in some implementations, operation 627 may include an operation 632 for transmitting the one or more solicitations including one or more solicitations that include one or more electronic images that identify at least one of the one or more source users as depicted in FIG. 6f. For instance, the solicitation transmission module 210* of the server 10 of FIG. 1b, the local source user device 20' of FIG. 2b, or the local end user device 30" of FIG. 3b transmitting the one or more solicitations 13* including one or more solicitations 13* that include one or more electronic images that identify (e.g., facilitates in the identification of) at least one of the one or more source users 2**.

In the same or different implementations, operation 627 may include an operation 633 for transmitting the one or more solicitations including one or more solicitations that include one or more electronic audio data that identify at least one of the one or more source users as depicted in FIG. 6f. For instance, the solicitation transmission module 210* of the server 10 of FIG. 1b, the local source user device 20' of FIG. 2b, or the local end user device 30" of FIG. 3b transmitting the one or more solicitations 13* including one or more solicitations 13* that include one or more electronic audio data that identify (e.g., facilitates in the identification of) at least one of the one or more source users 2**.

In the same or different implementations, operation 627 may include an operation 634 for transmitting the one or more solicitations including one or more solicitations that include one or more location data that identify at least one of the one or more source users as depicted in FIG. 6f. For instance, the solicitation transmission module 210* of the server 10 of FIG. 1b, the local source user device 20' of FIG. 2b, or the local end user device 30" of FIG. 3b transmitting the one or more solicitations 13* including one or more solicitations 13* that include one or more location data that identify (e.g., facilitates in the identification of) at least one of the one or more source users 2**.

Figure 6G:
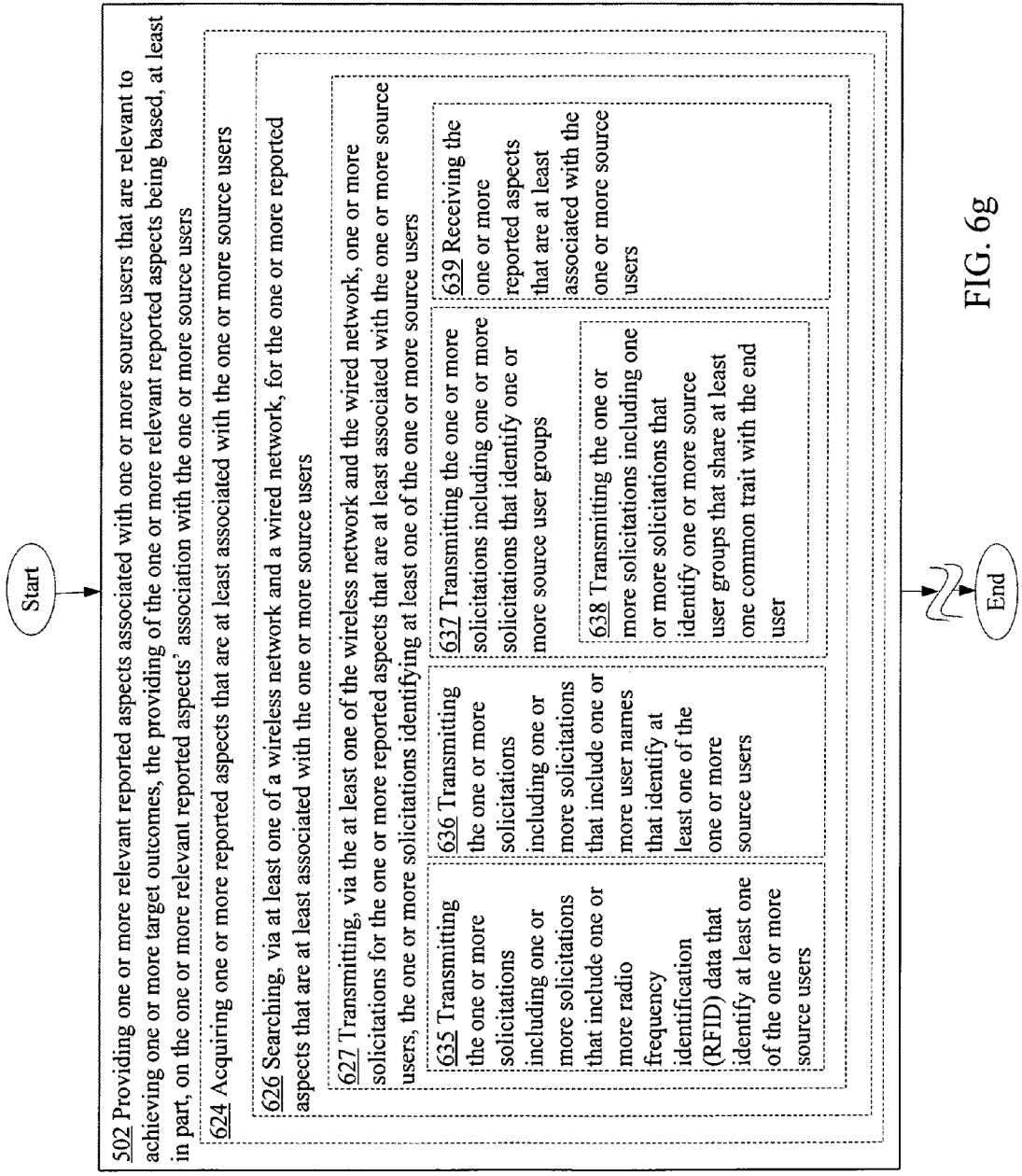
FIG. 6g is a high-level logic flowchart of a process depicting alternate implementations of the relevant reported aspect providing operation 502 of FIG. 5.

In the same or different implementations, operation 627 may include an operation 635 for transmitting the one or more solicitations including one or more solicitations that include one or more radio frequency identification (RFID) data that identify at least one of the one or more source users as depicted in FIG. 6g. For instance, the solicitation transmission module 210* of the server 10 of FIG. 1b, the local source user device 20' of FIG. 2b, or the local end user device 30" of FIG. 3b transmitting the one or more solicitations 13* including one or more solicitations 13* that include one or more radio frequency identification (RFID) data that identify (e.g., facilitates in the identification of) at least one of the one or more source users 2. Such an operation may be implemented in some cases when the one or more source users 2 are carrying RFID tags, and an end user 4*, for example, wishes to identify the one or more source users 2 without being intrusive by using an RFID reader to read the RFID tags being carried by one or more source users 2.

In the same or different implementations, operation 627 may include an operation 636 for transmitting the one or more solicitations including one or more solicitations that include one or more user names that identify at least one of the one or more source users as depicted in FIG. 6g. For instance, the solicitation transmission module 210* of the server 10 of FIG. 1b, the local source user device 20' of FIG. 2b, or the local end user device 30" of FIG. 3b transmitting the one or more solicitations 13* including one or more solicitations 13* that include one or more user names (e.g., actual user name, network username, and so forth) that identify at least one of the one or more source users 2**.

As a way of identifying the one or more source users 2**, the one or more solicitations 13* to be transmitted in operation 627 may include data that identifies one or more source user groups. For example, in some implementations, operation 627 may include an operation 637 for transmitting the one or more solicitations including one or more solicitations that identify one or more source user groups as depicted in FIG. 6g. For instance, the solicitation transmission module 210* of the server 10 of FIG. 1b, the local source user device 20' of FIG. 2b, or the local end user device 30" of FIG. 3b transmitting the one or more solicitations 13* including one or more solicitations 13* that identify one or more source user groups (e.g., social networking groups, medical patient groups, employment groups, religious groups, athletic groups or clubs, ethnic or gender groups, and so forth).

Operation 637 may, in turn, include an operation 638 for transmitting the one or more solicitations including one or more solicitations that identify one or more source user groups that share at least one common trait with the end user in various implementations as depicted in FIG. 6g. For instance, the solicitation transmission module 210* of the server 10 of FIG. 1b, the local source user device 20' of FIG. 2b, or the local end user device 30" of FIG. 3b transmitting the one or more solicitations 13* including one or more solicitations 13* that identify one or more source user groups that share at least one common trait (e.g., members of the same social networking group, common ethnicity, common illness, common medical treatment, common physical characteristics, common school or class, common field of study, and so forth) with the end user 4*.

As a result of transmitting the one or more solicitations 13** in operation 627, one or more reported aspects may be received. For example, in some, operation 627 may include an operation 639 for receiving the one or more reported aspects that are at least associated with the one or more source users as depicted in FIG. 6g. For instance, the reported aspect reception module 212* (see FIG. 4a) of the server 10 of FIG. 1b, the local source user device 20' of FIG. 2b, or the local end user device 30" of FIG. 3b receiving the one or more reported aspects 14* that are at least associated with the one or more source users 2**.

Figure 6H:
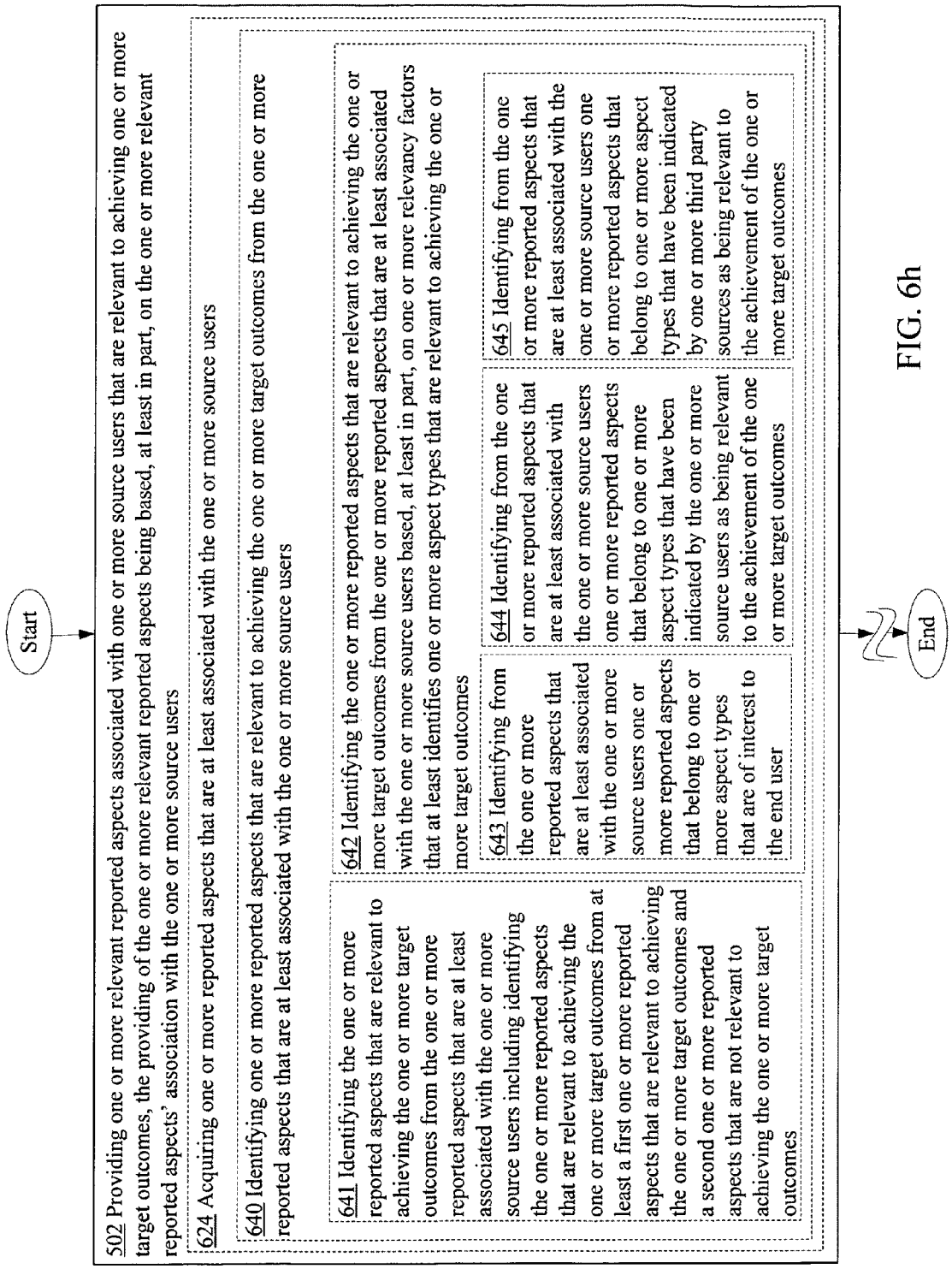
FIG. 6h is a high-level logic flowchart of a process depicting alternate implementations of the relevant reported aspect providing operation 502 of FIG. 5.

After acquiring the one or more reported aspects 14* that are at least associated with the one or more source users 2*, one or more operations may be further executed in order to identify one or more reported aspects that are relevant to achieving the one or more target outcomes from the one or more acquired reported aspects in various alternative implementations. For example, in some implementations, the acquisition operation 624 for acquiring the one or more reported aspects that are at least associated with the one or more source users may further include an operation 640 for identifying one or more reported aspects that are relevant to achieving the one or more target outcomes from the one or more reported aspects that are at least associated with the one or more source users as depicted in FIG. 6h. For instance, the relevant reported aspect identification module 202* (see FIG. 4a) of the server 10 of FIG. 1b, the local source user device 20' of FIG. 2b, or the local end user device 30" of FIG. 3b identifying one or more reported aspects that are relevant to achieving the one or more target outcomes from the one or more reported aspects 14* that are at least associated with the one or more source users 2**.

As will be further described herein, operation 640 may be implemented in a number of different ways in various alternative implementations. For example, in some implementations, operation 640 may include an operation 641 for identifying the one or more reported aspects that are relevant to achieving the one or more target outcomes from the one or more reported aspects that are at least associated with the one or more source users including identifying the one or more reported aspects that are relevant to achieving the one or more target outcomes from at least a first one or more reported aspects that are relevant to achieving the one or more target outcomes and a second one or more reported aspects that are not relevant to achieving the one or more target outcomes as depicted in FIG. 6h. For instance, the relevant reported aspect identification module 202* of the server 10 of FIG. 1b, the local source user device 20' of FIG. 2b, or the local end user device 30" of FIG. 3b identifying the one or more reported aspects that are relevant to achieving the one or more target outcomes from the one or more reported aspects 14* that are at least associated with the one or more source users 2** including identifying the one or more reported aspects that are relevant to achieving the one or more target outcomes from at least a first one or more reported aspects that are relevant to achieving the one or more target outcomes and a second one or more reported aspects that are not relevant to achieving the one or more target outcomes. This may be the case, for example, when the one or more reported aspects 14* that were acquired and that are at least associated with the one or more source users 2** include both reported aspects that are relevant and reported aspects that are not relevant (e.g., relevant to achieving the one or more target outcomes).

In the same or different implementations, operation 640 may include an operation 642 for identifying the one or more reported aspects that are relevant to achieving the one or more target outcomes from the one or more reported aspects that are at least associated with the one or more source users based, at least in part, on one or more relevancy factors that at least identifies one or more aspect types that are relevant to achieving the one or more target outcomes as depicted in FIG. 6h. For instance, the relevant reported aspect identification module 202* of the server 10 of FIG. 1b, the local source user device 20' of FIG. 2b, or the local end user device 30" of FIG. 3b identifying the one or more reported aspects that are relevant to achieving the one or more target outcomes from the one or more reported aspects 14* that are at least associated with the one or more source users 2** based, at least in part, on one or more relevancy factors that at least identifies one or more aspect types (e.g., physical activities, user states such as mental states, beliefs, and so forth) that are relevant to achieving the one or more target outcomes.

In some implementations, operation 642 may further include an operation 643 for identifying from the one or more reported aspects that are at least associated with the one or more source users one or more reported aspects that belong to one or more aspect types that are of interest to the end user as depicted in FIG. 6h. For instance, the relevant reported aspect identification module 202* of the server 10 of FIG. 1b, the local source user device 20' of FIG. 2b, or the local end user device 30" of FIG. 3b identifying from the one or more reported aspects 14* that are at least associated with the one or more source users 2** one or more reported aspects that belong to one or more aspect types that are of interest to the end user 4*.

In the same or different implementations, operation 642 may include an operation 644 for identifying from the one or more reported aspects that are at least associated with the one or more source users one or more reported aspects that belong to one or more aspect types that have been indicated by the one or more source users as being relevant to the achievement of the one or more target outcomes as depicted in FIG. 6h. For instance, the relevant reported aspect identification module 202* (see FIG. 4a) of the server 10 of FIG. 1b, the local source user device 20' of FIG. 2b, or the local end user device 30" of FIG. 3b identifying from the one or more reported aspects 14* that are at least associated with the one or more source users 2 one or more reported aspects that belong to one or more aspect types that have been indicated by the one or more source users 2 as being relevant to the achievement of the one or more target outcomes.

In the same or different implementations, operation 642 may include an operation 645 for identifying from the one or more reported aspects that are at least associated with the one or more source users one or more reported aspects that belong to one or more aspect types that have been indicated by one or more third party sources as being relevant to the achievement of the one or more target outcomes as depicted in FIG. 6h. For instance, the relevant reported aspect identification module 202* of the server 10 of FIG. 1b, the local source user device 20' of FIG. 2b, or the local end user device 30" of FIG. 3b identifying from the one or more reported aspects 14* that are at least associated with the one or more source users 2** one or more reported aspects that belong to one or more aspect types that have been indicated by one or more third party sources (e.g., one or more third parties 6* or one or more third party source relevancy indications 145*) as being relevant to the achievement of the one or more target outcomes.

Figure 6I:
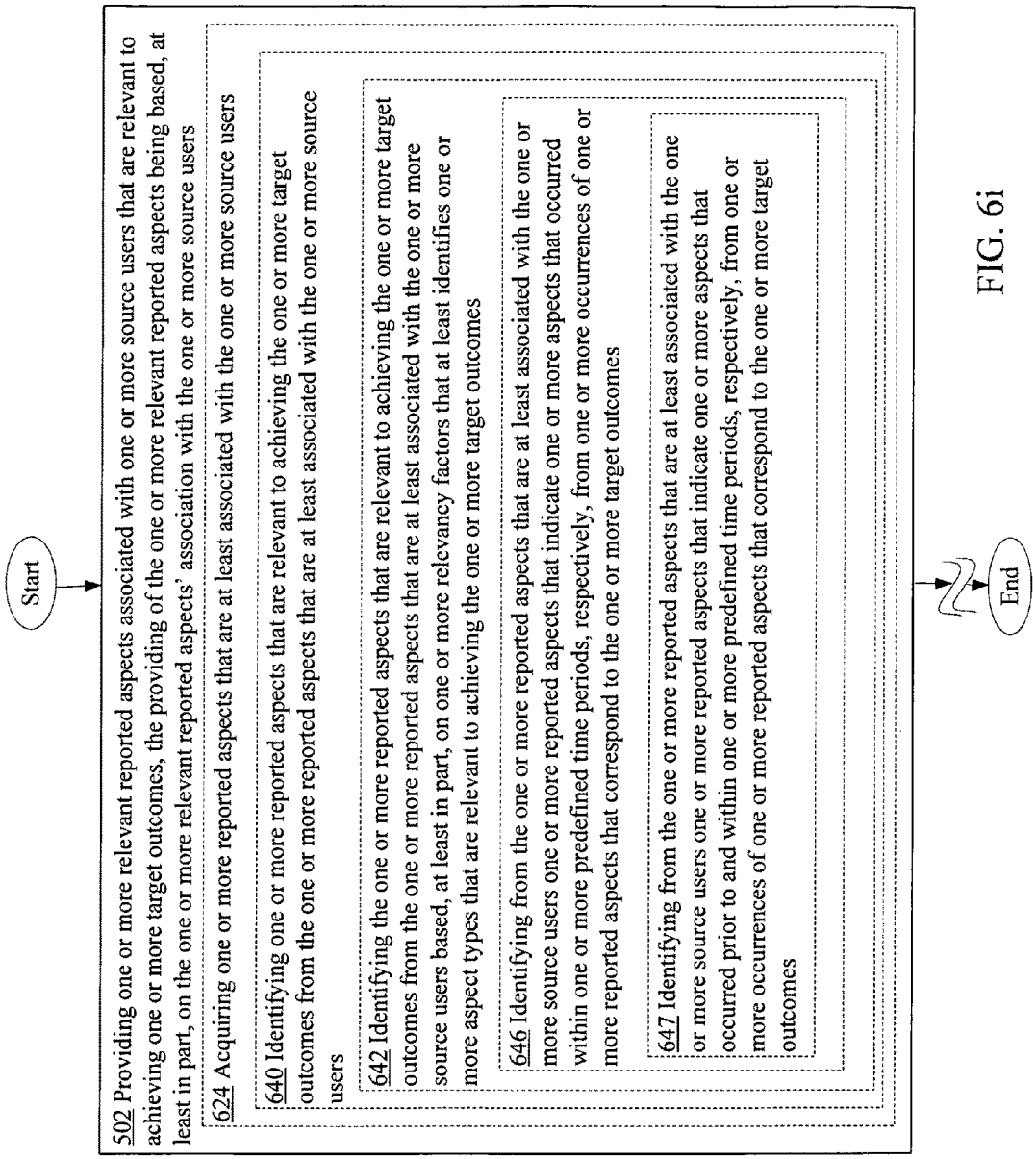
FIG. 6i is a high-level logic flowchart of a process depicting alternate implementations of the relevant reported aspect providing operation 502 of FIG. 5.

In the same or different implementations, operation 642 may include an operation 646 for identifying from the one or more reported aspects that are at least associated with the one or more source users one or more reported aspects that indicate one or more aspects that occurred within one or more predefined time periods, respectively, from one or more occurrences of one or more reported aspects that correspond to the one or more target outcomes as depicted in FIG. 6i. For instance, the relevant reported aspect identification module 202* of the server 10 of FIG. 1b, the local source user device 20' of FIG. 2b, or the local end user device 30" of FIG. 3b identifying from the one or more reported aspects 14* that are at least associated with the one or more source users 2** one or more reported aspects that indicate one or more aspects (e.g., sleep activities) that occurred within one or more predefined time periods (e.g., 24 hours), respectively, from one or more occurrences of one or more reported aspects that correspond to the one or more target outcomes (e.g., being alert and active).

In various implementations, operation 646 may, in turn, include an operation 647 for identifying from the one or more reported aspects that are at least associated with the one or more source users one or more reported aspects that indicate one or more aspects that occurred prior to and within one or more predefined time periods, respectively, from one or more occurrences of one or more reported aspects that correspond to the one or more target outcomes as depicted in FIG. 6i. For instance, the relevant reported aspect identification module 202* of the server 10 of FIG. 1b, the local source user device 20' of FIG. 2b, or the local end user device 30" of FIG. 3b identifying from the one or more reported aspects 14* that are at least associated with the one or more source users 2** one or more reported aspects that indicate one or more aspects (e.g., study activities) that occurred prior to and within one or more predefined time periods (e.g., two months), respectively, from one or more occurrences of one or more reported aspects that correspond to the one or more target outcomes (e.g., obtaining a particular test score for a particular test).

Figure 6J:
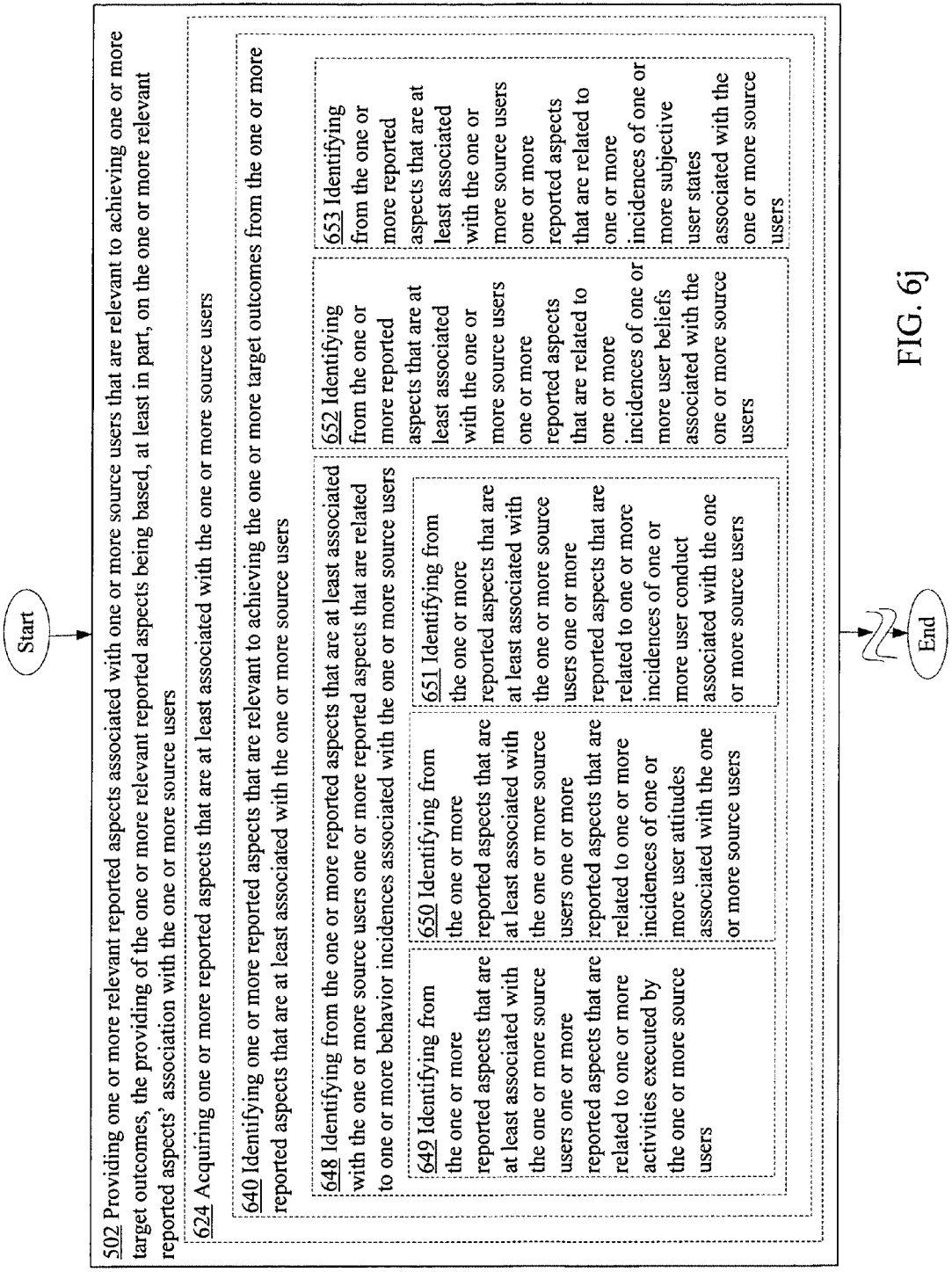
FIG. 6j is a high-level logic flowchart of a process depicting alternate implementations of the relevant reported aspect providing operation 502 of FIG. 5.

Various types of reported aspects may be identified by the operation 640 for identifying the one or more reported aspects that are relevant to achieving the one or more target outcomes from the one or more reported aspects that are at least associated with the one or more source users. For example, in some implementations, operation 640 may include an operation 648 for identifying from the one or more reported aspects that are at least associated with the one or more source users one or more reported aspects that are related to one or more behavior incidences associated with the one or more source users as depicted in FIG. 6j. For instance, the relevant reported aspect identification module 202* of the server 10 of FIG. 1b, the local source user device 20' of FIG. 2b, or the local end user device 30" of FIG. 3b identifying from the one or more reported aspects 14* that are at least associated with the one or more source users 2 one or more reported aspects that are related to one or more behavior incidences associated with the one or more source users 2.

Operation 648 may, in turn, include one or more additional operations. For example, in some implementations, operation 648 may include an operation 649 for identifying from the one or more reported aspects that are at least associated with the one or more source users one or more reported aspects that are related to one or more activities executed by the one or more source users as depicted in FIG. 6j. For instance, the relevant reported aspect identification module 202* of the server 10 of FIG. 1b, the local source user device 20' of FIG. 2b, or the local end user device 30" of FIG. 3b identifying from the one or more reported aspects 14* that are at least associated with the one or more source users 2 one or more reported aspects that are related to one or more activities (e.g., dietary activities, educational or study activities, social activities, and so forth) executed by the one or more source users 2.

In the same or different implementations, operation 648 may include an operation 650 for identifying from the one or more reported aspects that are at least associated with the one or more source users one or more reported aspects that are related to one or more incidences of one or more user attitudes associated with the one or more source users as depicted in FIG. 6j. For instance, the relevant reported aspect identification module 202* of the server 10 of FIG. 1b, the local source user device 20' of FIG. 2b, or the local end user device 30" of FIG. 3b identifying from the one or more reported aspects 14* that are at least associated with the one or more source users 2 one or more reported aspects that are related to one or more incidences of one or more user attitudes (e.g., being indifferent, feeling critical, feeling skeptical, feeling optimistic, and so forth) associated with the one or more source users 2.

In the same or different implementations, operation 648 may include an operation 651 for identifying from the one or more reported aspects that are at least associated with the one or more source users one or more reported aspects that are related to one or more incidences of one or more user conduct associated with the one or more source users as depicted in FIG. 6j. For instance, the relevant reported aspect identification module 202* of the server 10 of FIG. 1b, the local source user device 20' of FIG. 2b, or the local end user device 30" of FIG. 3b identifying from the one or more reported aspects 14* that are at least associated with the one or more source users one or more reported aspects that are related to one or more incidences of one or more user conduct (e.g., behavior towards others, treatment of others, manner in which acts are executed, and so forth) associated with the one or more source users 2*.

In some implementations, the operation 640 for identifying the one or more reported aspects that are relevant to achieving the one or more target outcomes from the one or more reported aspects that are at least associated with the one or more source users may include an operation 652 for identifying from the one or more reported aspects that are at least associated with the one or more source users one or more reported aspects that are related to one or more incidences of one or more user beliefs associated with the one or more source users as depicted in FIG. 6j. For instance, the relevant reported aspect identification module 202* of the server 10 of FIG. 1b, the local source user device 20' of FIG. 2b, or the local end user device 30" of FIG. 3b identifying from the one or more reported aspects 14* that are at least associated with the one or more source users 2 one or more reported aspects that are related to one or more incidences of one or more user beliefs (e.g., religious beliefs, spiritual beliefs, prejudicial beliefs, political beliefs, and so forth) associated with the one or more source users 2.

In the same or different implementations, operation 640 may include an operation 653 for identifying from the one or more reported aspects that are at least associated with the one or more source users one or more reported aspects that are related to one or more incidences of one or more subjective user states associated with the one or more source users as depicted in FIG. 6j. For instance, the relevant reported aspect identification module 202* of the server 10 of FIG. 1b, the local source user device 20' of FIG. 2b, or the local end user device 30" of FIG. 3b identifying from the one or more reported aspects 14* that are at least associated with the one or more source users 2 one or more reported aspects that are related to one or more incidences of one or more subjective user states (e.g., subjective user mental states, subjective user physical states, and/or subjective user overall states) associated with the one or more source users 2.

Figure 6K:
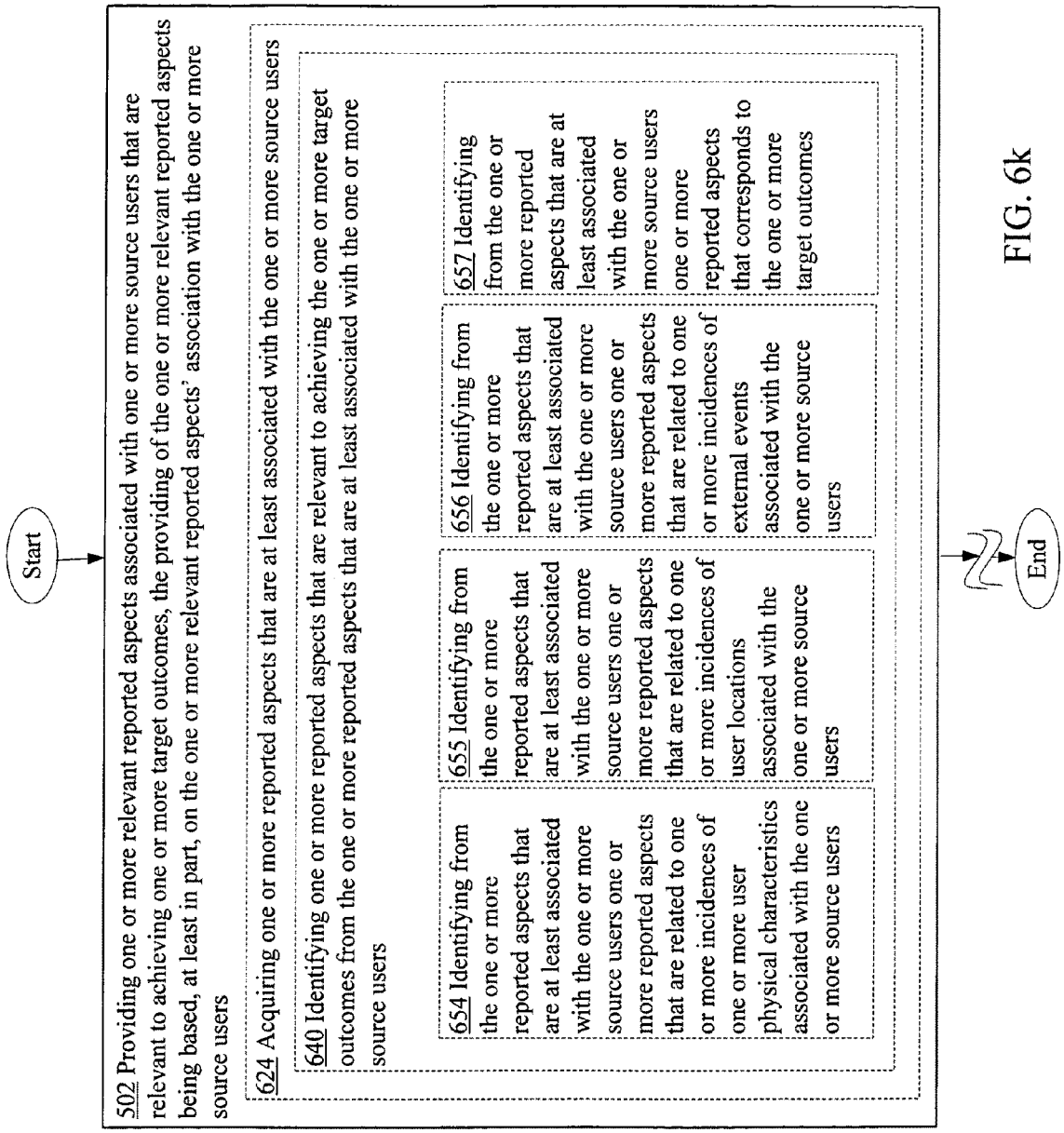
FIG. 6k is a high-level logic flowchart of a process depicting alternate implementations of the relevant reported aspect providing operation 502 of FIG. 5.
Figure 61:
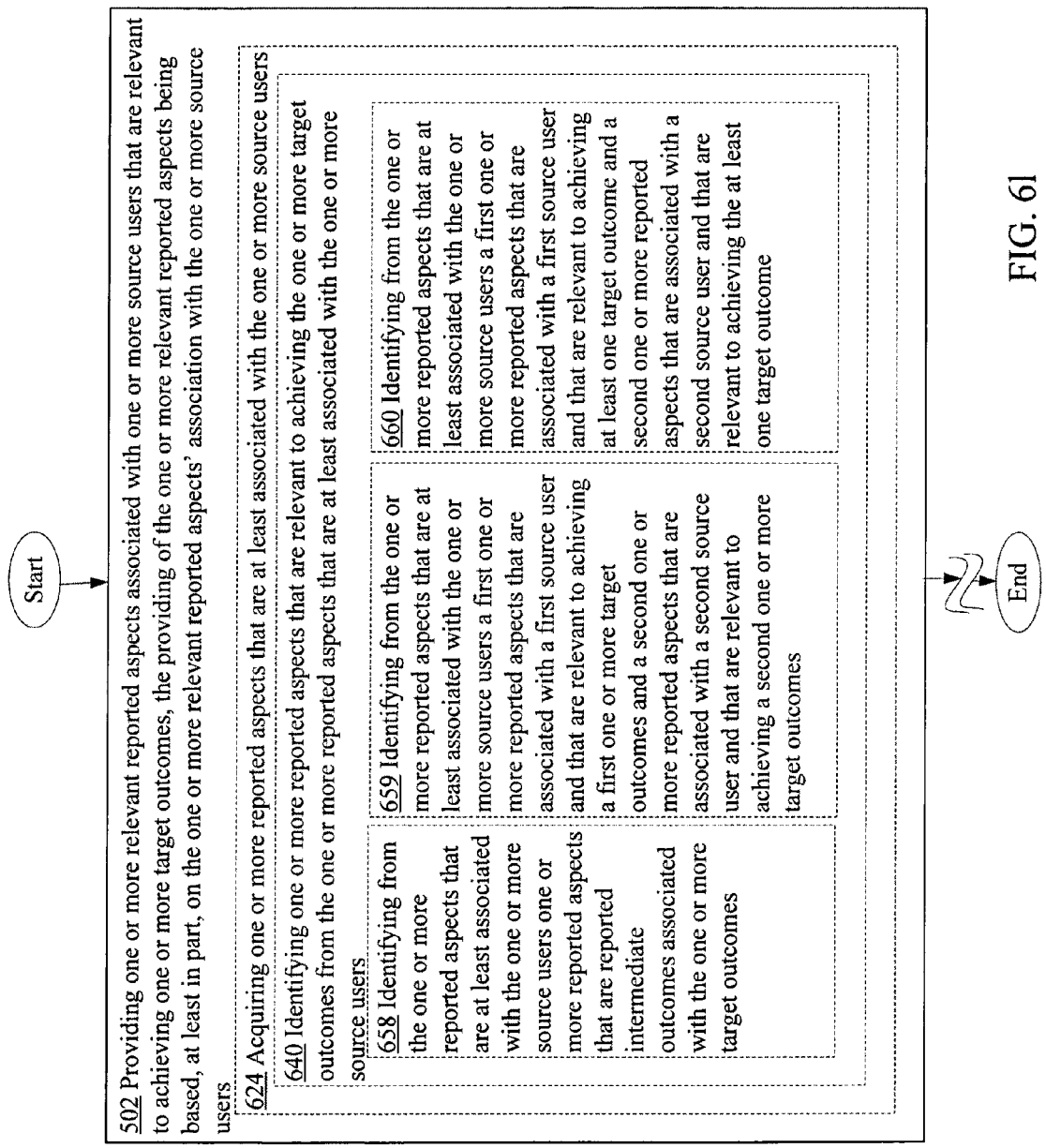

In the same or different implementations, operation 640 may include an operation 654 for identifying from the one or more reported aspects that are at least associated with the one or more source users one or more reported aspects that are related to one or more incidences of one or more user physical characteristics associated with the one or more source users as depicted in FIG. 6k. For instance, the relevant reported aspect identification module 202* of the server 10 of FIG. 1b, the local source user device 20' of FIG. 2b, or the local end user device 30" of FIG. 3b identifying from the one or more reported aspects 14* that are at least associated with the one or more source users 2 one or more reported aspects that are related to one or more incidences of one or more user physical characteristics (e.g., hair or eye color, hair length, hair style, facial hair characteristics, overall body figure, body weight, and so forth) associated with the one or more source users 2.

In the same or different implementations, operation 640 may include an operation 655 for identifying from the one or more reported aspects that are at least associated with the one or more source users one or more reported aspects that are related to one or more incidences of user locations associated with the one or more source users as depicted in FIG. 6k. For instance, the relevant reported aspect identification module 202* of the server 10 of FIG. 1b, the local source user device 20' of FIG. 2b, or the local end user device 30" of FIG. 3b identifying from the one or more reported aspects 14* that are at least associated with the one or more source users 2 one or more reported aspects that are related to one or more incidences of user locations (e.g., workplace, relatives' home, Los Angeles, Jamaica, and so forth) associated with the one or more source users 2.

In the same or different implementations, operation 640 may include an operation 656 for identifying from the one or more reported aspects that are at least associated with the one or more source users one or more reported aspects that are related to one or more incidences of external events associated with the one or more source users as depicted in FIG. 6k. For instance, the relevant reported aspect identification module 202* of the server 10 of FIG. 1b, the local source user device 20' of FIG. 2b, or the local end user device 30" of FIG. 3b identifying from the one or more reported aspects 14* that are at least associated with the one or more source users 2 one or more reported aspects that are related to one or more incidences of external events (e.g., boss going on vacation, spouse visiting a relative, rainy weather, and so forth) associated with the one or more source users 2.

In the same or different implementations, operation 640 may include an operation 657 for identifying from the one or more reported aspects that are at least associated with the one or more source users one or more reported aspects that corresponds to the one or more target outcomes as depicted in FIG. 6k. For instance, the relevant reported aspect identification module 202* of the server 10 of FIG. 1b, the local source user device 20' of FIG. 2b, or the local end user device 30" of FIG. 3b identifying from the one or more reported aspects 14* that are at least associated with the one or more source users 2** one or more reported aspects that corresponds to the one or more target outcomes.

In the same or different implementations, operation 640 may include an operation 658 for identifying from the one or more reported aspects that are at least associated with the one or more source users one or more reported aspects that are reported intermediate outcomes associated with the one or more target outcomes as depicted in FIG. 6l. For instance, the relevant reported aspect identification module 202* of the server 10 of FIG. 1b, the local source user device 20' of FIG. 2b, or the local end user device 30" of FIG. 3b identifying from the one or more reported aspects 14* that are at least associated with the one or more source users 2** one or more reported aspects that are reported intermediate outcomes (e.g., typing 80 words per minute) associated with the one or more target outcomes (e.g., typing 120 words per minute).

In the same or different implementations, operation 640 may include an operation 659 for identifying from the one or more reported aspects that are at least associated with the one or more source users a first one or more reported aspects that are associated with a first source user and that are relevant to achieving a first one or more target outcomes and a second one or more reported aspects that are associated with a second source user and that are relevant to achieving a second one or more target outcomes as depicted in FIG. 6l. For instance, the relevant reported aspect identification module 202* of the server 10 of FIG. 1b, the local source user device 20' of FIG. 2b, or the local end user device 30" of FIG. 3b identifying from the one or more reported aspects 14* that are at least associated with the one or more source users 2** a first one or more reported aspects (e.g., exercising) that are associated with a first source user 2a* and that are relevant to achieving a first one or more target outcomes (e.g., alertness and stamina) and a second one or more reported aspects (e.g., small portion meals) that are associated with a second source user 2b* and that are relevant to achieving a second one or more target outcomes (e.g. weight loss).

In the same or different implementations, operation 640 may include an operation 660 for identifying from the one or more reported aspects that are at least associated with the one or more source users a first one or more reported aspects that are associated with a first source user and that are relevant to achieving at least one target outcome and a second one or more reported aspects that are associated with a second source user and that are relevant to achieving the at least one target outcome as depicted in FIG. 6l. For instance, the relevant reported aspect identification module 202* of the server 10 of FIG. 1b, the local source user device 20' of FIG. 2b, or the local end user device 30" of FIG. 3b identifying from the one or more reported aspects 14* that are at least associated with the one or more source users 2** a first one or more reported aspects (e.g., hypnosis treatment) that are associated with a first source user 2a* and that are relevant to achieving at least one target outcome (e.g., self-confidence) and a second one or more reported aspects (e.g., hypnosis treatment) that are associated with a second source user 2b* and that are relevant to achieving the at least one target outcome (e.g., self-confidence).

Figure 6M:
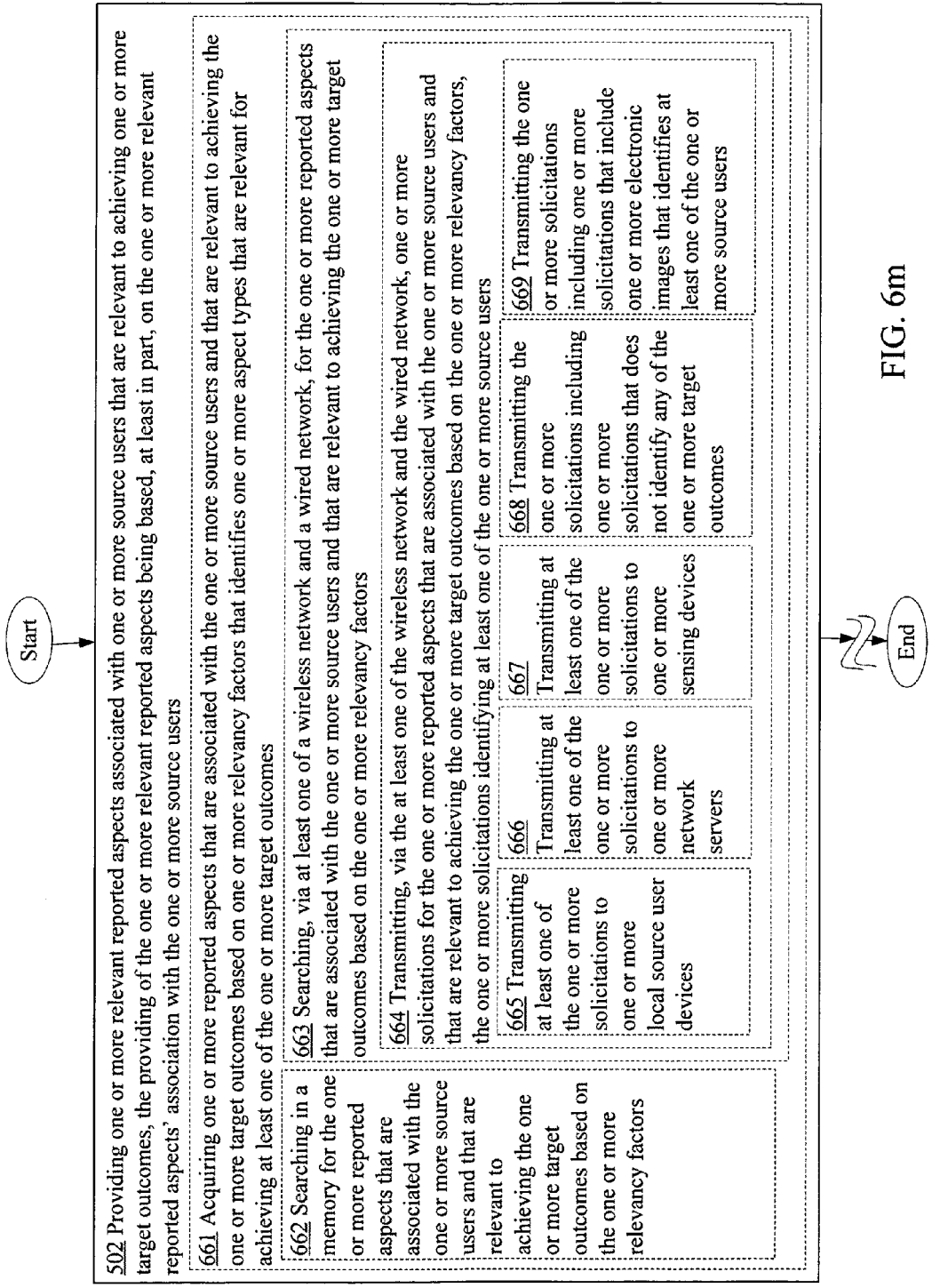
FIG. 6m is a high-level logic flowchart of a process depicting alternate implementations of the relevant reported aspect providing operation 502 of FIG. 5.

In some cases, the relevant reported aspect providing operation 502 of FIG. 5 may include one or more operations for acquiring one or more reported aspects that are both associated with one or more source users and that are relevant to achieving one or more target outcomes with respect to one or more relevancy factors. For example, in some implementations, the relevant reported aspect providing operation 502 may include an acquisition operation 661 for acquiring one or more reported aspects that are associated with the one or more source users and that are relevant to achieving the one or more target outcomes based on one or more relevancy factors that identifies one or more aspect types that are relevant for achieving at least one of the one or more target outcomes as depicted in FIG. 6m. Note that such an acquisition operation 661 is slightly different from the previously described acquisition operation 624 (see FIG. 6f), which involves acquiring one or more reported aspects that are merely associated with the one or more source users rather than acquiring one or more reported aspects that are associated with the one or more source users and that are relevant (e.g., at least based on one or more relevancy factors) to achieving one or more target outcomes. For instance, and as a illustration, the reported aspect acquisition module 204* (see FIG. 4a) of the server 10 of FIG. 1b, the local source user device 20' of FIG. 2b, or the local end user device 30" of FIG. 3b acquiring (e.g., retrieving, soliciting, finding, and so forth) one or more reported aspects 15* that are associated with the one or more source users 2** and that are relevant to achieving the one or more target outcomes based on one or more relevancy factors that identifies one or more aspect types that are relevant for achieving at least one of the one or more target outcomes.

Operation 661 may, in turn, include one or more additional operations in various alternative implementations. For example, in some implementations, the acquisition operation 661 may include an operation 662 for searching in a memory for the one or more reported aspects that are associated with the one or more source users and that are relevant to achieving the one or more target outcomes based on the one or more relevancy factors as depicted in FIG. 6m. For instance, the memory searching module 206* (see FIG. 4a) of the server 10 of FIG. 1b, the local source user device 20' of FIG. 2b, or the local end user device 30" of FIG. 3b searching in a memory 116* for the one or more reported aspects 15* that are associated with the one or more source users 2** and that are relevant to achieving the one or more target outcomes based on the one or more relevancy factors (e.g., one or more indications provided by the end user 4* or by one or more source users 2** as to what types of reported aspects are relevant).

In the same or different implementations, the acquisition operation 661 may include an operation 663 for searching, via at least one of a wireless network and a wired network, for the one or more reported aspects that are associated with the one or more source users and that are relevant to achieving the one or more target outcomes based on the one or more relevancy factors as depicted in FIG. 6m. For instance, the network searching module 208* (see FIG. 4a) of the server 10 of FIG. 1b, the local source user device 20' of FIG. 2b, or the local end user device 30" of FIG. 3b searching, via at least one of a wireless network and a wired network 50*, for the one or more reported aspects 15* that are associated with the one or more source users 2**and that are relevant to achieving the one or more target outcomes, the searching being based on the one or more relevancy factors.

In order to search for the one or more reported aspects via the at least one of the wireless network and the wired network 50*, one or more operations for transmitting one or more solicitations 13* may be executed in various alternative implementations. For example, in some implementations, operation 663 may include an operation 664 for transmitting, via the at least one of the wireless network and the wired network, one or more solicitations for the one or more reported aspects that are associated with the one or more source users and that are relevant to achieving the one or more target outcomes based on the one or more relevancy factors, the one or more solicitations identifying at least one of the one or more source users as depicted in FIG. 6m. For instance, the solicitation transmission module 210* (see FIG. 4a) of the server 10 of FIG. 1b, the local source user device 20' of FIG. 2b, or the local end user device 30" of FIG. 3b transmitting, via the at least one of the wireless network and the wired network 50*, one or more solicitations 13* for the one or more reported aspects 15* that are associated with the one or more source users 2** and that are relevant to achieving the one or more target outcomes based on the one or more relevancy factors, the one or more solicitations 13* identifying at least one of the one or more source users 2**.

In various implementations, operation 664 may be executed in a variety of different ways as will be further described herein. For example, in some implementations, operation 664 may include an operation 665 for transmitting at least one of the one or more solicitations to one or more local source user devices as depicted in FIG. 6m. For instance, the solicitation transmission module 210* of the server 10 of FIG. 1b, the local source user device 20' of FIG. 2b, or the local end user device 30" of FIG. 3b transmitting (e.g., via at the wireless network and/or wired network 50*) at least one of the one or more solicitations 13* to one or more local source user devices 20**.

In the same or different implementations, operation 664 may include an operation 666 for transmitting at least one of the one or more solicitations to one or more network servers as depicted in FIG. 6m. For instance, the solicitation transmission module 210* of the server 10 of FIG. 1b, the local source user device 20' of FIG. 2b, or the local end user device 30" of FIG. 3b transmitting at least one of the one or more solicitations 13*to one or more network servers 60*.

In the same or different implementations, operation 664 may include an operation 667 for transmitting at least one of the one or more solicitations to one or more sensing devices as depicted in FIG. 6m. For instance, the solicitation transmission module 210* of the server 10 of FIG. 1b, the local source user device 20' of FIG. 2b, or the local end user device 30" of FIG. 3b transmitting at least one of the one or more solicitations 13* to one or more sensing devices 40*.

In the same or different implementations, operation 664 may include an operation 668 for transmitting the one or more solicitations including one or more solicitations that does not identify any of the one or more target outcomes as depicted in FIG. 6m. For instance, the solicitation transmission module 210* of the server 10 of FIG. 1b, the local source user device 20' of FIG. 2b, or the local end user device 30" of FIG. 3b transmitting the one or more solicitations 13* including one or more solicitations 13* that does not identify any of the one or more target outcomes.

In the same or different implementations, operation 664 may include an operation 669 for transmitting the one or more solicitations including one or more solicitations that include one or more electronic images that identifies at least one of the one or more source users as depicted in FIG. 6m. For instance, the solicitation transmission module 210* of the server 10 of FIG. 1b, the local source user device 20' of FIG. 2b, or the local end user device 30" of FIG. 3b transmitting the one or more solicitations 13** including one or more solicitations 13* that include one or more electronic images that identifies (e.g., facilitates in the identification of) at least one of the one or more source users 2**.

Figure 6N:
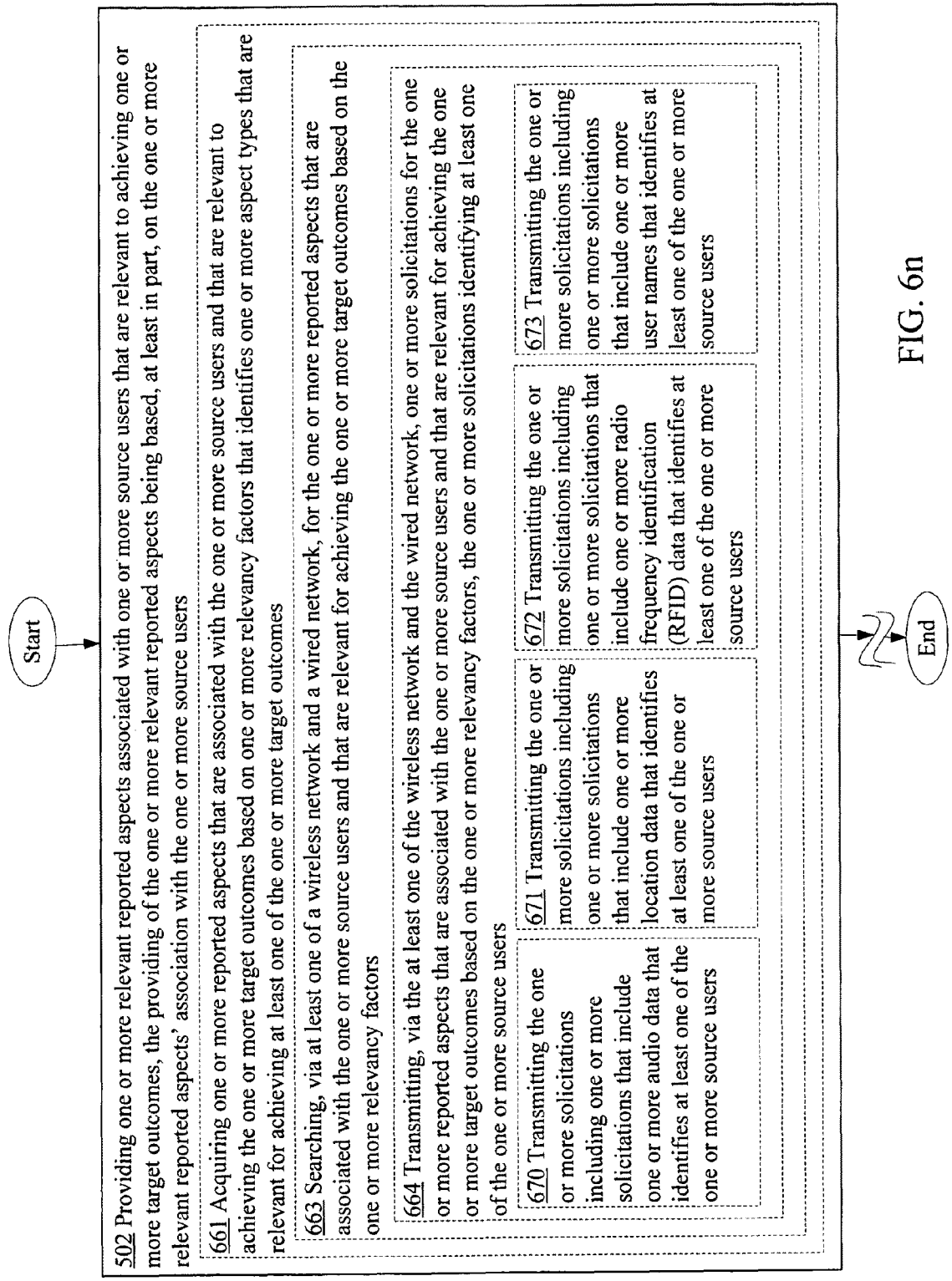
FIG. 6n is a high-level logic flowchart of a process depicting alternate implementations of the relevant reported aspect providing operation 502 of FIG. 5.
Figure 60:
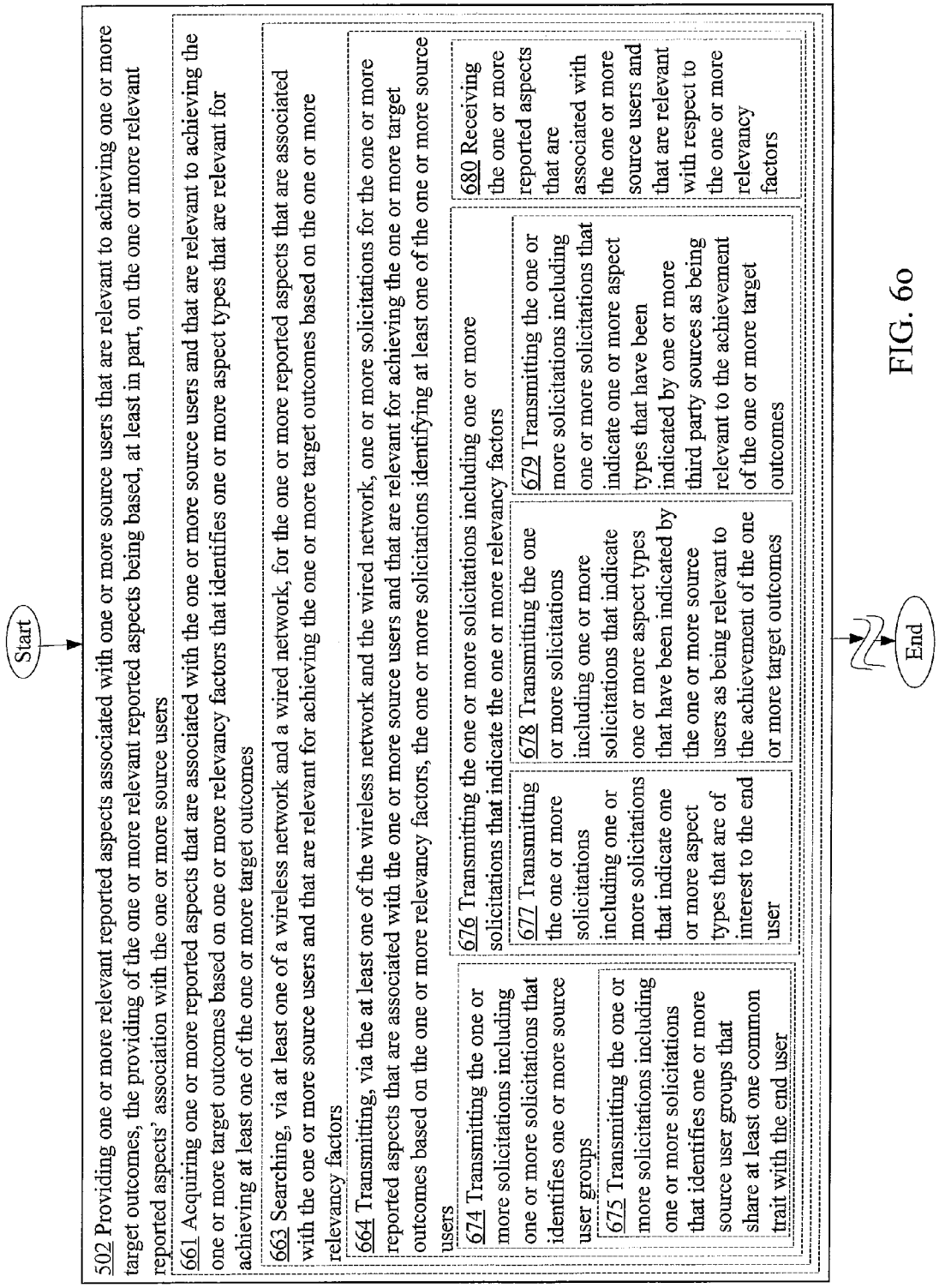

In the same or different implementations, operation 664 may include an operation 670 for transmitting the one or more solicitations including one or more solicitations that include one or more audio data that identifies at least one of the one or more source users as depicted in FIG. 6n. For instance, the solicitation transmission module 210* of the server 10 of FIG. 1b, the local source user device 20' of FIG. 2b, or the local end user device 30" of FIG. 3b transmitting the one or more solicitations 13* including one or more solicitations 13* that include one or more audio data that identifies (e.g., facilitates in the identification of) at least one of the one or more source users 2**.

In the same or different implementations, operation 664 may include an operation 671 for transmitting the one or more solicitations including one or more solicitations that include one or more location data that identifies at least one of the one or more source users as depicted in FIG. 6n. For instance, the solicitation transmission module 210* of the server 10 of FIG. 1b, the local source user device 20' of FIG. 2b, or the local end user device 30" of FIG. 3b transmitting the one or more solicitations 13** including one or more solicitations 13* that include one or more location data that identifies (e.g., facilitates in the identification of) at least one of the one or more source users 2**.

In the same or different implementations, operation 664 may include an operation 672 for transmitting the one or more solicitations including one or more solicitations that include one or more radio frequency identification (RFID) data that identifies at least one of the one or more source users as depicted in FIG. 6n. For instance, the solicitation transmission module 210* of the server 10 of FIG. 1b, the local source user device 20' of FIG. 2b, or the local end user device 30" of FIG. 3b transmitting the one or more solicitations 13* including one or more solicitations 13* that include one or more radio frequency identification (RFID) data that identifies at least one of the one or more source users 2**.

In the same or different implementations, operation 664 may include an operation 673 for transmitting the one or more solicitations including one or more solicitations that include one or more user names that identifies at least one of the one or more source users as depicted in FIG. 6n. For instance, the solicitation transmission module 210* of the server 10 of FIG. 1b, the local source user device 20' of FIG. 2b, or the local end user device 30" of FIG. 3b transmitting the one or more solicitations 13* including one or more solicitations 13* that include one or more user names that identifies at least one of the one or more source users 2**.

In the same or different implementations, operation 664 may include an operation 674 for transmitting the one or more solicitations including one or more solicitations that identifies one or more source user groups as depicted in FIG. 6o. For instance, the solicitation transmission module 210* of the server 10 of FIG. 1b, the local source user device 20' of FIG. 2b, or the local end user device 30" of FIG. 3b transmitting the one or more solicitations 13* including one or more solicitations 13* that identifies one or more source user groups.

In some cases, operation 674 may further include an operation 675 for transmitting the one or more solicitations including one or more solicitations that identifies one or more source user groups that share at least one common trait with the end user as depicted in FIG. 6o. For instance, the solicitation transmission module 210* of the server 10 of FIG. 1b, the local source user device 20' of FIG. 2b, or the local end user device 30" of FIG. 3b transmitting the one or more solicitations 13* including one or more solicitations 13* that identifies one or more source user groups that share at least one common trait with the end user 4*.

In the same or different implementations, operation 664 may include an operation 676 for transmitting the one or more solicitations including one or more solicitations that indicate the one or more relevancy factors as depicted in FIG. 6o. For instance, the solicitation transmission module 210* (see FIG. 4a) of the server 10 of FIG. 1b, the local source user device 20' of FIG. 2b, or the local end user device 30" of FIG. 3b transmitting the one or more solicitations 13* including one or more solicitations 13* that indicate the one or more relevancy factors.

Various types of relevancy factors may be indicated by the one or more solicitations 13* in various alternative implementations. For example, in some implementations, operation 676 may include an operation 677 for transmitting the one or more solicitations including one or more solicitations that indicate one or more aspect types that are of interest to the end user as depicted in FIG. 6o. For instance, the solicitation transmission module 210* of the server 10 of FIG. 1b, the local source user device 20' of FIG. 2b, or the local end user device 30" of FIG. 3b transmitting the one or more solicitations 13* including one or more solicitations 13* that indicate one or more aspect types (e.g., the local weather associated with the one or more source users 2, what brand or types of toiletries is being used by the one or more source users 2, and so forth) that are of interest to the end user 4*.

In the same or different implementations, operation 676 may include an operation 678 for transmitting the one or more solicitations including one or more solicitations that indicate one or more aspect types that have been indicated by the one or more source users as being relevant to the achievement of the one or more target outcomes as depicted in FIG. 6o. For instance, the solicitation transmission module 210* of the server 10 of FIG. 1b, the local source user device 20' of FIG. 2b, or the local end user device 30" of FIG. 3b transmitting the one or more solicitations 13* including one or more solicitations 13* that indicate one or more aspect types (e.g., working out on exercise machines) that have been indicated by the one or more source users 2** as being relevant to the achievement of the one or more target outcomes (e.g., being alert at work).

In the same or different implementations, operation 676 may include an operation 679 for transmitting the one or more solicitations including one or more solicitations that indicate one or more aspect types that have been indicated by one or more third party sources as being relevant to the achievement of the one or more target outcomes as depicted in FIG. 6o. For instance, the solicitation transmission module 210* of the server 10 of FIG. 1b, the local source user device 20' of FIG. 2b, or the local end user device 30" of FIG. 3b transmitting the one or more solicitations 13* including one or more solicitations 13* that indicate one or more aspect types (e.g., sleep or rest activities) that have been indicated by one or more third party sources (e.g., research publication) as being relevant to the achievement of the one or more target outcomes (e.g., body weight loss).

In some implementations, operation 664 may include an operation 680 for receiving the one or more reported aspects that are associated with the one or more source users and that are relevant with respect to the one or more relevancy factors as depicted in FIG. 6o. For instance, the reported aspect reception module 212* (see FIG. 4a) of the server 10 of FIG. 1b, the local source user device 20' of FIG. 2b, or the local end user device 30" of FIG. 3b receiving the one or more reported aspects 15* that are associated with the one or more source users 2** and that are relevant with respect to the one or more relevancy factors.

Figure 6P:
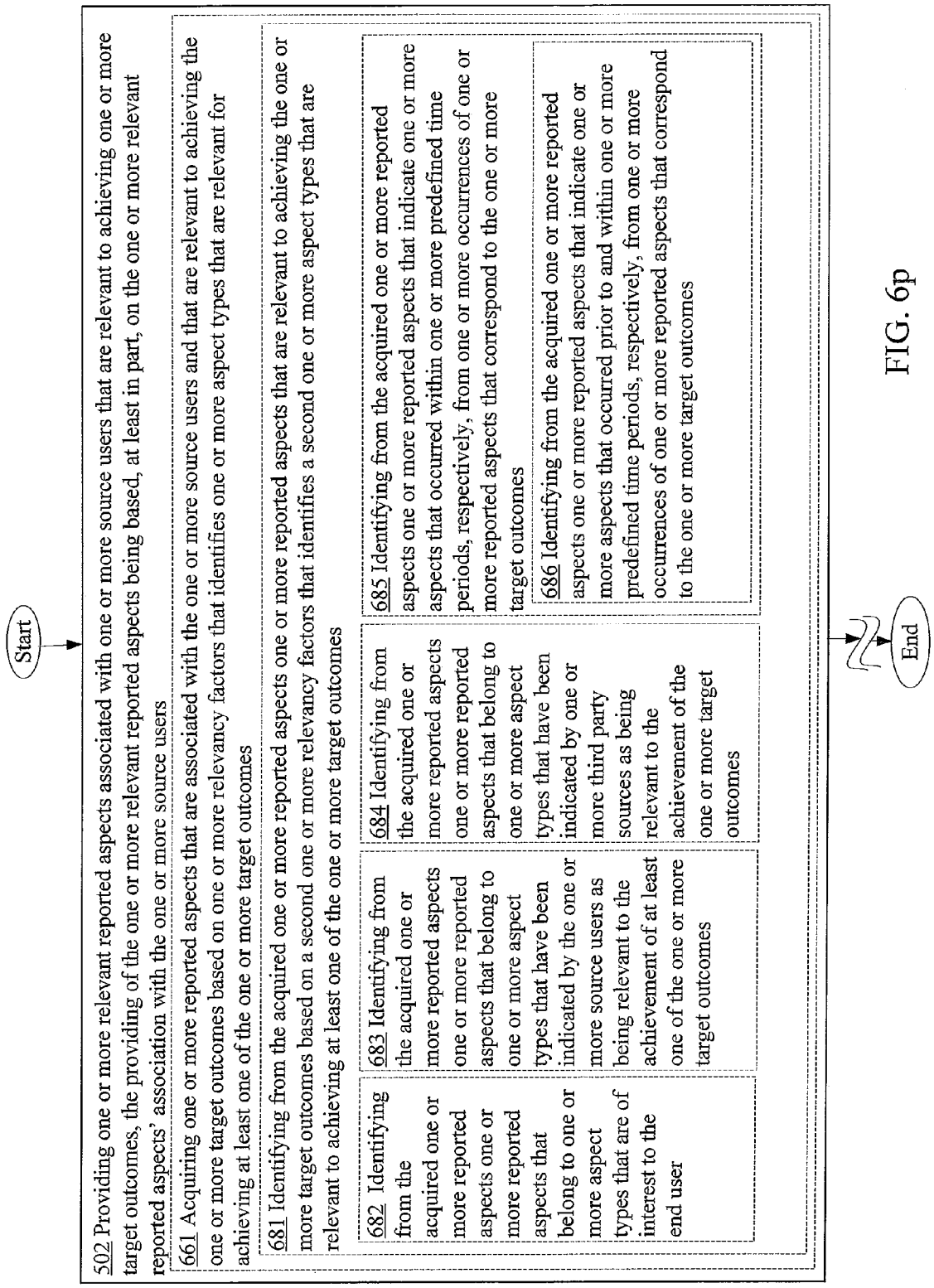
FIG. 6p is a high-level logic flowchart of a process depicting alternate implementations of the relevant reported aspect providing operation 502 of FIG. 5.

In various implementations, the acquisition operation 661 for acquiring the one or more reported aspects that are associated with the one or more source users and that are relevant for achieving the one or more target outcomes based on one or more relevancy factors may further include one or more operations for identifying from the one or more acquired reported aspects one or more reported aspects that are relevant to achieving the one or more target outcomes based on a second one or more relevancy factors. For example, in some implementations, the acquisition operation 661 may include an operation 681 for identifying from the acquired one or more reported aspects one or more reported aspects that are relevant to achieving the one or more target outcomes based on a second one or more relevancy factors that identifies a second one or more aspect types that are relevant to achieving at least one of the one or more target outcomes as depicted in FIG. 6p. For instance, the relevant reported aspect identification module 202* (see FIG. 4a) of the server 10 of FIG. 1b, the local source user device 20' of FIG. 2b, or the local end user device 30" of FIG. 3b identifying from the acquired one or more reported aspects 15* one or more reported aspects that are relevant to achieving the one or more target outcomes based on a second one or more relevancy factors that identifies a second one or more aspect types that are relevant to achieving at least one of the one or more target outcomes.

Various types of relevancy factors may be involved in identifying the one or more reported aspects that are relevant from the one or more acquired reported aspects in various alternative implementations. For example, in some implementations, operation 681 may include an operation 682 for identifying from the acquired one or more reported aspects one or more reported aspects that belong to one or more aspect types that are of interest to the end user as depicted in FIG. 6p. For instance, the relevant reported aspect identification module 202* of the server 10 of FIG. 1b, the local source user device 20' of FIG. 2b, or the local end user device 30" of FIG. 3b identifying from the acquired one or more reported aspects 15* one or more reported aspects that belong to one or more aspect types that are of interest to the end user 4*.

In the same or different implementations, operation 681 may include an operation 683 for identifying from the acquired one or more reported aspects one or more reported aspects that belong to one or more aspect types that have been indicated by the one or more source users as being relevant to the achievement of at least one of the one or more target outcomes as depicted in FIG. 6p. For instance, the relevant reported aspect identification module 202* of the server 10 of FIG. 1b, the local source user device 20' of FIG. 2b, or the local end user device 30" of FIG. 3b identifying from the acquired one or more reported aspects 15* one or more reported aspects that belong to one or more aspect types that have been indicated by the one or more source users 2** as being relevant to the achievement of at least one of the one or more target outcomes.

In the same or different implementations, operation 681 may include an operation 684 for identifying from the acquired one or more reported aspects one or more reported aspects that belong to one or more aspect types that have been indicated by one or more third party sources as being relevant to the achievement of the one or more target outcomes as depicted in FIG. 6p. For instance, the relevant reported aspect identification module 202* of the server 10 of FIG. 1b, the local source user device 20' of FIG. 2b, or the local end user device 30" of FIG. 3b identifying from the acquired one or more reported aspects 15* one or more reported aspects that belong to one or more aspect types that have been indicated by one or more third party sources (e.g., one or more third parties 6*) as being relevant to the achievement of the one or more target outcomes.

In the same or different implementations, operation 681 may include an operation 685 for identifying from the acquired one or more reported aspects one or more reported aspects that indicate one or more aspects that occurred within one or more predefined time periods, respectively, from one or more occurrences of one or more reported aspects that correspond to the one or more target outcomes as depicted in FIG. 6p. For instance, the relevant reported aspect identification module 202* of the server 10 of FIG. 1b, the local source user device 20' of FIG. 2b, or the local end user device 30" of FIG. 3b identifying from the acquired one or more reported aspects 15* one or more reported aspects (e.g., reading particular books) that indicate one or more aspects that occurred within one or more predefined time periods (e.g., two months), respectively, from one or more occurrences of one or more reported aspects that correspond to the one or more target outcomes (e.g., improved or high exam score).

In some cases, operation 685 may further include an operation 686 for identifying from the acquired one or more reported aspects one or more reported aspects that indicate one or more aspects that occurred prior to and within one or more predefined time periods, respectively, from one or more occurrences of one or more reported aspects that correspond to the one or more target outcomes as depicted in FIG. 6p. For instance, the relevant reported aspect identification module 202* of the server 10 of FIG. 1b, the local source user device 20' of FIG. 2b, or the local end user device 30" of FIG. 3b identifying from the acquired one or more reported aspects 15* one or more reported aspects that indicate one or more aspects that occurred prior to and within one or more predefined time periods, respectively, from one or more occurrences of one or more reported aspects that correspond to the one or more target outcomes. Note that in some cases, it may be possible for a reported aspect that is relevant to achieving a target outcome to have occurred after the occurrence of the target outcome (e.g., as indicated by a corresponding reported aspect). However, the more general case may be the case where a reported aspect that is associated with a source user 2 and that is relevant to achieving one or more target outcomes will also indicate an aspect that occurred prior to the achievement of the target outcome by the source user 2.

Figure 6Q:
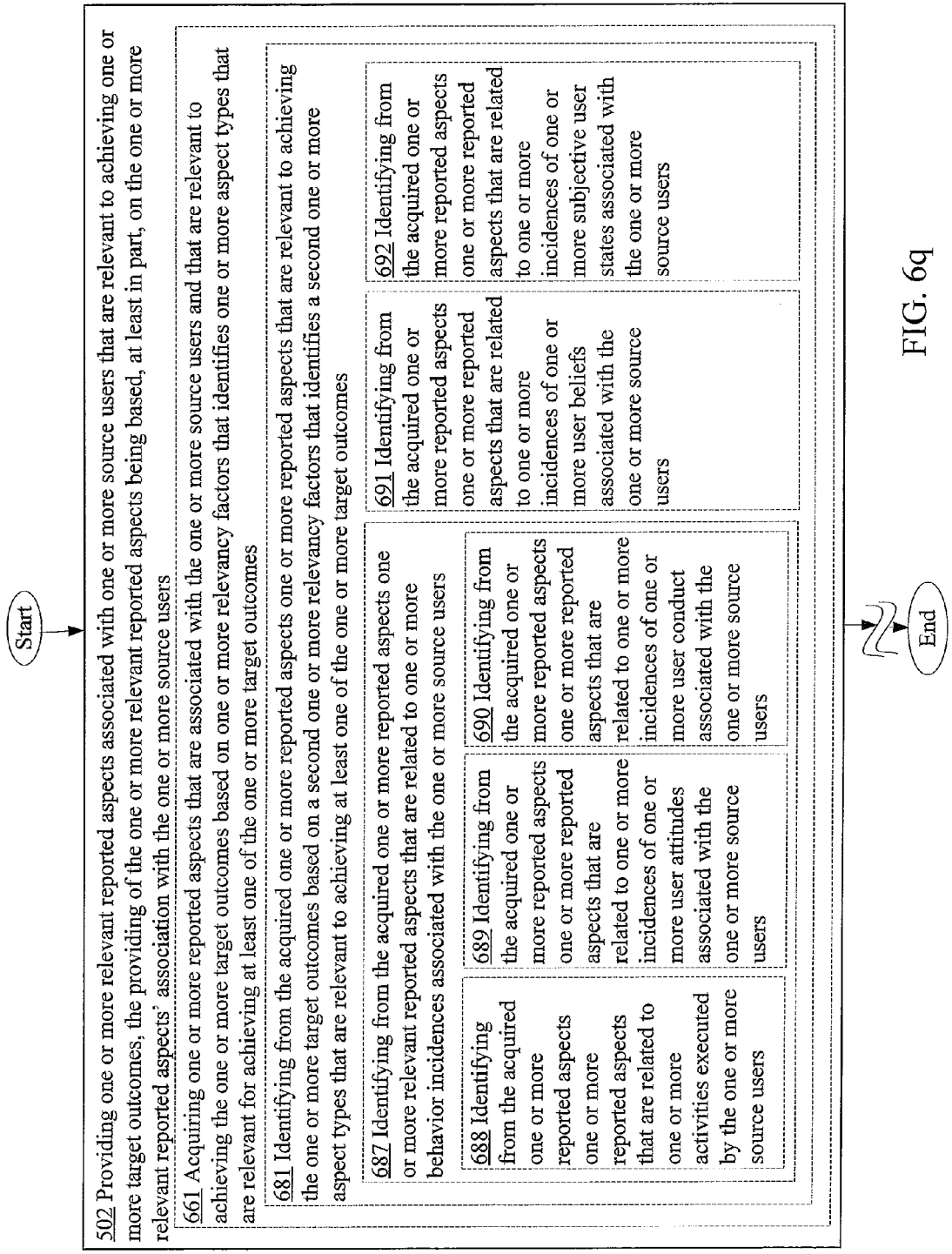
FIG. 6q is a high-level logic flowchart of a process depicting alternate implementations of the relevant reported aspect providing operation 502 of FIG. 5.

Various types of reported aspects may be identified through operation 681 in various alternative implementations. For example, in some implementations, operation 681 may include an operation 687 for identifying from the acquired one or more reported aspects one or more relevant reported aspects that are related to one or more behavior incidences associated with the one or more source users as depicted in FIG. 6q. For instance, the relevant reported aspect identification module 202* of the server 10 of FIG. 1b, the local source user device 20' of FIG. 2b, or the local end user device 30" of FIG. 3b identifying from the acquired one or more reported aspects 15* one or more relevant reported aspects that are related to one or more behavior incidences associated with the one or more source users 2**.

Various types of behavior incidences may be indicated by the one or more relevant reported aspects identified through operation 687 in various alternative implementations. For example, in some implementations, operation 687 may include an operation 688 for identifying from the acquired one or more reported aspects one or more reported aspects that are related to one or more activities executed by the one or more source users as depicted in FIG. 6q. For instance, the relevant reported aspect identification module 202* of the server 10 of FIG. 1b, the local source user device 20' of FIG. 2b, or the local end user device 30" of FIG. 3b identifying from the acquired one or more reported aspects 15* one or more reported aspects that are related to one or more activities (e.g., dietary activities, exercise activities, leisure activities, social activities, employment activities, and so forth) executed by the one or more source users 2**.

In the same or different implementations, operation 687 may include an operation 689 for identifying from the acquired one or more reported aspects one or more reported aspects that are related to one or more incidences of one or more user attitudes associated with the one or more source users as depicted in FIG. 6q. For instance, the relevant reported aspect identification module 202* of the server 10 of FIG. 1b, the local source user device 20' of FIG. 2b, or the local end user device 30" of FIG. 3b identifying from the acquired one or more reported aspects 15* one or more reported aspects that are related to one or more incidences of one or more user attitudes (e.g., being indifferent, feeling critical, feeling skeptical, feeling optimistic, and so forth) associated with the one or more source users 2**.

In the same or different implementations, operation 687 may include an operation 690 for identifying from the acquired one or more reported aspects one or more reported aspects that are related to one or more incidences of one or more user conduct associated with the one or more source users as depicted in FIG. 6q. For instance, the relevant reported aspect identification module 202* of the server 10 of FIG. 1b, the local source user device 20' of FIG. 2b, or the local end user device 30" of FIG. 3b identifying from the acquired one or more reported aspects 15* one or more reported aspects that are related to one or more incidences of one or more user conduct (e.g., behavior towards others, treatment of others, manner in which acts are executed, and so forth) associated with the one or more source users 2**.

Other types of reported aspects may also be identified by operation 681 in various implementations. For example, in some implementations, operation 681 may include an operation 691 for identifying from the acquired one or more reported aspects one or more reported aspects that are related to one or more incidences of one or more user beliefs associated with the one or more source users as depicted in FIG. 6q. For instance, the relevant reported aspect identification module 202* of the server 10 of FIG. 1b, the local source user device 20' of FIG. 2b, or the local end user device 30" of FIG. 3b identifying from the acquired one or more reported aspects 15\* one or more reported aspects that are related to one or more incidences of one or more user beliefs (e.g., religious beliefs, spiritual beliefs, prejudicial beliefs, political beliefs, and so forth) associated with the one or more source users **2\*\***.

In the same or different implementations, operation 681 may include an operation 692 for identifying from the acquired one or more reported aspects one or more reported aspects that are related to one or more incidences of one or more subjective user states associated with the one or more source users as depicted in FIG. 6q. For instance, the relevant reported aspect identification module 202\* of the server 10 of FIG. 1b, the local source user device 20' of FIG. 2b, or the local end user device 30" of FIG. 3b identifying from the acquired one or more reported aspects 15\* one or more reported aspects that are related to one or more incidences of one or more subjective user states (e.g., subjective user mental states, subjective user physical states, and/or subjective user overall states) associated with the one or more source users **2\*\***.

Figure 6R:
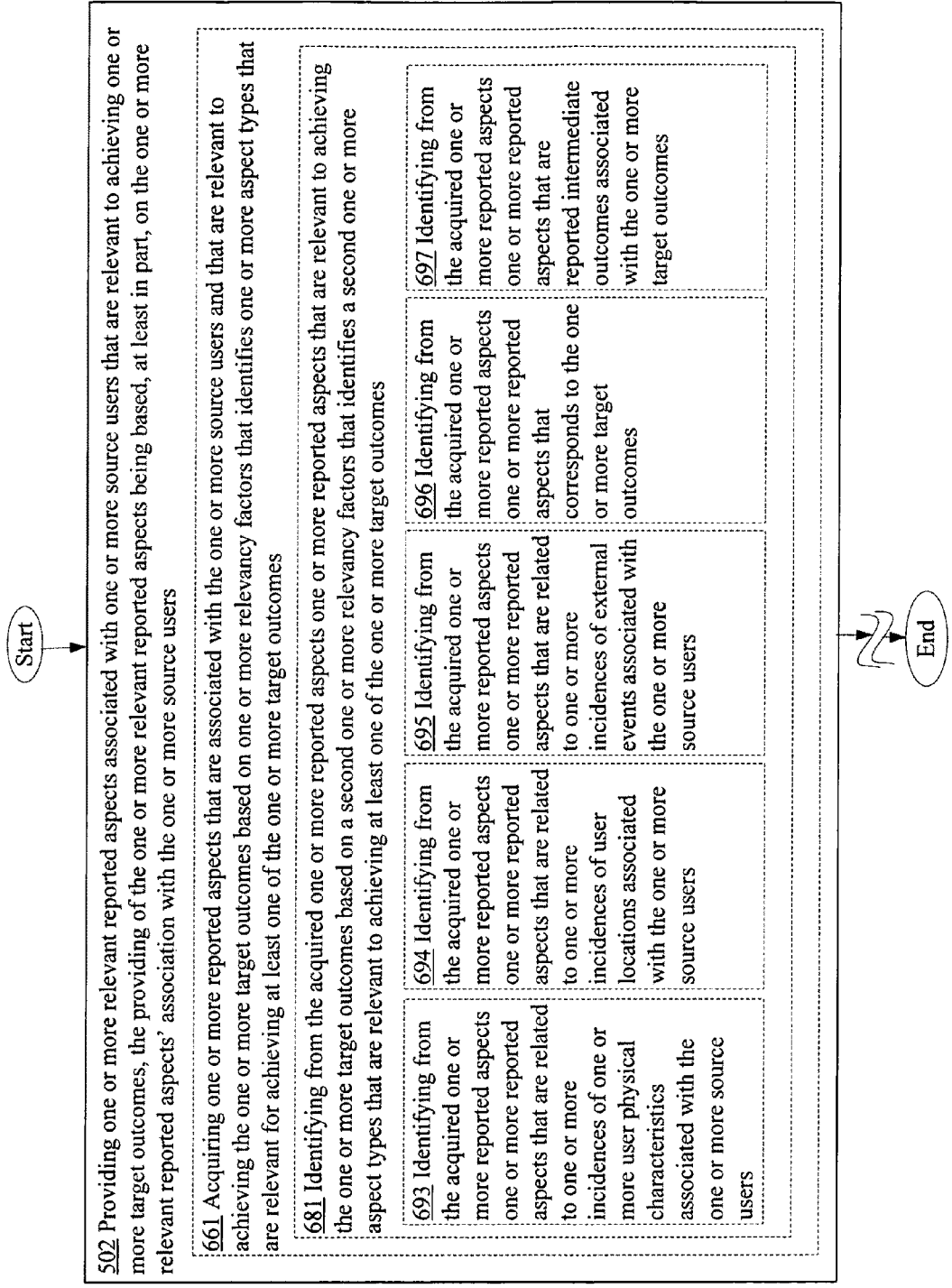
FIG. 6r is a high-level logic flowchart of a process depicting alternate implementations of the relevant reported aspect providing operation 502 of FIG. 5.

In the same or different implementations, operation 681 may include an operation 693 for identifying from the acquired one or more reported aspects one or more reported aspects that are related to one or more incidences of one or more user physical characteristics associated with the one or more source users as depicted in FIG. 6r. For instance, the relevant reported aspect identification module 202\* of the server 10 of FIG. 1b, the local source user device 20' of FIG. 2b, or the local end user device 30" of FIG. 3b identifying from the acquired one or more reported aspects 15\* one or more reported aspects that are related to one or more incidences of one or more user physical characteristics (e.g., hair or eye color, hair length, hair style, facial hair characteristics, overall body figure, body weight, and so forth) associated with the one or more source users **2\*\***.

In the same or different implementations, operation 681 may include an operation 694 for identifying from the acquired one or more reported aspects one or more reported aspects that are related to one or more incidences of user locations associated with the one or more source users as depicted in FIG. 6r. For instance, the relevant reported aspect identification module 202\* of the server 10 of FIG. 1b, the local source user device 20' of FIG. 2b, or the local end user device 30" of FIG. 3b identifying from the acquired one or more reported aspects 15\* one or more reported aspects that are related to one or more incidences of user locations (e.g., home, workplace, New York City, beach, and so forth) associated with the one or more source users **2\*\***.

In the same or different implementations, operation 681 may include an operation 695 for identifying from the acquired one or more reported aspects one or more reported aspects that are related to one or more incidences of external events associated with the one or more source users as depicted in FIG. 6r. For instance, the relevant reported aspect identification module 202\* of the server 10 of FIG. 1b, the local source user device 20' of FIG. 2b, or the local end user device 30" of FIG. 3b identifying from the acquired one or more reported aspects 15\* one or more reported aspects that are related to one or more incidences of external events (e.g., weather conditions, heavy or no road traffic, stock market performance, and so forth) associated with the one or more source users **2\*\***.

In the same or different implementations, operation 681 may include an operation 696 for identifying from the acquired one or more reported aspects one or more reported aspects that corresponds to the one or more target outcomes as depicted in FIG. 6r. For instance, the relevant reported aspect identification module 202\* of the server 10 of FIG. 1b, the local source user device 20' of FIG. 2b, or the local end user device 30" of FIG. 3b identifying from the acquired one or more reported aspects 15\* one or more reported aspects that corresponds to the one or more target outcomes.

In the same or different implementations, operation 681 may include an operation 697 for identifying from the acquired one or more reported aspects one or more reported aspects that are reported intermediate outcomes associated with the one or more target outcomes as depicted in FIG. 6r. For instance, the relevant reported aspect identification module 202\* of the server 10 of FIG. 1b, the local source user device 20' of FIG. 2B, or the local end user device 30" of FIG. 3b identifying from the acquired one or more reported aspects 15\* one or more reported aspects that are reported intermediate outcomes (e.g., running a mile in 6 minutes) associated with the one or more target outcomes (e.g., running a mile in 5 minutes).

Figure 6S:
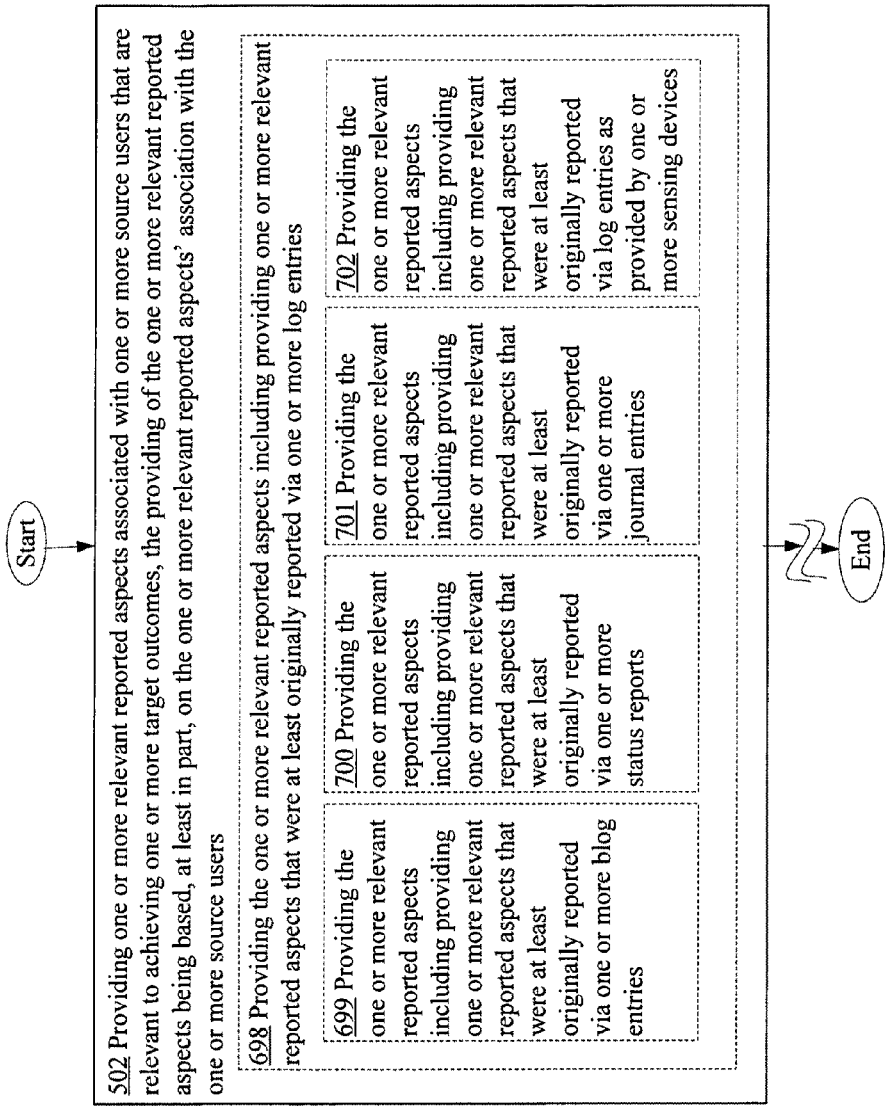
FIG. 6s is a high-level logic flowchart of a process depicting alternate implementations of the relevant reported aspect providing operation 502 of FIG. 5.

The one or more relevant reported aspects to be provided by the relevant reported aspect providing operation 502 of FIG. 5 may have been originally obtained by various alternative means. For example, in some implementations, the relevant reported aspect providing operation 502 may include an operation 698 for providing the one or more relevant reported aspects including providing one or more relevant reported aspects that were at least originally reported via one or more log entries as depicted in FIG. 6s. For instance, the relevant reported aspect provision module 102\* of the server 10 of FIG. 1b, the local source user device 20' of FIG. 2b, or the local end user device 30" of FIG. 3b providing the one or more relevant reported aspects including providing one or more relevant reported aspects that were at least originally reported via one or more log entries.

The one or more "log entries" referred to above may be in reference to any type of electronic entries that may be regularly or randomly entered electronically and that may indicate one or more aspects associated with one or more source users **2\*\*. For example, in some implementations, operation 698 may include an operation 699 for providing the one or more relevant reported aspects including providing one or more relevant reported aspects that were at least originally reported via one or more blog entries as depicted in FIG. 6s. For instance, the relevant reported aspect provision module 102\* of the server 10 of FIG. 1b, the local source user device 20' of FIG. 2b, or the local end user device 30" of FIG. 3b** providing the one or more relevant reported aspects including providing one or more relevant reported aspects that were at least originally reported via one or more blog entries (e.g., microblog entries).

In the same or different implementations, operation 698 may include an operation 700 for providing the one or more relevant reported aspects including providing one or more relevant reported aspects that were at least originally reported via one or more status reports as depicted in FIG. 6s. For instance, the relevant reported aspect provision module 102\* of the server 10 of FIG. 1b, the local source user device 20' of FIG. 2b, or the local end user device 30" of FIG. 3b providing the one or more relevant reported aspects including providing one or more relevant reported aspects that were at least originally reported via one or more status reports (e.g., social networking status reports).

In the same or different implementations, operation 698 may include an operation 701 for providing the one or more relevant reported aspects including providing one or more relevant reported aspects that were at least originally reported via one or more journal entries as depicted in FIG. 6s. For instance, the relevant reported aspect provision module 102* of the server 10 of FIG. 1b, the local source user device 20' of FIG. 2b, or the local end user device 30" of FIG. 3b providing the one or more relevant reported aspects including providing one or more relevant reported aspects that were at least originally reported via one or more journal entries (e.g., diary entries).

In the same or different implementations, operation 698 may include an operation 702 for providing the one or more relevant reported aspects including providing one or more relevant reported aspects that were at least originally reported via log entries as provided by one or more sensing devices as depicted in FIG. 6s. For instance, the relevant reported aspect provision module 102* of the server 10 of FIG. 1b, the local source user device 20' of FIG. 2b, or the local end user device 30" of FIG. 3b providing the one or more relevant reported aspects including providing one or more relevant reported aspects that were at least originally reported via log entries as provided by one or more sensing devices 40*.

Figure 7A:
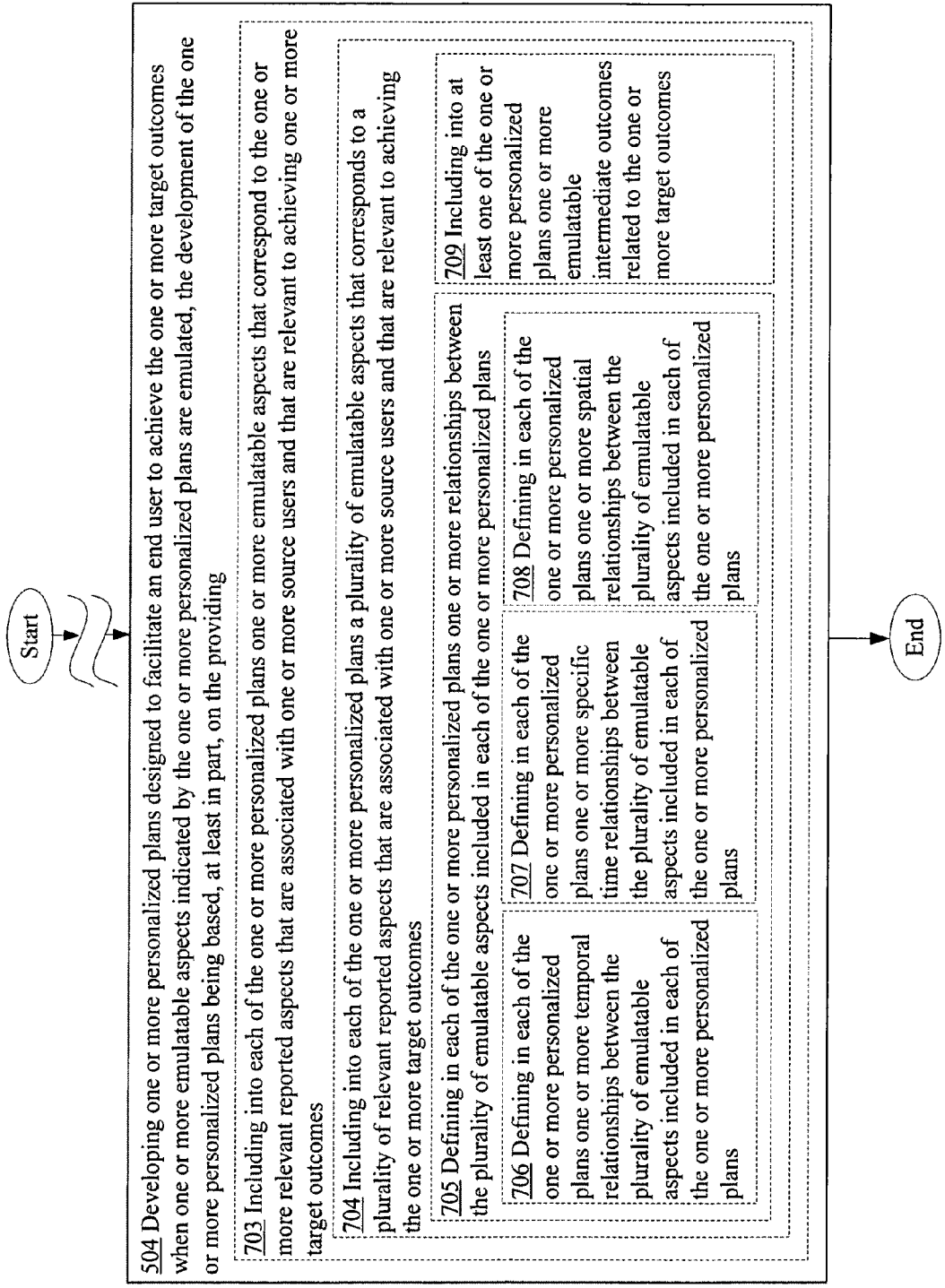
FIG. 7a is a high-level logic flowchart of a process depicting alternate implementations of the personalized plan development operation 504 of FIG. 5.

Referring back to the development operation 504 of FIG. 5 and as will be further described herein, the development operation 504 may include one or more additional operations in various implementations. For example, in some implementations, the development operation 504 may include an operation 703 for including into each of the one or more personalized plans one or more emulatable aspects that correspond to the one or more relevant reported aspects that are associated with one or more source users and that are relevant to achieving one or more target outcomes as depicted in FIG. 7a. For instance, the emulatable aspect inclusion module 220* (see FIG. 4b) of the server 10 of FIG. 1b, the local source user device 20' of FIG. 2b, or the local end user device 30" of FIG. 3b including into each of the one or more personalized plans 16* one or more emulatable aspects that correspond to the one or more relevant reported aspects (e.g., as provided through the relevant reported aspect providing operation 502) that are associated with one or more source users 2** and that are relevant to achieving one or target outcomes.

In some cases, operation 703 may further include an operation 704 for including into each of the one or more personalized plans a plurality of emulatable aspects that corresponds to a plurality of relevant reported aspects that are associated with one or more source users and that are relevant to achieving the one or more target outcomes as depicted in FIG. 7a. For instance, the emulatable aspect inclusion module 220* of the server 10 of FIG. 1b, the local source user device 20' of FIG. 2b, or the local end user device 30" of FIG. 3b including into each of the one or more personalized plans 16* a plurality of emulatable aspects that corresponds to a plurality of relevant reported aspects that are associated with one or more source users 2** and that are relevant to achieving the one or more target outcomes.

In turn, operation 704 may include, in various implementations, an operation 705 for defining in each of the one or more personalized plans one or more relationships between the plurality of emulatable aspects included in each of the one or more personalized plans as depicted in FIG. 7a. For instance, the relationship defining module 222* (see FIG. 4b) of the server 10 of FIG. 1b, the local source user device 20' of FIG. 2b, or the local end user device 30" of FIG. 3b defining in each of the one or more personalized plans 16* one or more relationships between the plurality of emulatable aspects included in each of the one or more personalized plans 16*.

Various types of relationships may be defined in the one or more personalized plans 16* to be developed in various alternative implementations. For example, in some implementations, operation 705 may include an operation 706 for defining in each of the one or more personalized plans one or more temporal relationships between the plurality of emulatable aspects included in each of the one or more personalized plans as depicted in FIG. 7a. For instance, the relationship defining module 222* of the server 10 of FIG. 1b, the local source user device 20' of FIG. 2b, or the local end user device 30" of FIG. 3b defining in each of the one or more personalized plans 16* one or more temporal relationships between the plurality of emulatable aspects included in each of the one or more personalized plans 16*. As a further illustration, for example, indicating in a personalized plan 16* to read a particular book first (e.g., a first emulatable aspect) before reading a second book (e.g., a second emulatable event) without providing a specific indication of the specific time relationship between the first and second emulatable aspects.

In the same or different implementations, operation 705 may include an operation 707 for defining in each of the one or more personalized plans one or more specific time relationships between the plurality of emulatable aspects included in each of the one or more personalized plans as depicted in FIG. 7a. For instance, the relationship defining module 222* of the server 10 of FIG. 1b, the local source user device 20' of FIG. 2b, or the local end user device 30" of FIG. 3b defining each of the one or more personalized plans 16* one or more specific time relationships between the plurality of emulatable aspects included in each of the one or more personalized plans 16*. As a further illustration, for example, indicating in a personalized plan 16* to walk for one hour (e.g., a first emulatable aspect) on a first day, and jogging for 30 minutes (e.g., a second emulatable aspect) two days later (e.g., specific time relationship).

In the same or different implementations, operation 705 may include an operation 708 for defining in each of the one or more personalized plans one or more spatial relationships between the plurality of emulatable aspects included in each of the one or more personalized plans as depicted in FIG. 7a. For instance, the relationship defining module 222* of the server 10 of FIG. 1b, the local source user device 20' of FIG. 2b, or the local end user device 30" of FIG. 3b defining each of the one or more personalized plans 16* one or more spatial relationships between the plurality of emulatable aspects included in each of the one or more personalized plans 16*. As a further illustration, for example, indicating in a personalized plan 16* to drink coffee (e.g., a first emulatable aspect) at home, and to drink tea (e.g., a second emulatable aspect) at work.

In the same or different implementations, the operation 704 for including into each of the one or more personalized plans a plurality of emulatable aspects may include an operation 709 for including into at least one of the one or more personalized plans one or more emulatable intermediate outcomes related to the one or more target outcomes as depicted in FIG. 7a. For instance, the emulatable intermediate outcome inclusion module 223 (see FIG. 4b) of the server 10 of FIG. 1b, the local source user device 20' of FIG. 2b, or the local end user device 30" of FIG. 3b including into at least one of the one or more personalized plans 16* one or more emulatable intermediate outcomes related to the one or more target outcomes. As a further illustration, for example, including into a personalized plan 16* for losing 30 pounds (e.g., target outcome) an emulatable intermediate outcome of 20 pounds at some point during the execution of the personalized plan 16*.

Figure 7B:
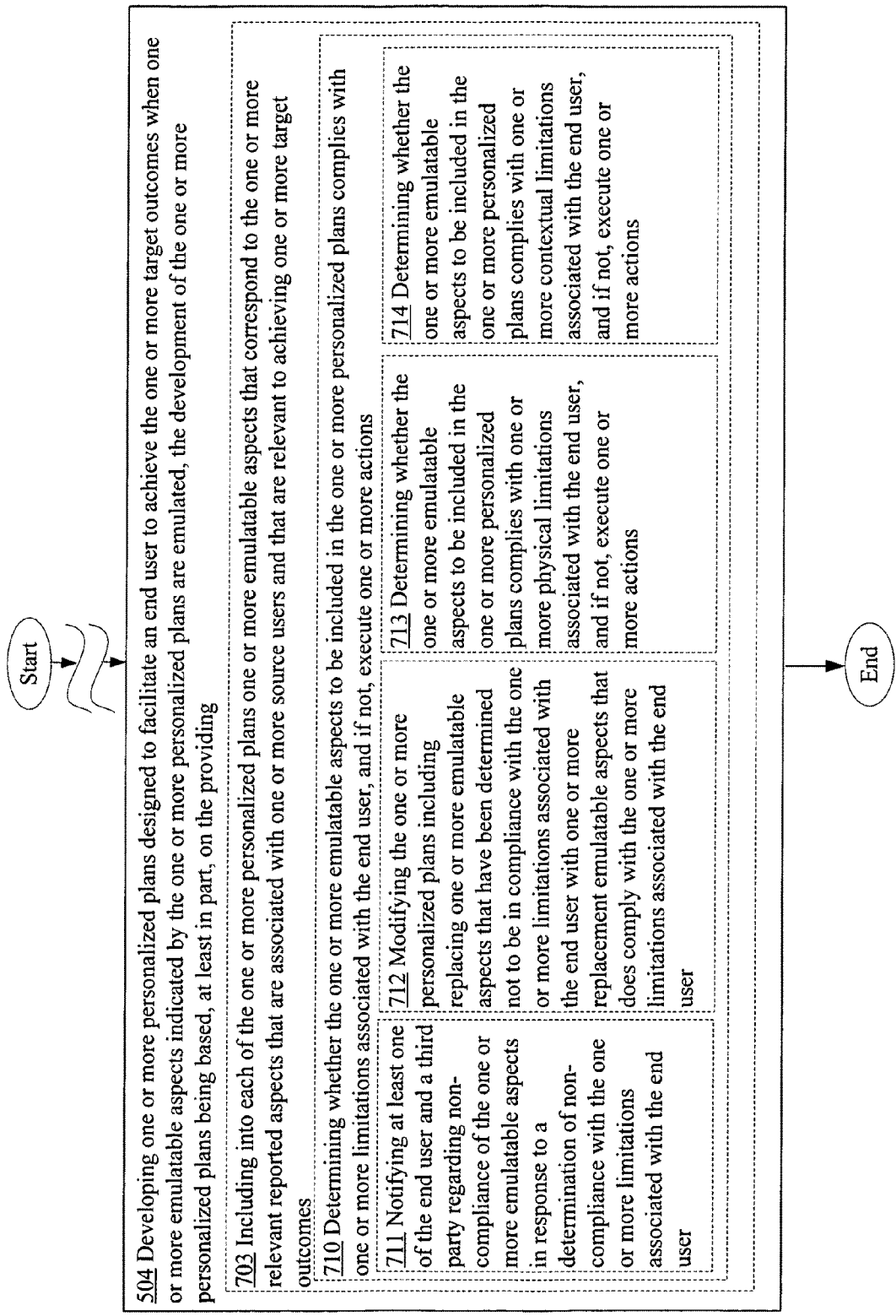
FIG. 7b is a high-level logic flowchart of a process depicting alternate implementations of the personalized plan development operation 504 of FIG. 5.

In various implementations, the operation 703 for including into each of the one or more personalized plans one or more emulatable aspects that correspond to the one or more relevant reported aspects may include an operation 710 for determining whether the one or more emulatable aspects to be included in the one or more personalized plans complies with one or more limitations associated with the end user, and if not, execute one or more actions as depicted in FIG. 7b. For instance, the limitation compliance determination module 224* (see FIG. 4b) of the server 10 of FIG. 1b, the local source user device 20' of FIG. 2b, or the local end user device 30" of FIG. 3b determining whether the one or more emulatable aspects to be included in the one or more personalized plans 16* complies with (e.g., does not violate) one or more limitations associated with the end user 4* (e.g., limitations that prevent or make it impractical for the one or more emulatable aspects to be successfully emulated), and if not, execute one or more actions.

In various implementations, operation 710 may further include one or more additional operations. For example, in some implementations, operation 710 may include an operation 711 for notifying at least one of the end user and a third party regarding non-compliance of the one or more emulatable aspects in response to a determination of non-compliance with the one or more limitations associated with the end user as depicted in FIG. 7b. For instance, the non-compliance notification module 226* (see FIG. 4b) of the server 10 of FIG. 1b, the local source user device 20' of FIG. 2b, or the local end user device 30" of FIG. 3b notifying at least one of the end user 4* and a third party 6* regarding non-compliance of the one or more emulatable aspects in response to a determination of non-compliance with the one or more limitations associated with the end user 4*.

In the same or different implementations, operation 710 may include an operation 712 for modifying the one or more personalized plans including replacing one or more emulatable aspects that have been determined not to be in compliance with the one or more limitations associated with the end user with one or more replacement emulatable aspects that does comply with the one or more limitations associated with the end user as depicted in FIG. 7b. For instance, the personalized plan modification module 228* (see FIG. 4b) of the server 10 of FIG. 1b, the local source user device 20' of FIG. 2b, or the local end user device 30" of FIG. 3b modifying the one or more personalized plans 16* including replacing one or more emulatable aspects that have been determined not to be in compliance with the one or more limitations associated with the end user 4* with one or more replacement emulatable aspects that does comply with the one or more limitations associated with the end user 4*. As a further illustration, if an emulatable aspect such as swimming for 40 minutes is determined to be non-compliant, than replacing the non-compliant emulatable aspect with a complaint emulatable aspect (e.g., jogging for 1 hour that results in the same amount of calories being burned) that is at least proximately equivalent, at least in substance, to the non-compliant emulatable aspect. Of course, what is "proximately equivalent" will depend on the type of emulatable aspect being replaced and the type of personalized plan 16* being developed.

In the same or different implementations, operation 710 may include an operation 713 for determining whether the one or more emulatable aspects to be included in the one or more personalized plans complies with one or more physical limitations associated with the end user, and if not, execute one or more actions as depicted in FIG. 7b. For instance, the limitation compliance determination module 224* of the server 10 of FIG. 1b, the local source user device 20' of FIG. 2b, or the local end user device 30" of FIG. 3b determining whether the one or more emulatable aspects to be included in the one or more personalized plans 16* complies with one or more physical limitations (e.g., missing limb, paralysis, visual or hearing impediment, and so forth) associated with the end user 4*, and if not, execute one or more actions.

In the same or different implementations, operation 710 may include an operation 714 for determining whether the one or more emulatable aspects to be included in the one or more personalized plans complies with one or more contextual limitations associated with the end user, and if not, execute one or more actions as depicted in FIG. 7b. For instance, the limitation compliance determination module 224* of the server 10 of FIG. 1b, the local source user device 20' of FIG. 2b, or the local end user device 30" of FIG. 3b determining whether the one or more emulatable aspects to be included in the one or more personalized plans 16* complies with one or more contextual limitations (e.g., logistical limitations such as scheduling limitations, geographical limitations, asset limitations, and so forth) associated with the end user 4*, and if not, execute one or more actions.

Figure 7C:
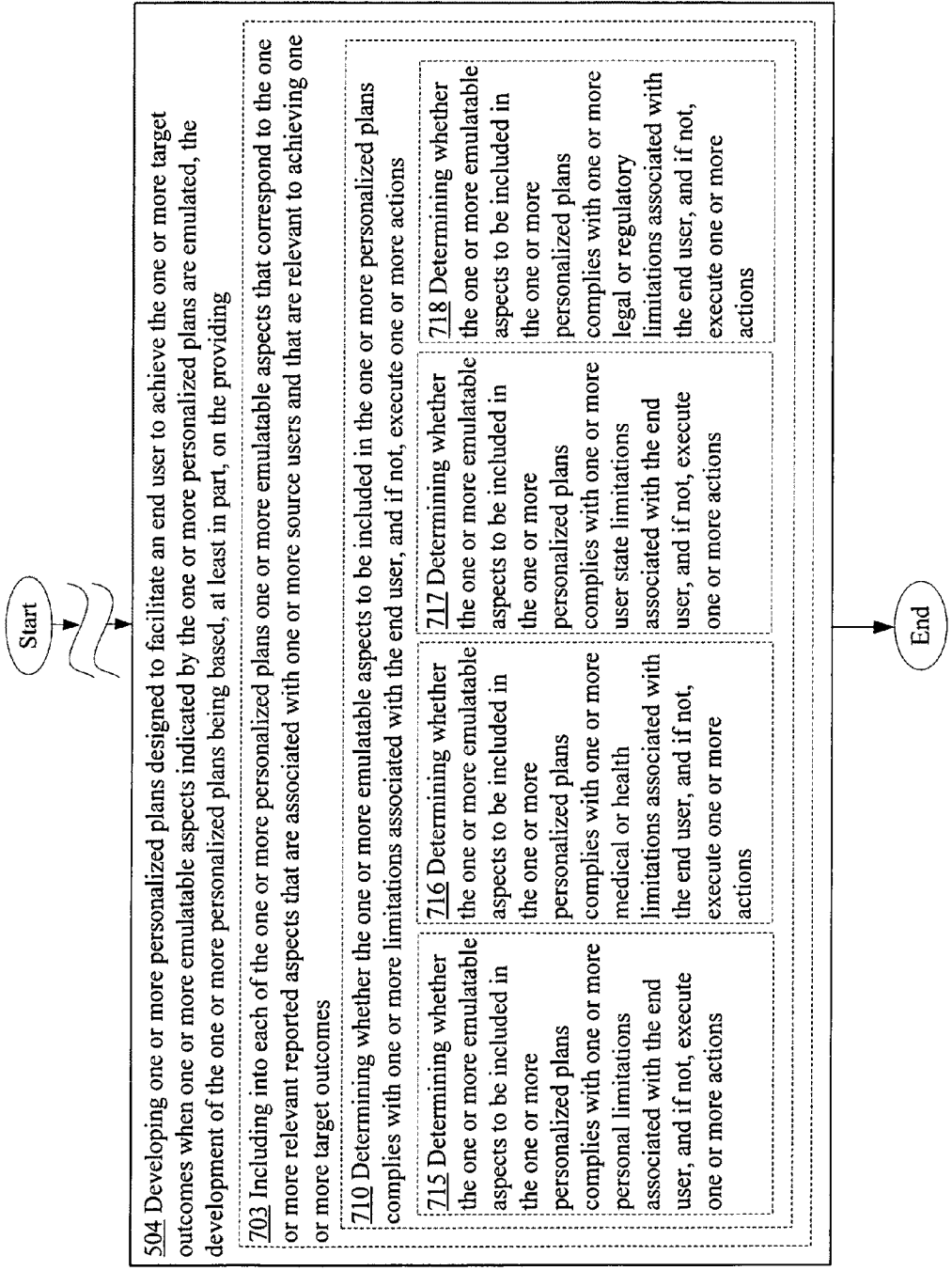
FIG. 7c is a high-level logic flowchart of a process depicting alternate implementations of the personalized plan development operation 504 of FIG. 5.

In the same or different implementations, operation 710 may include an operation 715 for determining whether the one or more emulatable aspects to be included in the one or more personalized plans complies with one or more personal limitations associated with the end user, and if not, execute one or more actions as depicted in FIG. 7c. For instance, the limitation compliance determination module 224* of the server 10 of FIG. 1b, the local source user device 20' of FIG. 2b, or the local end user device 30" of FIG. 3b determining whether the one or more emulatable aspects to be included in the one or more personalized plans 16* complies with one or more personal limitations (e.g., religious beliefs, dietary beliefs, phobias, personal prejudices, limitations related to personal experiences, personal work schedule obligations, family dynamics or circumstances, and so forth) associated with the end user 4*, and if not, execute one or more actions.

In the same or different implementations, operation 710 may include an operation 716 for determining whether the one or more emulatable aspects to be included in the one or more personalized plans complies with one or more medical or health limitations associated with the end user, and if not, execute one or more actions as depicted in FIG. 7c. For instance, the limitation compliance determination module 224* of the server 10 of FIG. 1b, the local source user device 20' of FIG. 2b, or the local end user device 30" of FIG. 3b determining whether the one or more emulatable aspects to be included in the one or more personalized plans 16* complies with one or more medical or health limitations (e.g., medical limitations such as limitations resulting from an illness or treatment of an illness including limitations due to cancer or treatment of the cancer, health limitations related to the physical conditioning of the end user 4*, genetic limitations, and so forth) associated with the end user 4*, and if not, execute one or more actions.

In the same or different implementations, operation 710 may include an operation 717 for determining whether the one or more emulatable aspects to be included in the one or more personalized plans complies with one or more user state limitations associated with the end user, and if not, execute one or more actions as depicted in FIG. 7c. For instance, the limitation compliance determination module 224* of the server 10 of FIG. 1b, the local source user device 20' of FIG. 2b, or the local end user device 30" of FIG. 3b determining whether the one or more emulatable aspects to be included in the one or more personalized plans 16* complies with one or more user state limitations (e.g., end user 4* is married, end user 4* is in mourning, end user 4* is unemployed, end user 4* is a vegan, and so forth) associated with the end user 4*, and if not, execute one or more actions.

In the same or different implementations, operation 710 may include an operation 718 for determining whether the one or more emulatable aspects to be included in the one or more personalized plans complies with one or more legal or regulatory limitations associated with the end user, and if not, execute one or more actions as depicted in FIG. 7c. For instance, the limitation compliance determination module 224* of the server 10 of FIG. 1b, the local source user device 20' of FIG. 2b, or the local end user device 30" of FIG. 3b determining whether the one or more emulatable aspects to be included in the one or more personalized plans 16* complies with one or more legal or regulatory limitations (e.g., drug regulations, laws related to conduct or behavior in the jurisdiction of the end user 4*, and so forth) associated with the end user 4*, and if not, execute one or more actions.

Figure 7D:
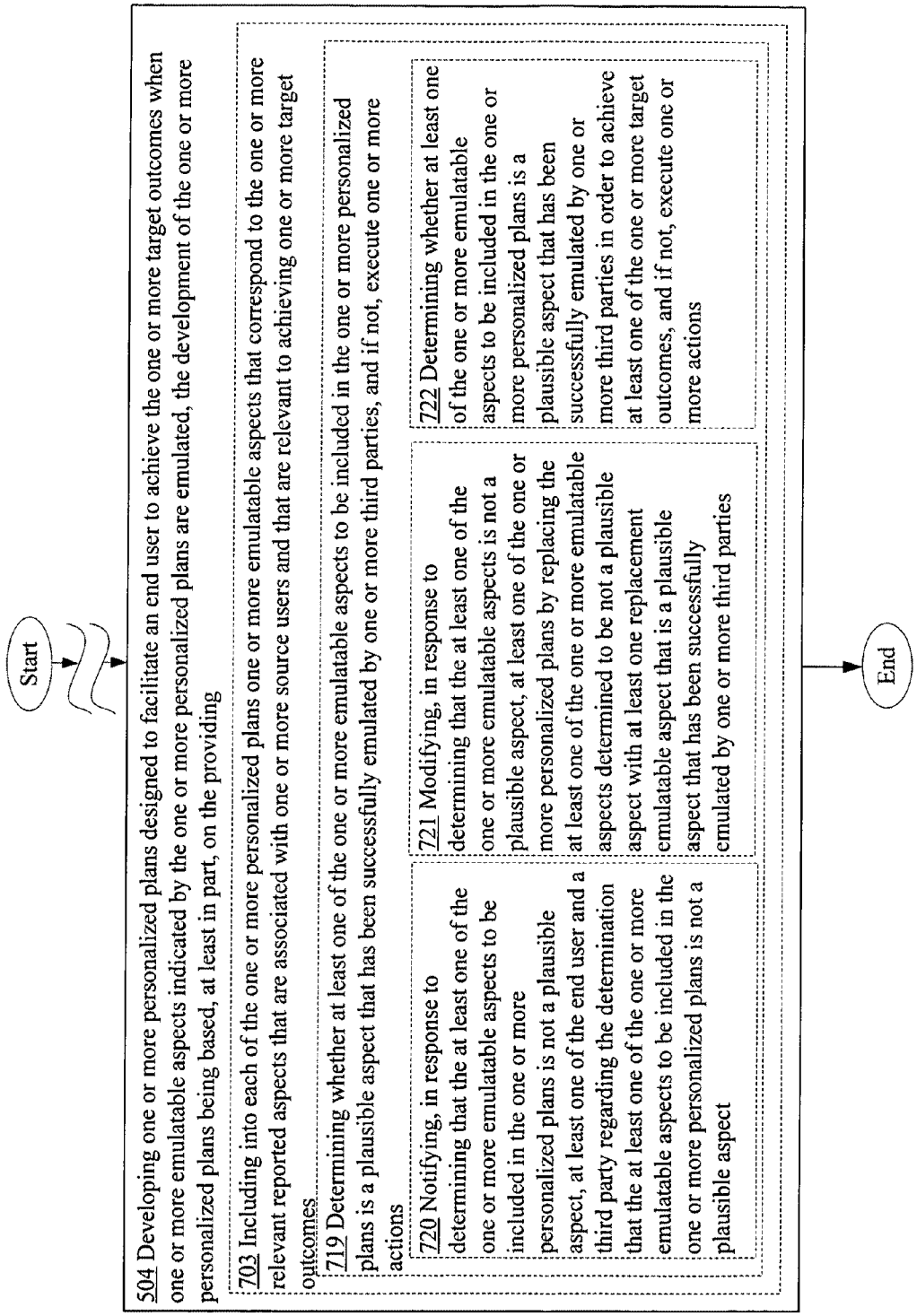
FIG. 7d is a high-level logic flowchart of a process depicting alternate implementations of the personalized plan development operation 504 of FIG. 5.

In various implementations, the operation 703 for including into each of the one or more personalized plans one or more emulatable aspects may include an operation 719 for determining whether at least one of the one or more emulatable aspects to be included in the one or more personalized plans is a plausible aspect that has been successfully emulated by one or more third parties, and if not, execute one or more actions as depicted in FIG. 7d. For instance, the plausible determination module 230* (see FIG. 4b) of the server 10 of FIG. 1b, the local source user device 20' of FIG. 2b, or the local end user device 30" of FIG. 3b determining whether at least one of the one or more emulatable aspects to be included in the one or more personalized plans 16* is a plausible aspect that has been successfully emulated by one or more third parties 6* (e.g., other end users), and if not, execute one or more actions.

In various alternative implementations, operation 719 may include one or more additional operations. For example, in some implementations, operation 719 may include an operation 720 for notifying, in response to determining that the at least one of the one or more emulatable aspects to be included in the one or more personalized plans is not a plausible aspect, at least one of the end user and a third party regarding the determination that the at least one of the one or more emulatable aspects to be included in the one or more personalized plans is not a plausible aspect as depicted in FIG. 7d. For instance, the not plausible notification module 234* (see FIG. 4b) of the server 10 of FIG. 1b, the local source user device 20' of FIG. 2b, or the local end user device 30" of FIG. 3b notifying in response to determining that the at least one of the one or more emulatable aspects to be included in the one or more personalized plans 16* is not a plausible aspect, at least one of the end user 4* and a third party 6* regarding the determination that the at least one of the one or more emulatable aspects to be included in the one or more personalized plans 16* is not a plausible aspect.

In the same or different implementations, operation 719 may include an operation 721 for modifying, in response to determining that the at least one of the one or more emulatable aspects is not a plausible aspect, at least one of the one or more personalized plans by replacing the at least one of the one or more emulatable aspects determined to be not a plausible aspect with at least one replacement emulatable aspect that is a plausible aspect that has been successfully emulated by one or more third parties as depicted in FIG. 7d. For instance, the personalized plan modification module 236* (see FIG. 4b) of the server 10 of FIG. 1b, the local source user device 20' of FIG. 2b, or the local end user device 30" of FIG. 3b modifying, in response to determining that the at least one of the one or more emulatable aspects is not a plausible aspect, at least one of the one or more personalized plans 16* by replacing the at least one of the one or more emulatable aspects determined to be not a plausible aspect with at least one replacement emulatable aspect that is a plausible aspect that has been successfully emulated by one or more third parties 6*.

In the same or different implementations, operation 719 may include an operation 722 for determining whether at least one of the one or more emulatable aspects to be included in the one or more personalized plans is a plausible aspect that has been successfully emulated by one or more third parties in order to achieve at least one of the one or more target outcomes, and if not, execute one or more actions as depicted in FIG. 7d. For instance, the plausible determination module 230* of the server 10 of FIG. 1b, the local source user device 20' of FIG. 2b, or the local end user device 30" of FIG. 3b determining whether at least one of the one or more emulatable aspects to be included in the one or more personalized plans 16* is a plausible aspect that has been successfully emulated by one or more third parties 6* in order to achieve at least one of the one or more target outcomes, and if not, execute one or more actions.

Figure 7E:
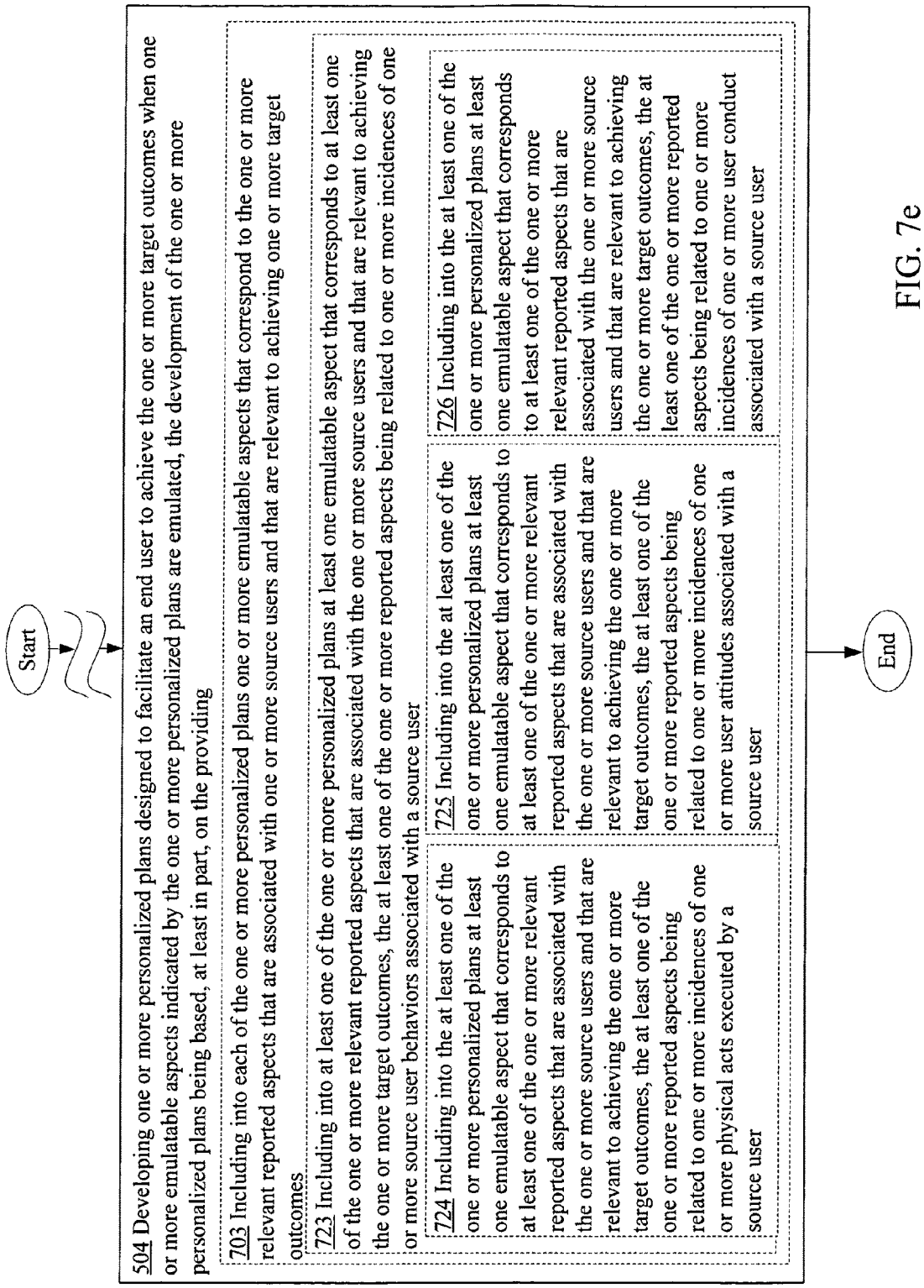
FIG. 7e is a high-level logic flowchart of a process depicting alternate implementations of the personalized plan development operation 504 of FIG. 5.

In certain implementations, the operation 703 for including into each of the one or more personalized plans one or more emulatable aspects may include an operation 723 for including into at least one of the one or more personalized plans at least one emulatable aspect that corresponds to at least one of the one or more relevant reported aspects that are associated with the one or more source users and that are relevant to achieving the one or more target outcomes, the at least one of the one or more reported aspects being related to one or more incidences of one or more source user behaviors associated with a source user as depicted in FIG. 7e. For instance, the emulatable aspect inclusion module 220* of the server 10 of FIG. 1b, the local source user device 20' of FIG. 2b, or the local end user device 30" of FIG. 3b including into at least one of the one or more personalized plans 16* at least one emulatable aspect that corresponds to at least one of the one or more relevant reported aspects that are associated with the one or more source users 2** and that are relevant to achieving the one or more target outcomes, the at least one of the one or more reported aspects being related to one or more incidences of one or more source user behaviors (e.g., dietary behavior, physical activity behavior, behavior towards others, mental or physical acts, and so forth) associated with a source user 2a*.

In various implementations, operation 723 may include one or more additional operations. For example, in some implementations, operation 723 may include an operation 724 for including into the at least one of the one or more personalized plans at least one emulatable aspect that corresponds to at least one of the one or more relevant reported aspects that are associated with the one or more source users and that are relevant to achieving the one or more target outcomes, the at least one of the one or more reported aspects being related to one or more incidences of one or more physical acts executed by a source user as depicted in FIG. 7e. For instance, the emulatable aspect inclusion module 220* of the server 10 of FIG. 1b, the local source user device 20' of FIG. 2b, or the local end user device 30" of FIG. 3b including into the at least one of the one or more personalized plans 16* at least one emulatable aspect that corresponds to at least one of the one or more relevant reported aspects that are associated with the one or more source users 2** and that are relevant to achieving the one or more target outcomes, the at least one of the one or more reported aspects being related to one or more incidences of one or more physical acts (e.g., consume a food item or a medicine, attend class, read, exercise, and so forth) executed by a source user 2a*.

In the same or different implementations, operation 723 may include an operation 725 for including into the at least one of the one or more personalized plans at least one emulatable aspect that corresponds to at least one of the one or more relevant reported aspects that are associated with the one or more source users and that are relevant to achieving the one or more target outcomes, the at least one of the one or more reported aspects being related to one or more incidences of one or more user attitudes associated with a source user as depicted in FIG. 7e. For instance, the emulatable aspect inclusion module 220* of the server 10 of FIG. 1b, the local source user device 20' of FIG. 2b, or the local end user device 30" of FIG. 3b including into the at least one of the one or more personalized plans 16* at least one emulatable aspect that corresponds to at least one of the one or more relevant reported aspects that are associated with the one or more source users 2** and that are relevant to achieving the one or more target outcomes, the at least one of the one or more reported aspects being related to one or more incidences of one or more user attitudes (e.g., being indifferent, feeling critical, feeling skeptical, feeling optimistic, and so forth) associated with a source user 2a*.

In the same or different implementations, operation 723 may include an operation 726 for including into the at least one of the one or more personalized plans at least one emulatable aspect that corresponds to at least one of the one or more relevant reported aspects that are associated with the one or more source users and that are relevant to achieving the one or more target outcomes, the at least one of the one or more reported aspects being related to one or more incidences of one or more user conduct associated with a source user as depicted in FIG. 7e. For instance, the emulatable aspect inclusion module 220* of the server 10 of FIG. 1b, the local source user device 20' of FIG. 2b, or the local end user device 30" of FIG. 3b including into the at least one of the one or more personalized plans 16* at least one emulatable aspect that corresponds to at least one of the one or more relevant reported aspects that are associated with the one or more source users 2** and that are relevant to achieving the one or more target outcomes, the at least one of the one or more reported aspects being related to one or more incidences of one or more user conduct (e.g., behavior towards others, treatment of others, manner in which acts are executed, and so forth) associated with a source user 2a*.

Figure 7F:
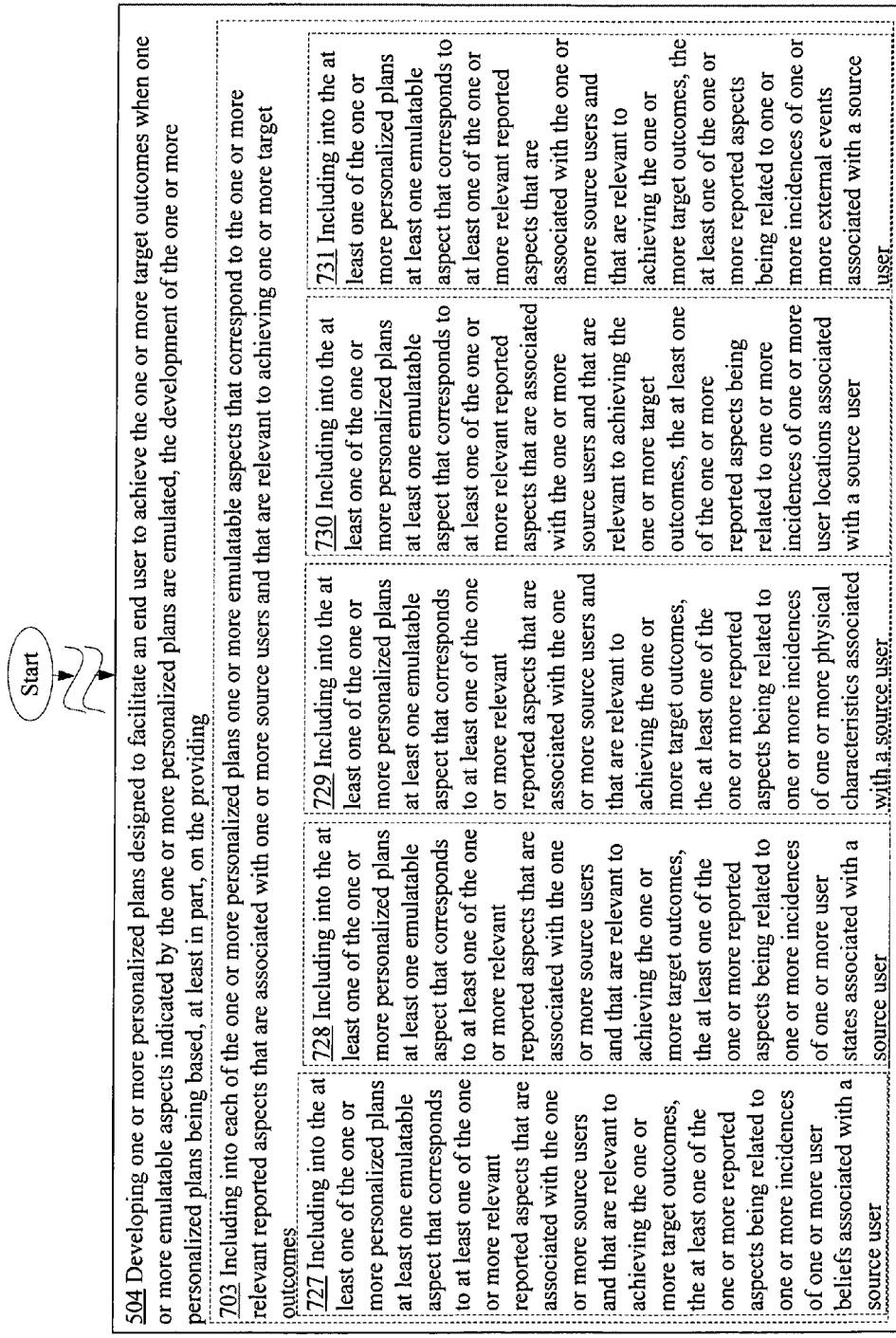
FIG. 7f is a high-level logic flowchart of a process depicting alternate implementations of the personalized plan development operation 504 of FIG. 5.

In various implementations, the operation 703 for including into each of the one or more personalized plans one or more emulatable aspects may include an operation 727 for including into the at least one of the one or more personalized plans at least one emulatable aspect that corresponds to at least one of the one or more relevant reported aspects that are associated with the one or more source users and that are relevant to achieving the one or more target outcomes, the at least one of the one or more reported aspects being related to one or more incidences of one or more user beliefs associated with a source user as depicted in FIG. 7f. For instance, the emulatable aspect inclusion module 220* of the server 10 of FIG. 1b, the local source user device 20' of FIG. 2b, or the local end user device 30" of FIG. 3b including into the at least one of the one or more personalized plans 16* at least one emulatable aspect that corresponds to at least one of the one or more relevant reported aspects that are associated with the one or more source users 2** and that are relevant to achieving the one or more target outcomes, the at least one of the one or more reported aspects being related to one or more incidences of one or more user beliefs (e.g., religious beliefs, spiritual beliefs, prejudicial beliefs, and so forth) associated with a source user 2a*.

In the same or different implementations, operation 703 may include an operation 728 for including into the at least one of the one or more personalized plans at least one emulatable aspect that corresponds to at least one of the one or more relevant reported aspects that are associated with the one or more source users and that are relevant to achieving the one or more target outcomes, the at least one of the one or more reported aspects being related to one or more incidences of one or more user states associated with a source user as depicted in FIG. 7f. For instance, the emulatable aspect inclusion module 220* of the server 10 of FIG. 1b, the local source user device 20' of FIG. 2b, or the local end user device 30" of FIG. 3b including into the at least one of the one or more personalized plans 16* at least one emulatable aspect that corresponds to at least one of the one or more relevant reported aspects that are associated with the one or more source users 2 and that are relevant to achieving the one or more target outcomes, the at least one of the one or more reported aspects being related to one or more incidences of one or more user states (e.g., subjective user states, marital states, employment state, physical state, availability state, and so forth) associated with a source user 2.

In the same or different implementations, operation 703 may include an operation 729 for including into the at least one of the one or more personalized plans at least one emulatable aspect that corresponds to at least one of the one or more relevant reported aspects that are associated with the one or more source users and that are relevant to achieving the one or more target outcomes, the at least one of the one or more reported aspects being related to one or more incidences of one or more physical characteristics associated with a source user as depicted in FIG. 7f. For instance, the emulatable aspect inclusion module 220* of the server 10 of FIG. 1b, the local source user device 20' of FIG. 2b, or the local end user device 30" of FIG. 3b including into the at least one of the one or more personalized plans 16* at least one emulatable aspect that corresponds to at least one of the one or more'relevant reported aspects that are associated with the one or more source users 2** and that are relevant to achieving the one or more target outcomes, the at least one of the one or more reported aspects being related to one or more incidences of one or more physical characteristics (e.g., hair or eye color, hair length, hair style, facial hair characteristics, overall body figure, body weight, and so forth) associated with a source user 2a*.

In the same or different implementations, operation 703 may include an operation 730 for including into the at least one of the one or more personalized plans at least one emulatable aspect that corresponds to at least one of the one or more relevant reported aspects that are associated with the one or more source users and that are relevant to achieving the one or more target outcomes, the at least one of the one or more reported aspects being related to one or more incidences of one or more user locations associated with a source user as depicted in FIG. 7f. For instance, the emulatable aspect inclusion module 220* of the server 10 of FIG. 1b, the local source user device 20' of FIG. 2b, or the local end user device 30" of FIG. 3b including into the at least one of the one or more personalized plans 16* at least one emulatable aspect that corresponds to at least one of the one or more relevant reported aspects that are associated with the one or more source users 2** and that are relevant to achieving the one or more target outcomes, the at least one of the one or more reported aspects being related to one or more incidences of one or more user locations (e.g., home, workplace, New York City, beach, and so forth) associated with a source user 2a*.

In the same or different implementations, operation 703 may include an operation 731 for including into the at least one of the one or more personalized plans at least one emulatable aspect that corresponds to at least one of the one or more relevant reported aspects that are associated with the one or more source users and that are relevant to achieving the one or more target outcomes, the at least one of the one or more reported aspects being related to one or more incidences of one or more external events associated with a source user as depicted in FIG. 7f. For instance, the emulatable aspect inclusion module 220* of the server 10 of FIG. 1b, the local source user device 20' of FIG. 2b, or the local end user device 30" of FIG. 3b including into the at least one of the one or more personalized plans 16* at least one emulatable aspect that corresponds to at least one of the one or more relevant reported aspects that are associated with the one or more source users 2** and that are relevant to achieving the one or more target outcomes, the at least one of the one or more reported aspects being related to one or more incidences of one or more external events (e.g., hot or cold weather, heavy or no auto traffic, stock market performance, visit by a relative, and so forth) associated with a source user 2a*.

Figure 7G:
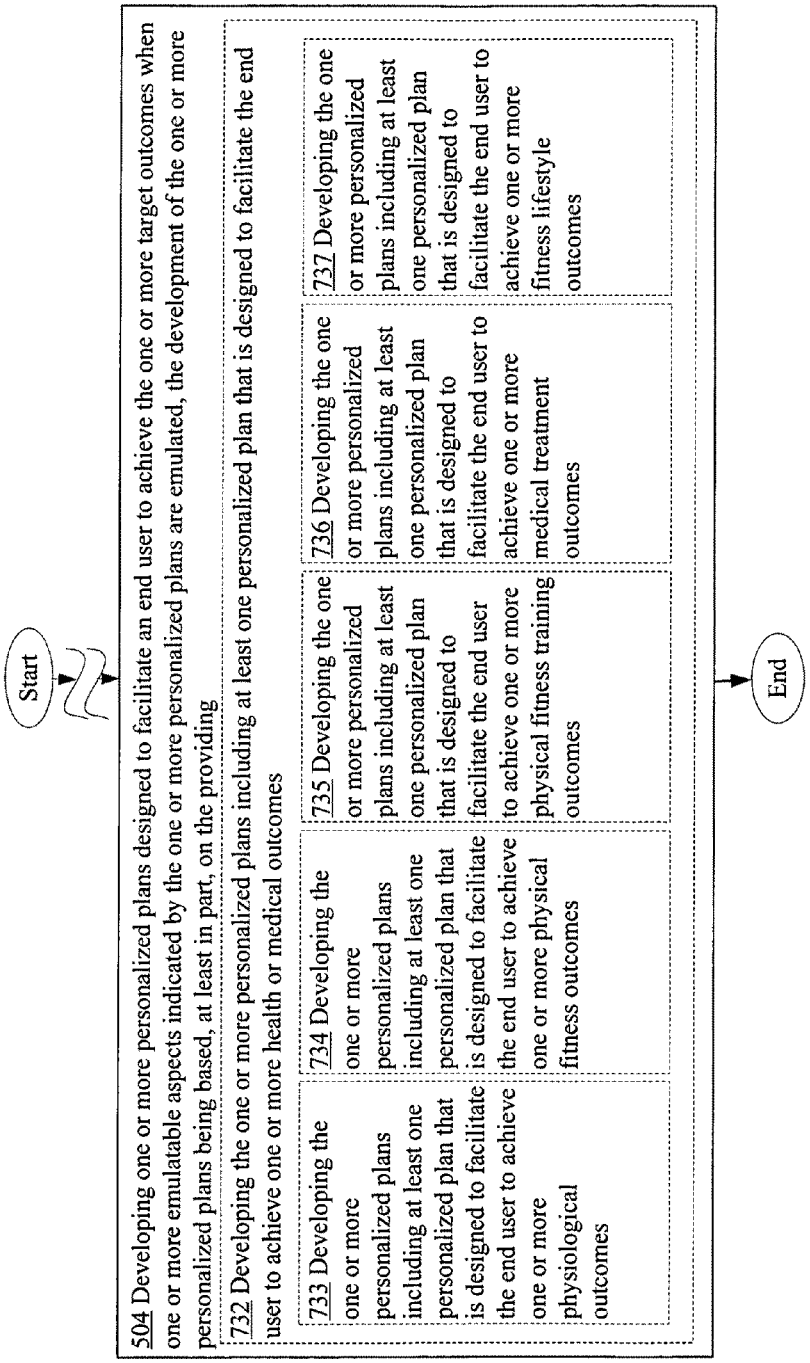
FIG. 7g is a high-level logic flowchart of a process depicting alternate implementations of the personalized plan development operation 504 of FIG. 5.

In various implementations, the personalized plan development operation 504 of FIG. 5 may include an operation 732 for developing the one or more personalized plans including at least one personalized plan that is designed to facilitate the end user to achieve one or more health or medical outcomes as depicted in FIG. 7g. For instance, the personalized plan development module 104* of the server 10 of FIG. 1b, the local source user device 20' of FIG. 2b, or the local end user device 30" of FIG. 3b developing the one or more personalized plans 16* including at least one personalized plan that is designed to facilitate the end user 4* to achieve one or more health or medical outcomes (e.g., recovery time or recovery success related to an illness, weight loss, blood pressure reduction, blood glucose level reduction, lifespan, and so forth).

Operation 732 may include, in various implementations, one or more additional operations as will be further described herein. For example, in some implementations, operation 732 may include an operation 733 for developing the one or more personalized plans including at least one personalized plan that is designed to facilitate the end user to achieve one or more physiological outcomes as depicted in FIG. 7g. For instance, the personalized plan development module 104* of the server 10 of FIG. 1b, the local source user device 20' of FIG. 2b, or the local end user device 30" of FIG. 3b developing the one or more personalized plans 16* including at least one personalized plan 16* that is designed to facilitate the end user 4* to achieve one or more physiological outcomes (e.g., reducing blood pressure or blood glucose levels, increase red blood cell count, improve blood circulation, and so forth).

In the same or different implementations, operation 732 may include an operation 734 for developing the one or more personalized plans including at least one personalized plan that is designed to facilitate the end user to achieve one or more physical fitness outcomes as depicted in FIG. 7g. For instance, the personalized plan development module 104* of the server 10 of FIG. 1b, the local source user device 20' of FIG. 2b, or the local end user device 30" of FIG. 3b developing the one or more personalized plans 16 including at least one personalized plan 16* that is designed to facilitate the end user 4* to achieve one or more physical fitness outcomes (e.g., reduced body fat level, increased lung air capacity, reduce time it takes to run a mile, increase amount of sit-ups or push-ups, and so forth).

In the same or different implementations, operation 732 may include an operation 735 for developing the one or more personalized plans including at least one personalized plan that is designed to facilitate the end user to achieve one or more physical fitness training outcomes as depicted in FIG. 7g. For instance, the personalized plan development module 104* of the server 10 of FIG. 1b, the local source user device 20' of FIG. 2b, or the local end user device 30" of FIG. 3b developing the one or more personalized plans 16* including at least one personalized plan 16* that is designed to facilitate the end user 4* to achieve one or more physical fitness training outcomes (e.g., shorter time to recover from vigorous exercise, increase stamina during fitness training, reduce water loss during vigorous exercise, and so forth).

In the same or different implementations, operation 732 may include an operation 736 for developing the one or more personalized plans including at least one personalized plan that is designed to facilitate the end user to achieve one or more medical treatment outcomes as depicted in FIG. 7g. For instance, the personalized plan development module 104* of the server 10 of FIG. 1b, the local source user device 20' of FIG. 2b, or the local end user device 30" of FIG. 3b developing the one or more personalized plans 16* including at least one personalized plan 16* that is designed to facilitate the end user 4* to achieve one or more medical treatment outcomes (e.g., improved recovery from stroke or other types of disease, reduction of side-effects from a medical treatment such as chemotherapy, and so forth).

In the same or different implementations, operation 732 may include an operation 737 for developing the one or more personalized plans including at least one personalized plan that is designed to facilitate the end user to achieve one or more fitness lifestyle outcomes as depicted in FIG. 7g. For instance, the personalized plan development module 104* of the server 10 of FIG. 1b, the local source user device 20' of FIG. 2b, or the local end user device 30" of FIG. 3b developing the one or more personalized plans 16* including at least one personalized plan 16* that is designed to facilitate the end user 4* to achieve one or more fitness lifestyle outcomes (e.g., improved exercise activities, improved dietary activities such as reduced calorie or cholesterol consumption, and so forth).

Figure 7H:
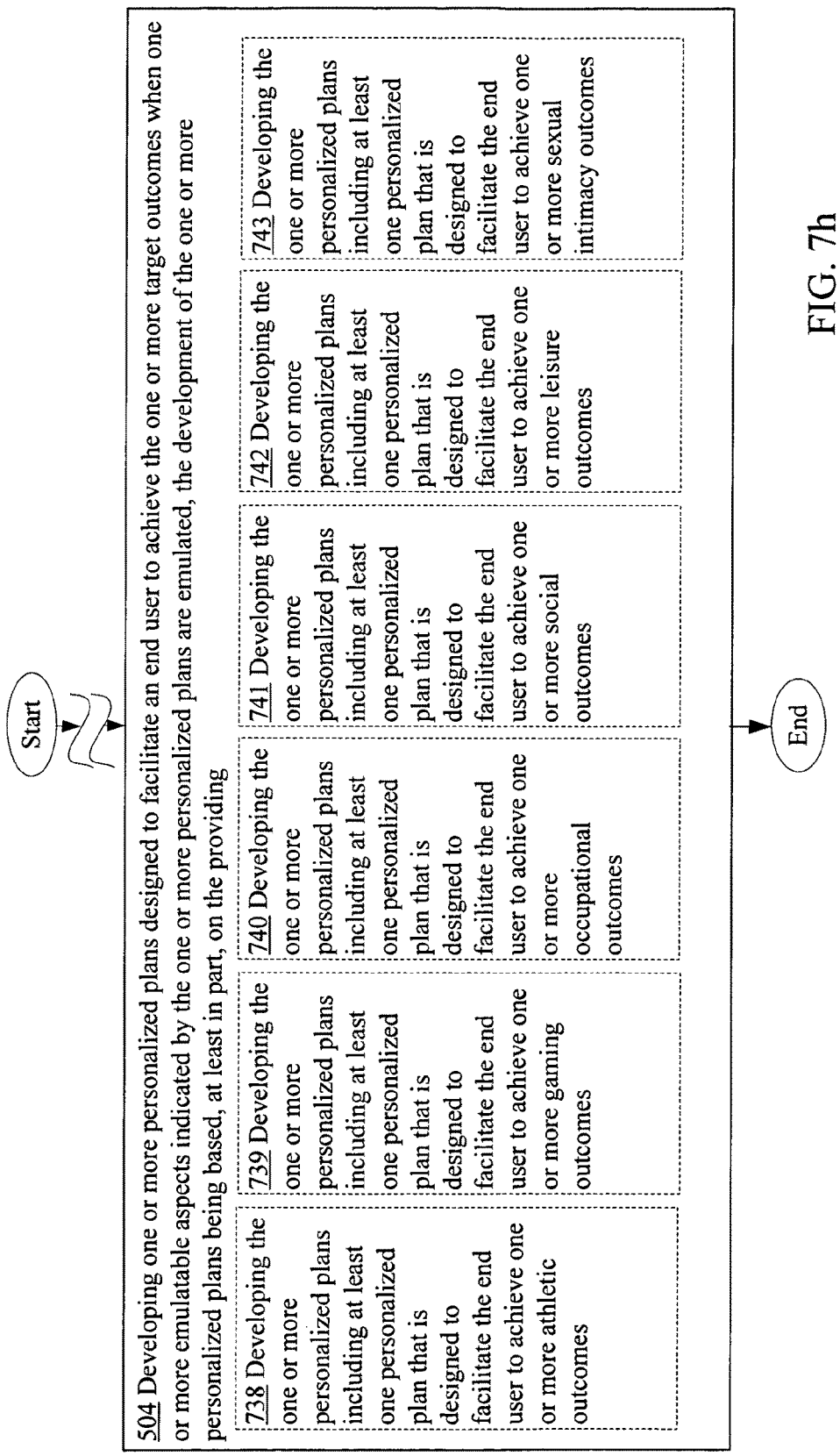
FIG. 7h is a high-level logic flowchart of a process depicting alternate implementations of the personalized plan development operation 504 of FIG. 5.

In some implementations, the personalized plan development operation 504 of FIG. 5 may include an operation 738 for developing the one or more personalized plans including at least one personalized plan that is designed to facilitate the end user to achieve one or more athletic outcomes as depicted in FIG. 7h. For instance, the personalized plan development module 104* of the server 10 of FIG. 1b, the local source user device 20' of FIG. 2b, or the local end user device 30" of FIG. 3b developing the one or more personalized plans 16* including at least one personalized plan 16* that is designed to facilitate the end user 4* to achieve one or more athletic outcomes (e.g., improve golf scores, win a bicycle or swimming race, develop a curve ball pitch, and so forth).

In the same or different implementations, the personalized plan development operation 504 may include an operation 739 for developing the one or more personalized plans including at least one personalized plan that is designed to facilitate the end user to achieve one or more gaming outcomes as depicted in FIG. 7h. For instance, the personalized plan development module 104* of the server 10 of FIG. 1b, the local source user device 20' of FIG. 2b, or the local end user device 30" of FIG. 3b developing the one or more personalized plans 16* including at least one personalized plan 16* that is designed to facilitate the end user 4* to achieve one or more gaming outcomes (e.g., winning a chest tournament or improve video gaming skills).

In the same or different implementations, the personalized plan development operation 504 may include an operation 740 for developing the one or more personalized plans including at least one personalized plan that is designed to facilitate the end user to achieve one or more occupational outcomes as depicted in FIG. 7h. For instance, the personalized plan development module 104* of the server 10 of FIG. 1b, the local source user device 20' of FIG. 2b, or the local end user device 30" of FIG. 3b developing the one or more personalized plans 16* including at least one personalized plan 16* that is designed to facilitate the end user 4* to achieve one or more occupational outcomes (e.g., a job promotion, complete a work project on time, develop new occupational relationships, and so forth).

In the same or different implementations, the personalized plan development operation 504 may include an operation 741 for developing the one or more personalized plans including at least one personalized plan that is designed to facilitate the end user to achieve one or more social outcomes as depicted in FIG. 7h. For instance, the personalized plan development module 104* of the server 10 of FIG. 1b, the local source user device 20' of FIG. 2b, or the local end user device 30" of FIG. 3b developing the one or more personalized plans 16* including at least one personalized plan 16* that is designed to facilitate the end user 4* to achieve one or more social outcomes (e.g., attaining a certain social class, having a dinner date with a particular person, developing a particular reputation, develop or expand social networks, and so forth).

In the same or different implementations, the personalized plan development operation 504 may include an operation 742 for developing the one or more personalized plans including at least one personalized plan that is designed to facilitate the end user to achieve one or more leisure outcomes as depicted in FIG. 7h. For instance, the personalized plan development module 104* of the server 10 of FIG. 1b, the local source user device 20' of FIG. 2b, or the local end user device 30" of FIG. 3b developing the one or more personalized plans 16* including at least one personalized plan that is designed to facilitate the end user 4* to achieve one or more leisure outcomes (e.g., learn how to knit, finding time to go on vacation, finish reading a book, and so forth).

In the same or different implementations, the personalized plan development operation 504 may include an operation 743 for developing the one or more personalized plans including at least one personalized plan that is designed to facilitate the end user to achieve one or more sexual intimacy outcomes as depicted in FIG. 7h. For instance, the personalized plan development module 104* of the server 10 of FIG. 1b, the local source user device 20' of FIG. 2b, or the local end user device 30" of FIG. 3b developing the one or more personalized plans 16* including at least one personalized plan 16* that is designed to facilitate the end user 4* to achieve one or more sexual intimacy outcomes (e.g., increased sexual activities, increased sexual performance, and so forth).

Figure 7I:
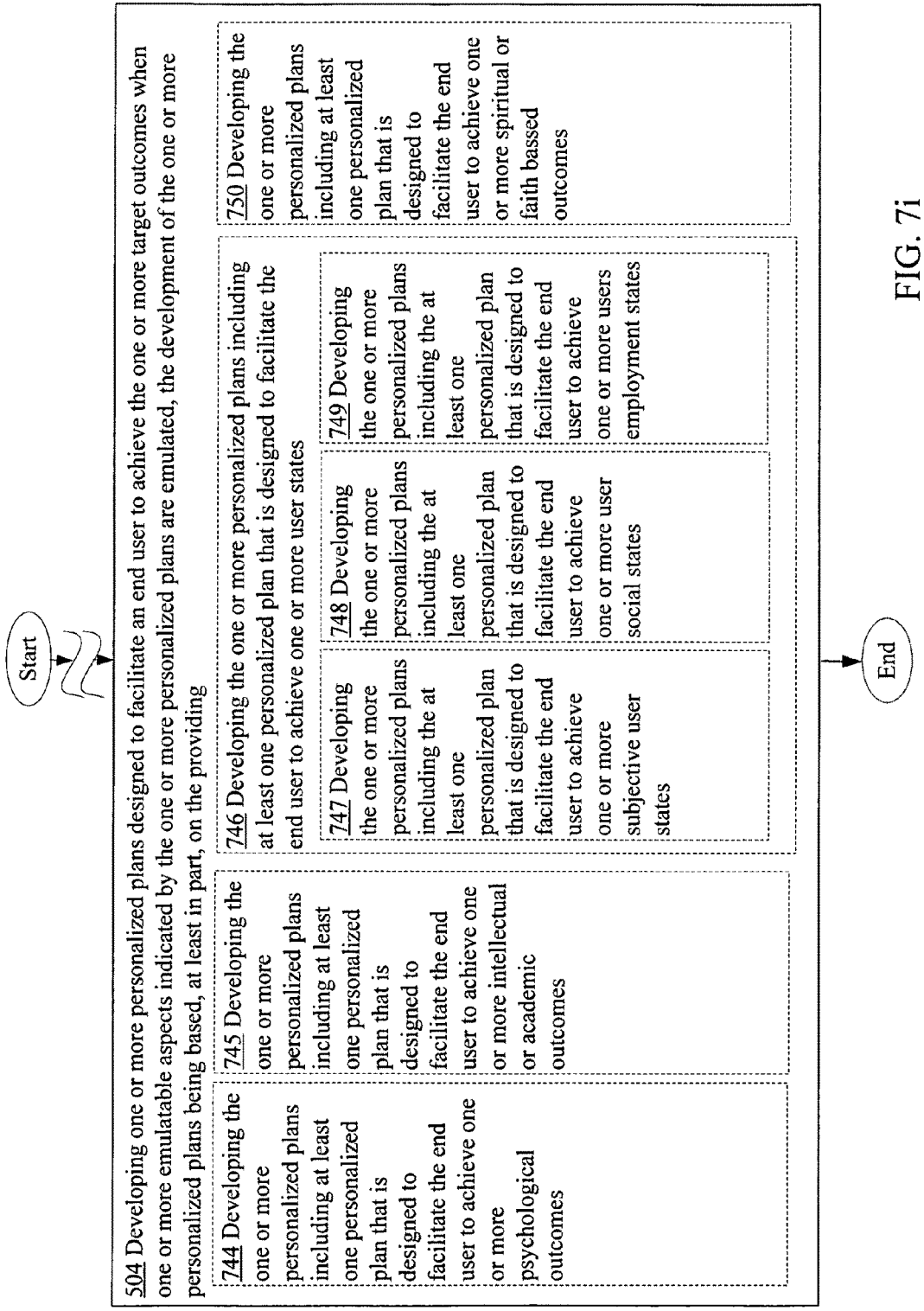
FIG. 7i is a high-level logic flowchart of a process depicting alternate implementations of the personalized plan development operation 504 of FIG. 5.

In the same or different implementations, the personalized plan development operation 504 may include an operation 744 for developing the one or more personalized plans including at least one personalized plan that is designed to facilitate the end user to achieve one or more psychological outcomes as depicted in FIG. 7i. For instance, the personalized plan development module 104* of the server 10 of FIG. 1b, the local source user device 20' of FIG. 2b, or the local end user device 30" of FIG. 3b developing the one or more personalized plans 16* including at least one personalized plan 16* that is designed to facilitate the end user 4* to achieve one or more psychological outcomes (e.g., overcoming a phobia, overcoming certain addictive behavior such as compulsion to be clean, and so forth).

In the same or different implementations, the personalized plan development operation 504 may include an operation 745 for developing the one or more personalized plans including at least one personalized plan that is designed to facilitate the end user to achieve one or more intellectual or academic outcomes depicted in FIG. 7i. For instance, the personalized plan development module 104* of the server 10 of FIG. 1b, the local source user device 20' of FIG. 2b, or the local end user device 30" of FIG. 3b developing the one or more personalized plans 16* including at least one personalized plan 16* that is designed to facilitate the end user 4* to achieve one or more intellectual or academic outcomes (e.g., passing a particular exam or class, obtaining a certain degree or academic award, being accepted into a particular program or school, attaining a particular scholarship, understanding a complex concept, acquiring particular knowledge, and so forth).

In the same or different implementations, the personalized plan development operation 504 may include an operation 746 for developing the one or more personalized plans including at least one personalized plan that is designed to facilitate the end user to achieve one or more user states depicted in FIG. 7i. For instance, the personalized plan development module 104* of the server 10 of FIG. 1b, the local source user device 20' of FIG. 2b, or the local end user device 30" of FIG. 3b developing the one or more personalized plans 16* including at least one personalized plan 16* that is designed to facilitate the end user 4* to achieve one or more user states (e.g., mental states, marital states, employment state, physical state, availability state, and so forth).

In turn, operation 746 may further include one or more additional operations. For example, in some implementations, operation 746 may include an operation 747 for developing the one or more personalized plans including the at least one personalized plan that is designed to facilitate the end user to achieve one or more subjective user states depicted in FIG. 7i. For instance, the personalized plan development module 104* of the server 10 of FIG. 1b, the local source user device 20' of FIG. 2b, or the local end user device 30" of FIG. 3b developing the one or more personalized plans 16* including the at least one personalized plan 16* that is designed to facilitate the end user 4* to achieve one or more subjective user states (e.g., subjective user mental states, subjective user physical states, and/or subjective user overall states).

In the same or different implementations, operation 746 may include an operation 748 for developing the one or more personalized plans including the at least one personalized plan that is designed to facilitate the end user to achieve one or more user social states as depicted in FIG. 7i. For instance, the personalized plan development module 104* of the server 10 of FIG. 1b, the local source user device 20' of FIG. 2b, or the local end user device 30" of FIG. 3b developing the one or more personalized plans 16* including the at least one personalized plan 16* that is designed to facilitate the end user 4* to achieve one or more user social states (e.g., membership to a social group, being married, being single and so forth).

In the same or different implementations, operation 746 may include an operation 749 for developing the one or more personalized plans including the at least one personalized plan that is designed to facilitate the end user to achieve one or more users employment states as depicted in FIG. 7i. For instance, the personalized plan development module 104* of the server 10 of FIG. 1b, the local source user device 20' of FIG. 2b, or the local end user device 30" of FIG. 3b developing the one or more personalized plans 16* including the at least one personalized plan 16* that is designed to facilitate the end user 4* to achieve one or more users employment states (e.g., being employed, attaining a particular employment position, attaining managerial authority, and so forth).

In the same or different implementations, the personalized plan development operation 504 may include an operation 750 for developing the one or more personalized plans including at least one personalized plan that is designed to facilitate the end user to achieve one or more spiritual or faith-based outcomes as depicted in FIG. 7i. For instance, the personalized plan development module 104* of the server 10 of FIG. 1b, the local source user device 20' of FIG. 2b, or the local end user device 30" of FIG. 3b developing the one or more personalized plans 16* including at least one personalized plan 16* that is designed to facilitate the end user 4* to achieve one or more spiritual or faith-based outcomes (e.g., greater self-awareness or satisfaction, greater tolerance of the difference of others, and so forth).

Figure 8:
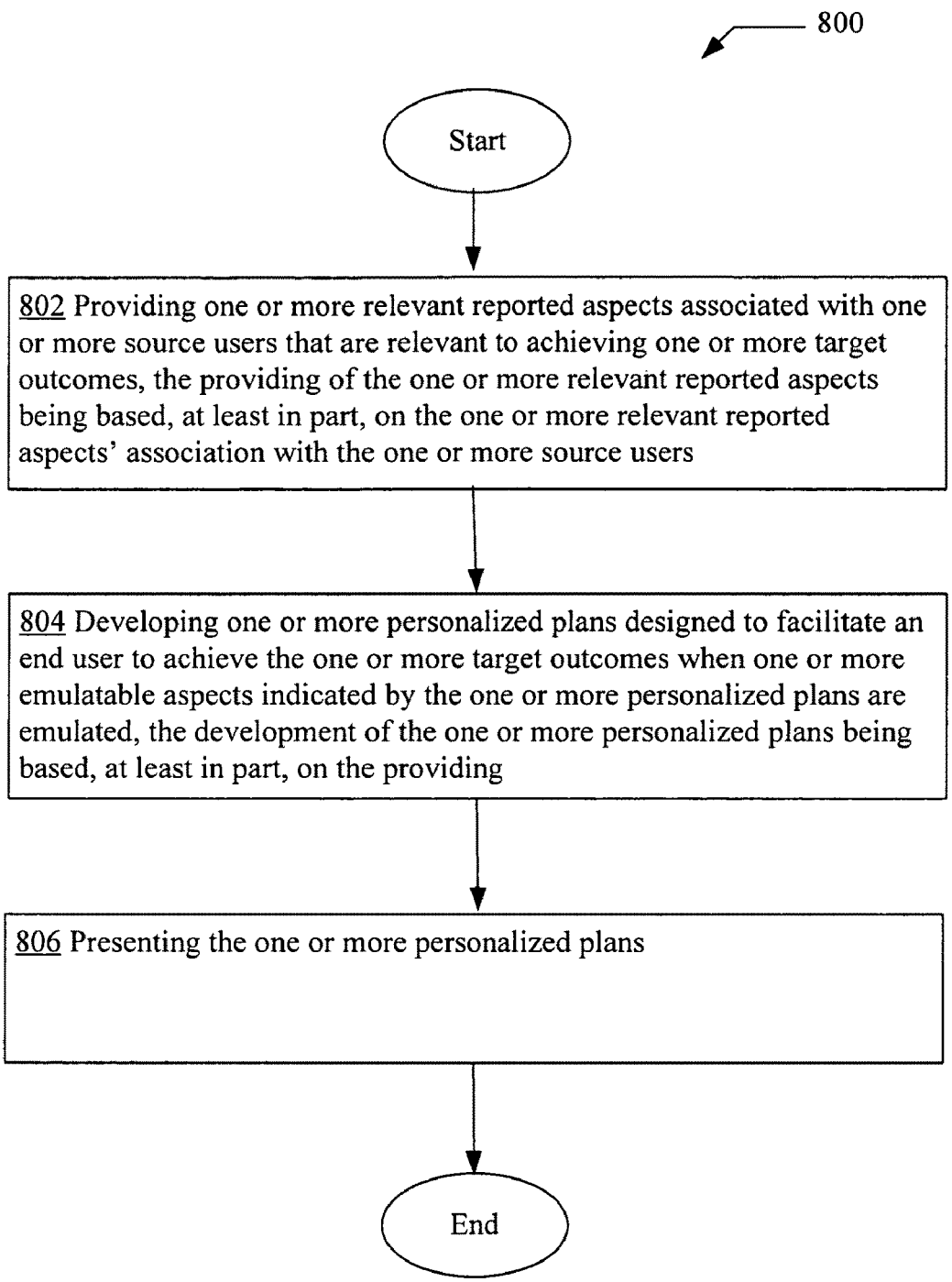
FIG. 8 is a high-level logic flowchart of another process.

Referring to FIG. 8 illustrating another operational flow 800 in accordance with various embodiments. Operational flow 800 includes certain operations that mirror the operations included in the operational flow 500 of FIG. 5. These operations include a relevant reported aspect providing operation 802 and a personalized plan development operation 804 that corresponds to and mirror the relevant reported aspect providing operation 502 and the personalized plan development operation 504, respectively, of FIG. 5.

In addition, operational flow 800 includes a presentation operation 806 for presenting the one or more personalized plans as depicted in FIG. 8. For instance, the presentation module 106* of the server 10 of FIG. 1b, the local source user device 20' of FIG. 2b, or the local end user device 30" of FIG. 3b presenting (e.g., transmitting via the wireless network and/or wired network 50* or indicating via a user interface 120*) the one or more personalized plans 16*.

Figure 9:
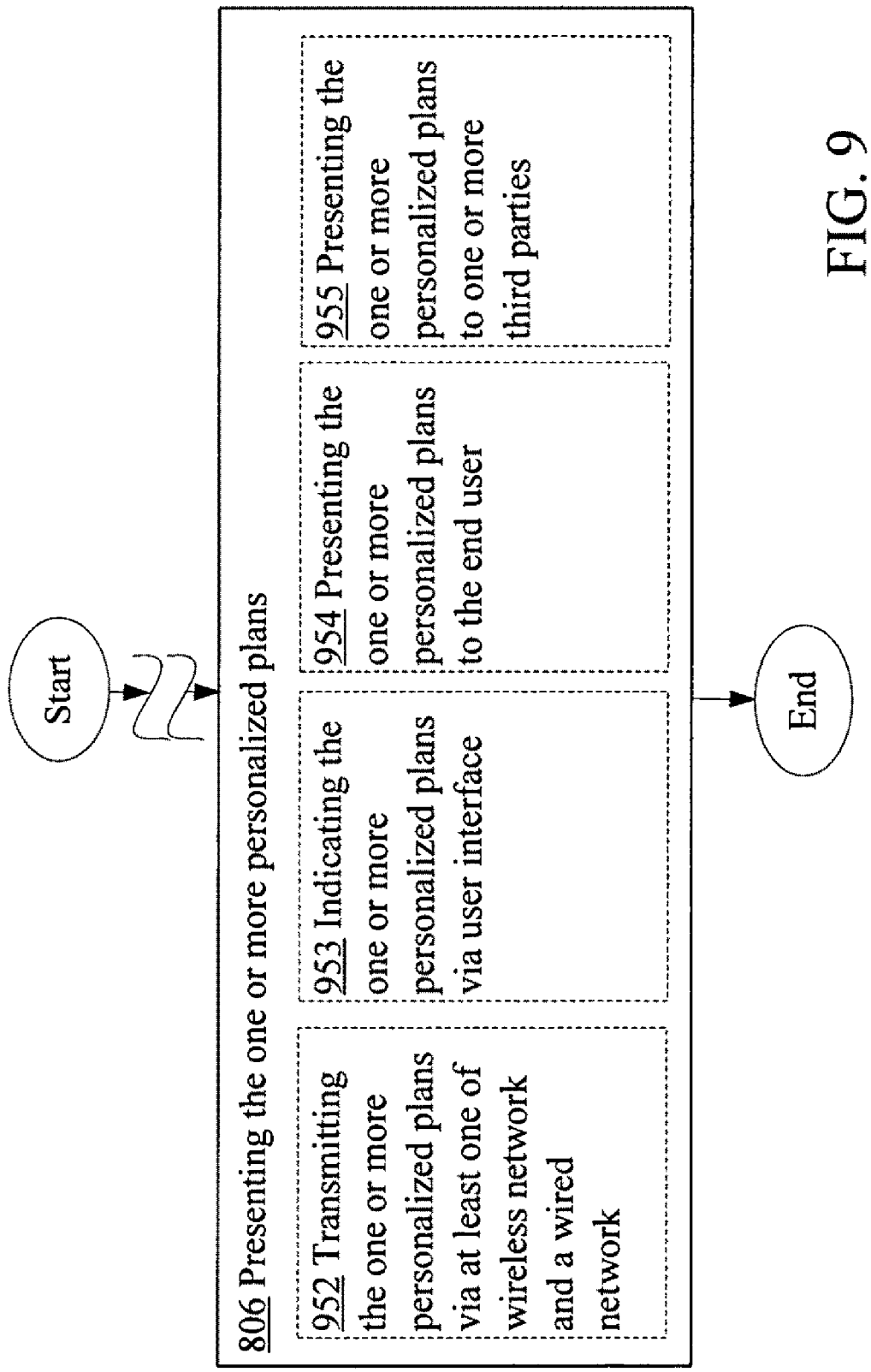
FIG. 9 is a high-level logic flowchart of a process depicting alternate implementations of the presentation operation 806 of FIG. 8.

In various alternative implementations, the presentation operation 806 may include one or more additional operations. For example, in some implementations, the presentation operation 806 may include an operation 952 for transmitting the one or more personalized plans via at least one of wireless network and a wired network as depicted in FIG. 9. For instance, the transmission module 224* of the server 10 of FIG. 1b, the local source user device 20' of FIG. 2b, or the local end user device 30" of FIG. 3b transmitting the one or more personalized plans 16* via at least one of wireless network and a wired network 50*.

In the same or different implementations, the presentation operation 806 may include an operation 953 for indicating the one or more personalized plans via user interface as depicted in FIG. 9. For instance, the user interface indication module 226* of the local source user device 20' of FIG. 2b or the local end user device 30" of FIG. 3b audioally or visually indicating the one or more personalized plans 16* via a user interface 120* (e.g., a display monitor, a touchscreen, an audio system including one or more speakers, and so forth).

In the same or different implementations, the presentation operation 806 may include an operation 954 for presenting the one or more personalized plans to the end user as depicted in FIG. 9. For instance, the presentation module 106* of the server 10 of FIG. 1b, the local source user device 20' of FIG. 2b, or the local end user device 30" of FIG. 3b presenting the one or more personalized plans 16* to the end user 4*.

In the same or different implementations, the presentation operation 806 may include an operation 955 for presenting the one or more personalized plans to one or more third parties as depicted in FIG. 9. For instance, the presentation module 106* of the server 10 of FIG. 1b, the local source user device 20' of FIG. 2b, or the local end user device 30" of FIG. 3b presenting the one or more personalized plans 16* to one or more third parties 6*.

Figure 10:
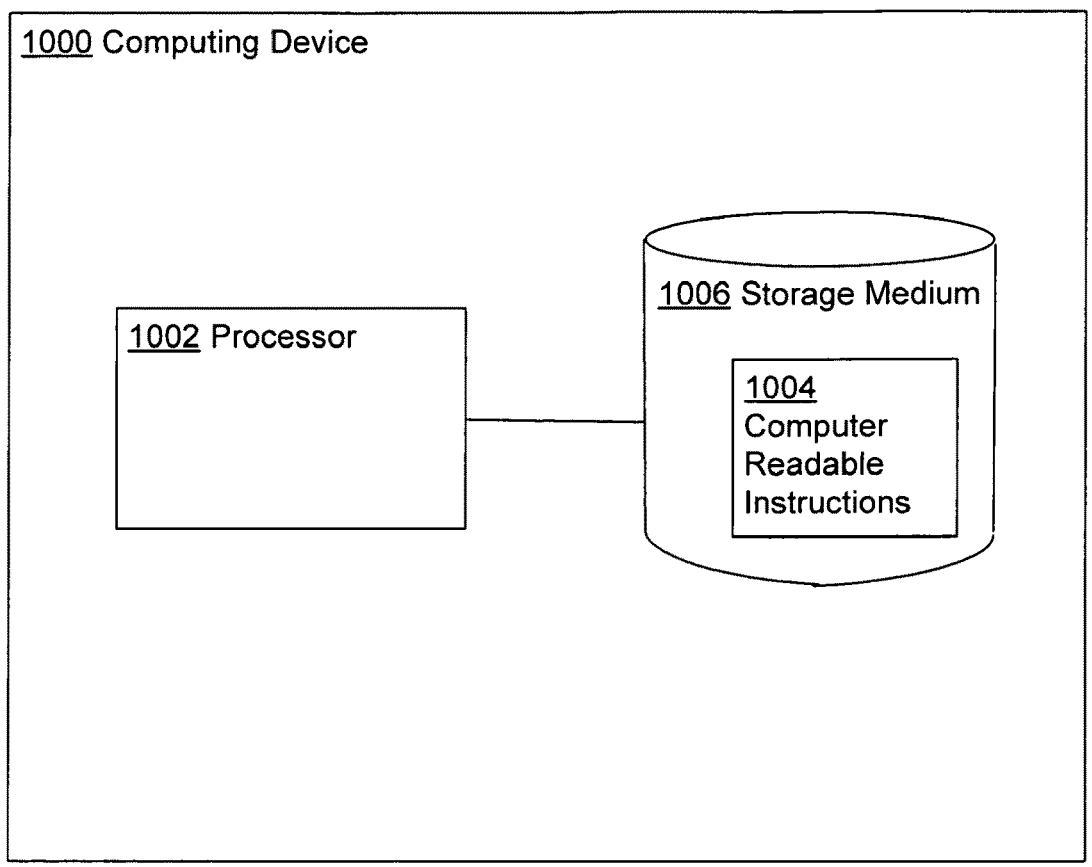
FIG. 10 is a high-level block diagram of a computing device.

Turning now to FIG. 10 illustrating a computing device 1000 designed to implement one or more of the operations of the operational flows described above (e.g., as illustrated in FIGS. 5, 6a, 6b, 6c, 6d, 6e, 6f, 6g, 6h, 6i, 6j, 6k, 6l, 6m, 6n, 6o, 6p, 6q, 6r, 6s, 7a, 7b, 7c, 7d, 7e, 7f, 7g, 7h, 7i, 8, and 9). In various implementations, the computing device 1000 may be a server such as the server 10 of FIG. 1b or a local client device such as the local source user device 20a' of FIG. 2b or the local end user device 30" of FIG. 3b.

As illustrated, the computing device 1000 may include a processor 1002 (e.g., microprocessor, controller, and so forth) coupled to storage medium 1006 (e.g., volatile or non-volatile memory). The storage medium 1006 may store computer readable instructions 1004 (e.g., computer program product). The processor 1002, in various implementations, may execute the computer readable instructions 1004 in order to execute one or more operations described above and as illustrated in FIGS. 5, 6a, 6b, 6c, 6d, 6e, 6f, 6g, 6h, 6i, 6j, 6k, 6l, 6m, 6n, 6o, 6p, 6q, 6r, 6s, 7a, 7b, 7c, 7d, 7e, 7f, 7g, 7h, 7i, 8, and 9.

For example, the processor 1002 may execute the computer readable instructions 1004 in order to provide one or more relevant reported aspects associated with one or more source users 2* that are relevant to achieving one or more target outcomes, the providing of the one or more relevant reported aspects being based, at least in part, on the one or more relevant reported aspects' association with the one or more source users 2*; and/or to develop one or more personalized plans 16* designed to facilitate an end user 4* to achieve the one or more target outcomes when one or more emulatable aspects indicated by the one or more personalized plans 16* are emulated, the development of the one or more personalized plans 16* being based, at least in part, on the providing as depicted in the operational flow 500 of FIG. 5.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuitry (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuitry, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A computationally-implemented system, comprising:
    means for providing one or more relevant reported aspects associated with one or more source users that are relevant to achieving one or more target outcomes, the providing of the one or more relevant reported aspects being based, at least in part, on the one or more relevant reported aspects' association with the one or more source users; and
    means for developing one or more personalized plans designed to facilitate an end user to achieve the one or more target outcomes when one or more emulatable aspects indicated by the one or more personalized plans are emulated, the development of the one or more personalized plans being based, at least in part, on the providing, wherein said means for developing one or more personalized plans designed to facilitate an end user to achieve the one or more target outcomes when one or more emulatable aspects indicated by the one or more personalized plans are emulated, the development of the one or more personalized plans being based, at least in part, on the providing, comprises:
        means for including into each of the one or more personalized plans one or more emulatable aspects that correspond to the one or more relevant reported aspects that are associated with one or more source users and that are relevant to achieving one or more target outcomes, wherein said means for including into each of the one or more personalized plans one or more emulatable aspects that correspond to the one or more relevant reported aspects that are associated with one or more source users and that are relevant to achieving one or more target outcomes, comprises:
            means for determining whether the one or more emulatable aspects to be included in the one or more personalized plans complies with one or more limitations associated with the end user, and if not, execute one or more actions.

2. The computationally-implemented system of claim 1, wherein said means for providing one or more relevant reported aspects associated with one or more source users that are relevant to achieving one or more target outcomes, the providing of the one or more relevant reported aspects being based, at least in part, on the one or more relevant reported aspects' association with the one or more source users comprises:
    means for identifying one or more reported aspects that are at least associated with the one or more source users from a plurality of reported aspects.

3. The computationally-implemented system of claim 2, wherein said means for identifying one or more reported aspects that are at least associated with the one or more source users from a plurality of reported aspects, comprises:
    means for identifying one or more reported aspects that are relevant to achieving the one or more target outcomes from the one or more reported aspects that are at least associated with the one or more source users.

4. The computationally-implemented system of claim 3, wherein said means for identifying one or more reported aspects that are relevant to achieving the one or more target outcomes from the one or more reported aspects that are at least associated with the one or more source users, comprises:
    means for identifying the one or more reported aspects that are relevant to achieving the one or more target outcomes from the one or more reported aspects that are at least associated with the one or more source users based, at least in part, on one or more relevancy factors that at least identifies one or more aspect types that are relevant to achieving the one or more target outcomes.

5. The computationally-implemented system of claim 4, wherein said means for identifying the one or more reported aspects that are relevant to achieving the one or more target outcomes from the one or more reported aspects that are at least associated with the one or more source users based, at least in part, on one or more relevancy factors that at least identifies one or more aspect types that are relevant to achieving the one or more target outcomes, comprises:
    means for identifying from the one or more reported aspects that are at least associated with the one or more source users one or more reported aspects that belong to one or more aspect types that are of interest to the end user.

6. The computationally-implemented system of claim 4, wherein said means for identifying the one or more reported aspects that are relevant to achieving the one or more target outcomes from the one or more reported aspects that are at least associated with the one or more source users based, at least in part, on one or more relevancy factors that at least identifies one or more aspect types that are relevant to achieving the one or more target outcomes, comprises:
    means for identifying from the one or more reported aspects that are at least associated with the one or more source users one or more reported aspects that belong to one or more aspect types that have been indicated by the one or more source users as being relevant to the achievement of the one or more target outcomes.

7. The computationally-implemented system of claim 4, wherein said means for identifying the one or more reported aspects that are relevant to achieving the one or more target outcomes from the one or more reported aspects that are at least associated with the one or more source users based, at least in part, on one or more relevancy factors that at least identifies one or more aspect types that are relevant to achieving the one or more target outcomes, comprises:
   means for identifying from the one or more reported aspects that are at least associated with the one or more source users one or more reported aspects that indicate one or more aspects that occurred within one or more predefined time periods, respectively, from one or more occurrences of one or more reported aspects that correspond to the one or more target outcomes.

8. The computationally-implemented system of claim 3, wherein said means for identifying one or more reported aspects that are relevant to achieving the one or more target outcomes from the one or more reported aspects that are at least associated with the one or more source users, comprises:
   means for identifying from the one or more reported aspects that are at least associated with the one or more source users one or more reported aspects that are related to one or more behavior incidences associated with the one or more source users.

9. The computationally-implemented system of claim 8, wherein said means for identifying from the one or more reported aspects that are at least associated with the one or more source users one or more reported aspects that are related to one or more behavior incidences associated with the one or more source users, comprises:
   means for identifying from the one or more reported aspects that are at least associated with the one or more source users one or more reported aspects that are related to one or more activities executed by the one or more source users.

10. The computationally-implemented system of claim 8, wherein said means for identifying from the one or more reported aspects that are at least associated with the one or more source users one or more reported aspects that are related to one or more behavior incidences associated with the one or more source users, comprises:
   means for identifying from the one or more reported aspects that are at least associated with the one or more source users one or more reported aspects that are related to one or more incidences of one or more user attitudes associated with the one or more source users.

11. The computationally-implemented system of claim 8, wherein said means for identifying from the one or more reported aspects that are at least associated with the one or more source users one or more reported aspects that are related to one or more behavior incidences associated with the one or more source users, comprises:
   means for identifying from the one or more reported aspects that are at least associated with the one or more source users one or more reported aspects that are related to one or more incidences of one or more user conduct associated with the one or more source users.

12. The computationally-implemented system of claim 3, wherein said means for identifying one or more reported aspects that are relevant to achieving the one or more target outcomes from the one or more reported aspects that are at least associated with the one or more source users, comprises:
   means for identifying from the one or more reported aspects that are at least associated with the one or more source users one or more reported aspects that are related to one or more incidences of one or more user beliefs associated with the one or more source users.

13. The computationally-implemented system of claim 3, wherein said means for identifying one or more reported aspects that are relevant to achieving the one or more target outcomes from the one or more reported aspects that are at least associated with the one or more source users, comprises:
   means for identifying from the one or more reported aspects that are at least associated with the one or more source users one or more reported aspects that are related to one or more incidences of one or more subjective user states associated with the one or more source users.

14. The computationally-implemented system of claim 3, wherein said means for identifying one or more reported aspects that are relevant to achieving the one or more target outcomes from the one or more reported aspects that are at least associated with the one or more source users, comprises:
   means for identifying from the one or more reported aspects that are at least associated with the one or more source users one or more reported aspects that are related to one or more incidences of user locations associated with the one or more source users.

15. The computationally-implemented system of claim 3, wherein said means for identifying one or more reported aspects that are relevant to achieving the one or more target outcomes from the one or more reported aspects that are at least associated with the one or more source users, comprises:
   means for identifying from the one or more reported aspects that are at least associated with the one or more source users one or more reported aspects that are related to one or more incidences of external events associated with the one or more source users.

16. The computationally-implemented system of claim 3, wherein said means for identifying one or more reported aspects that are relevant to achieving the one or more target outcomes from the one or more reported aspects that are at least associated with the one or more source users, comprises:
   means for identifying from the one or more reported aspects that are at least associated with the one or more source users a first one or more reported aspects that are associated with a first source user and that are relevant to achieving a first one or more target outcomes and a second one or more reported aspects that are associated with a second source user and that are relevant to achieving a second one or more target outcomes.

17. The computationally-implemented system of claim 3, wherein said means for identifying one or more reported aspects that are relevant to achieving the one or more target outcomes from the one or more reported aspects that are at least associated with the one or more source users, comprises:
   means for identifying from the one or more reported aspects that are at least associated with the one or more source users a first one or more reported aspects that are associated with a first source user and that are relevant to achieving at least one target outcome and a second one or more reported aspects that are associated with a second source user and that are relevant to achieving the at least one target outcome.

18. The computationally-implemented system of claim 1, wherein said means for providing one or more relevant reported aspects associated with one or more source users that are relevant to achieving one or more target outcomes, the providing of the one or more relevant reported aspects being based, at least in part, on the one or more relevant reported aspects' association with the one or more source users, comprises:

means for acquiring one or more reported aspects that are at least associated with the one or more source users.

19. The computationally-implemented system of claim 1, wherein said means for providing one or more relevant reported aspects associated with one or more source users that are relevant to achieving one or more target outcomes, the providing of the one or more relevant reported aspects being based, at least in part, on the one or more relevant reported aspects' association with the one or more source users, comprises:

means for providing the one or more relevant reported aspects including providing one or more relevant reported aspects that were at least originally reported via one or more log entries.

20. The computationally-implemented system of claim 19, wherein said means for providing the one or more relevant reported aspects including providing one or more relevant reported aspects that were at least originally reported via one or more log entries, comprises:

means for providing the one or more relevant reported aspects including providing one or more relevant reported aspects that were at least originally reported via one or more blog entries.

21. The computationally-implemented system of claim 19, wherein said means for providing the one or more relevant reported aspects including providing one or more relevant reported aspects that were at least originally reported via one or more log entries, comprises:

means for providing the one or more relevant reported aspects including providing one or more relevant reported aspects that were at least originally reported via one or more status reports.

22. The computationally-implemented system of claim 19, wherein said means for providing the one or more relevant reported aspects including providing one or more relevant reported aspects that were at least originally reported via one or more log entries, comprises:

means for providing the one or more relevant reported aspects including providing one or more relevant reported aspects that were at least originally reported via one or more journal entries.

23. The computationally-implemented system of claim 19, wherein said means for providing the one or more relevant reported aspects including providing one or more relevant reported aspects that were at least originally reported via one or more log entries, comprises:

means for providing the one or more relevant reported aspects including providing one or more relevant reported aspects that were at least originally reported via log entries as provided by one or more sensing devices.

24. The computationally-implemented system of claim 1, wherein said means for including into each of the one or more personalized plans one or more emulatable aspects that correspond to the one or more relevant reported aspects that are associated with one or more source users and that are relevant to achieving one or more target outcomes, comprises:

means for including into each of the one or more personalized plans a plurality of emulatable aspects that corresponds to a plurality of relevant reported aspects that are associated with one or more source users and that are relevant to achieving the one or more target outcomes.

25. The computationally-implemented system of claim 24, wherein said means for including into each of the one or more personalized plans a plurality of emulatable aspects that corresponds to a plurality of relevant reported aspects that are associated with one or more source users and that are relevant to achieving the one or more target outcomes, comprises:

means for defining in each of the one or more personalized plans one or more relationships between the plurality of emulatable aspects included in each of the one or more personalized plans.

26. The computationally-implemented system of claim 25, wherein said means for defining in each of the one or more personalized plans one or more relationships between the plurality of emulatable aspects included in each of the one or more personalized plans, comprises:

means for defining in each of the one or more personalized plans one or more temporal relationships between the plurality of emulatable aspects included in each of the one or more personalized plans.

27. The computationally-implemented system of claim 25, wherein said means for defining in each of the one or more personalized plans one or more relationships between the plurality of emulatable aspects included in each of the one or more personalized plans, comprises:

means for defining in each of the one or more personalized plans one or more specific time relationships between the plurality of emulatable aspects included in each of the one or more personalized plans.

28. The computationally-implemented system of claim 1, wherein said means for determining whether the one or more emulatable aspects to be included in the one or more personalized plans complies with one or more limitations associated with the end user, and if not, execute one or more actions, comprises:

means for notifying at least one of the end user and a third party regarding non-compliance of the one or more emulatable aspects in response to a determination of non-compliance with the one or more limitations associated with the end user.

29. The computationally-implemented system of claim 1, wherein said means for determining whether the one or more emulatable aspects to be included in the one or more personalized plans complies with one or more limitations associated with the end user, and if not, execute one or more actions, comprises:

means for modifying the one or more personalized plans including replacing one or more emulatable aspects that have been determined not to be in compliance with the one or more limitations associated with the end user with one or more replacement emulatable aspects that does comply with the one or more limitations associated with the end user.

30. The computationally-implemented system of claim 1, wherein said means for developing one or more personalized plans designed to facilitate an end user to achieve the one or more target outcomes when one or more emulatable aspects indicated by the one or more personalized plans are emulated, the development of the one or more personalized plans being based, at least in part, on the providing, comprises:

means for developing the one or more personalized plans including at least one personalized plan that is designed to facilitate the end user to achieve one or more health or medical outcomes.

31. The computationally-implemented system of claim 30, wherein said means for developing the one or more personalized plans including at least one personalized plan that is designed to facilitate the end user to achieve one or more health or medical outcomes, comprises:

means for developing the one or more personalized plans including at least one personalized plan that is designed to facilitate the end user to achieve one or more physiological outcomes.

32. The computationally-implemented system of claim 30, wherein said means for developing the one or more personalized plans including at least one personalized plan that is designed to facilitate the end user to achieve one or more health or medical outcomes, comprises:
means for developing the one or more personalized plans including at least one personalized plan that is designed to facilitate the end user to achieve one or more physical fitness outcomes.

33. The computationally-implemented system of claim 30, wherein said means for developing the one or more personalized plans including at least one personalized plan that is designed to facilitate the end user to achieve one or more health or medical outcomes, comprises:
means for developing the one or more personalized plans including at least one personalized plan that is designed to facilitate the end user to achieve one or more medical treatment outcomes.

34. The computationally-implemented system of claim 1 wherein said means for developing one or more personalized plans designed to facilitate an end user to achieve the one or more target outcomes when one or more emulatable aspects indicated by the one or more personalized plans are emulated, the development of the one or more personalized plans being based, at least in part, on the providing, comprises:
means for developing the one or more personalized plans including at least one personalized plan that is designed to facilitate the end user to achieve one or more occupational outcomes.

35. The computationally-implemented system of claim 1, wherein said means for developing one or more personalized plans designed to facilitate an end user to achieve the one or more target outcomes when one or more emulatable aspects indicated by the one or more personalized plans are emulated, the development of the one or more personalized plans being based, at least in part, on the providing, comprises:
means for developing the one or more personalized plans including at least one personalized plan that is designed to facilitate the end user to achieve one or more social outcomes.

36. The computationally-implemented system of claim 1 wherein said means for developing one or more personalized plans designed to facilitate an end user to achieve the one or more target outcomes when one or more emulatable aspects indicated by the one or more personalized plans are emulated, the development of the one or more personalized plans being based, at least in part, on the providing, comprises:
means for developing the one or more personalized plans including at least one personalized plan that is designed to facilitate the end user to achieve one or more sexual intimacy outcomes.

37. The computationally-implemented system of claim 1 wherein said means for developing one or more personalized plans designed to facilitate an end user to achieve the one or more target outcomes when one or more emulatable aspects indicated by the one or more personalized plans are emulated, the development of the one or more personalized plans being based, at least in part, on the providing, comprises:
means for developing the one or more personalized plans including at least one personalized plan that is designed to facilitate the end user to achieve one or more psychological outcomes.

38. The computationally-implemented system of claim 1, wherein said means for developing one or more personalized plans designed to facilitate an end user to achieve the one or more target outcomes when one or more emulatable aspects indicated by the one or more personalized plans are emulated, the development of the one or more personalized plans being based, at least in part, on the providing, comprises:
means for developing the one or more personalized plans including at least one personalized plan that is designed to facilitate the end user to achieve one or more intellectual or academic outcomes.

39. The computationally-implemented system of claim 1, wherein said means for developing one or more personalized plans designed to facilitate an end user to achieve the one or more target outcomes when one or more emulatable aspects indicated by the one or more personalized plans are emulated, the development of the one or more personalized plans being based, at least in part, on the providing, comprises:
means for developing the one or more personalized plans including at least one personalized plan that is designed to facilitate the end user to achieve one or more user states.

40. The computationally-implemented system of claim 1, further comprising:
means for presenting the one or more personalized plans.

41. A computationally-implemented system, comprising:
means for providing one or more relevant reported aspects associated with one or more source users that are relevant to achieving one or more target outcomes, the providing of the one or more relevant reported aspects being based, at least in part, on the one or more relevant reported aspects' association with the one or more source users; and
means for developing one or more personalized plans designed to facilitate an end user to achieve the one or more target outcomes when one or more emulatable aspects indicated by the one or more personalized plans are emulated, the development of the one or more personalized plans being based, at least in part, on the providing, wherein said means for developing one or more personalized plans designed to facilitate an end user to achieve the one or more target outcomes when one or more emulatable aspects indicated by the one or more personalized plans are emulated, the development of the one or more personalized plans being based, at least in part, on the providing, comprises:
means for including into each of the one or more personalized plans one or more emulatable aspects that correspond to the one or more relevant reported aspects that are associated with one or more source users and that are relevant to achieving one or more target outcomes, wherein said means for including into each of the one or more personalized plans one or more emulatable aspects that correspond to the one or more relevant reported aspects that are associated with one or more source users and that are relevant to achieving one or more target outcomes, comprises:
means for determining whether at least one of the one or more emulatable aspects to be included in the one or more personalized plans is a plausible aspect that has been successfully emulated by one or more third parties, and if not, execute one or more actions.

42. The computationally-implemented system of claim 41, wherein said means for determining whether at least one of the one or more emulatable aspects to be included in the one or more personalized plans is a plausible aspect that has been successfully emulated by one or more third parties, and if not, execute one or more actions, comprises:

means for notifying, in response to determining that the at least one of the one or more emulatable aspects to be included in the one or more personalized plans is not a plausible aspect, at least one of the end user and a third party regarding the determination that the at least one of the one or more emulatable aspects to be included in the one or more personalized plans is not a plausible aspect.

43. The computationally-implemented system of claim 41, wherein said means for determining whether at least one of the one or more emulatable aspects to be included in the one or more personalized plans is a plausible aspect that has been successfully emulated by one or more third parties, and if not, execute one or more actions, comprises:

means for modifying, in response to determining that the at least one of the one or more emulatable aspects is not a plausible aspect, at least one of the one or more personalized plans by replacing the at least one of the one or more emulatable aspects determined to be not a plausible aspect with at least one replacement emulatable aspect that is a plausible aspect that has been successfully emulated by one or more third parties.

44. The computationally-implemented system of claim 41, wherein said means for determining whether at least one of the one or more emulatable aspects to be included in the one or more personalized plans is a plausible aspect that has been successfully emulated by one or more third parties, and if not, execute one or more actions, comprises:

means for determining whether at least one of the one or more emulatable aspects to be included in the one or more personalized plans is a plausible aspect that has been successfully emulated by one or more third parties in order to achieve at least one of the one or more target outcomes, and if not, execute one or more actions.

45. A method, comprising:

providing, by electrical circuitry, one or more relevant reported aspects associated with one or more source users that are relevant to achieving one or more target outcomes, the providing of the one or more relevant reported aspects being based, at least in part, on the one or more relevant reported aspects' association with the one or more source users; and developing one or more personalized plans designed to facilitate an end user to achieve the one or more target outcomes when one or more emulatable aspects indicated by the one or more personalized plans are emulated, the development of the one or more personalized plans being based, at least in part, on the providing, wherein said developing one or more personalized plans designed to facilitate an end user to achieve the one or more target outcomes when one or more emulatable aspects indicated by the one or more personalized plans are emulated, the development of the one or more personalized plans being based, at least in part, on the providing comprises:

including into each of the one or more personalized plans one or more emulatable aspects that correspond to the one or more relevant reported aspects that are associated with one or more source users and that are relevant to achieving one or more target outcomes, wherein said including into each of the one or more personalized plans one or more emulatable aspects that correspond to the one or more relevant reported aspects that are associated with one or more source users and that are relevant to achieving one or more target outcomes, comprises:

determining whether the one or more emulatable aspects to be included in the one or more personalized plans complies with one or more limitations associated with the end user, and if not, execute one or more actions.

46. A server, comprising:

a relevant reported aspect provision module configured to provide one or more relevant reported aspects associated with one or more source users that are relevant to achieving one or more target outcomes, the providing of the one or more relevant reported aspects being based, at least in part, on the one or more relevant reported aspects' association with the one or more source users;

a personalized plan development module configured to develop one or more personalized plans designed to facilitate an end user to achieve the one or more target outcomes when one or more emulatable aspects indicated by the one or more personalized plans are emulated, the development of the one or more personalized plans being based, at least in part, on the providing, wherein said personalized plan development module configured to develop one or more personalized plans designed to facilitate an end user to achieve the one or more target outcomes when one or more emulatable aspects indicated by the one or more personalized plans are emulated, the development of the one or more personalized plans being based, at least in part, on the providing comprises:

an emulatable aspect inclusion module configured to include into each of the one or more personalized plans one or more emulatable aspects that correspond to the one or more relevant reported aspects provided by the relevant reported aspect provision module; and a limitation compliance determination module configured to determine whether the one or more emulatable aspects complies with one or more limitations associated with the end user, and if not, execute one or more actions; and a memory.

\* \* \* \* \*